(12) United States Patent
Anderson et al.

(10) Patent No.: US 7,379,978 B2
(45) Date of Patent: May 27, 2008

(54) ELECTRONIC ITEM MANAGEMENT AND ARCHIVAL SYSTEM AND METHOD OF OPERATING THE SAME

(75) Inventors: Matthew Anderson, Winter Park, FL (US); Krishna Balwalli, Lake Mary, FL (US); Laurie Benson, Altamonte Springs, FL (US); Bruce Bond, Winter Springs, FL (US); Portia Brown, Winter Springs, FL (US); Ying Cai, Longwood, FL (US); Dominic Da Silva, Orlando, FL (US); Keay Edwards, Orlando, FL (US); Harring Figueiredo, Orlando, FL (US); Mark Fiorentino, Winter Haven, FL (US); Eric Haettich, Orlando, FL (US); Gary Heller, Longwood, FL (US); Saeed Kaviani, Orlando, FL (US); Keith Lewandowski, Ocoee, FL (US); Ellen McLaughlin, Casselberry, FL (US); John Mudd, Orlando, FL (US); Kunal Mukherjee, Winter Park, FL (US); Zarina Myles, Winter Park, FL (US); Zoran Naskov, Eustis, FL (US); Aaron Phillips, Apopka, FL (US); Steven Savrda, Longwood, FL (US); Robert Wilson, Longwood, FL (US)

(73) Assignee: Fiserv Incorporated, Brookfield, WI (US)

( * ) Notice: Subject to any disclaimer, the term of this patent is extended or adjusted under 35 U.S.C. 154(b) by 468 days.

(21) Appl. No.: 10/199,950

(22) Filed: Jul. 19, 2002

(65) Prior Publication Data

US 2004/0015566 A1    Jan. 22, 2004

(51) Int. Cl.
    *G06F 15/16* (2006.01)

(52) U.S. Cl. .......................... 709/219; 709/217; 707/6; 707/3; 707/4; 705/45; 705/42; 705/40; 705/31

(58) Field of Classification Search ................ 705/102, 705/204, 40, 50, 42, 32, 45; 707/40, 42, 707/31, 3–6; 709/201, 217, 219
See application file for complete search history.

(56) References Cited

U.S. PATENT DOCUMENTS

| | | | |
|---|---|---|---|
| 4,315,246 | A | 2/1982 | Milford |
| 4,352,100 | A | 9/1982 | O'Connell |
| 4,590,606 | A | 5/1986 | Rohrer |
| 4,722,444 | A | 2/1988 | Murphy et al. |
| 4,821,332 | A | 4/1989 | Durham |
| 4,876,735 | A | 10/1989 | Martin et al. |
| 4,888,812 | A | 12/1989 | Dinan et al. |
| 4,914,709 | A | 4/1990 | Rudak |
| 5,040,227 | A | 8/1991 | Lyke et al. |

(Continued)

*Primary Examiner*—Nathan Flynn
*Assistant Examiner*—Mohammad Siddiqi
(74) *Attorney, Agent, or Firm*—Michael Best & Friedrich LLP

(57) ABSTRACT

An electronic item management and archival system for managing and archiving items. Each item includes at least one of image data, audio data, and video data. The system includes a server configured to receive items, archive at least one of the received items to an archive, and retrieve at least one of the archived items from the archive. In some embodiments, the server also includes architecture that supports a pool of threads promoting multiple, independent archive and retrieve operations concurrently.

27 Claims, 41 Drawing Sheets

U.S. PATENT DOCUMENTS

| | | |
|---|---|---|
| 5,136,707 A | 8/1992 | Block et al. |
| 5,151,948 A | 9/1992 | Lyke et al. |
| 5,161,214 A | 11/1992 | Addink et al. |
| 5,170,466 A | 12/1992 | Rogan et al. |
| 5,187,750 A | 2/1993 | Behera |
| 5,193,121 A | 3/1993 | Elischer et al. |
| 5,208,869 A | 5/1993 | Holt |
| 5,257,323 A | 10/1993 | Melen et al. |
| 5,274,567 A | 12/1993 | Kallin et al. |
| 5,301,350 A | 4/1994 | Rogan et al. |
| 5,321,238 A | 6/1994 | Kamata et al. |
| 5,321,816 A | 6/1994 | Rogan et al. |
| 5,321,831 A | 6/1994 | Hirose |
| 5,359,667 A | 10/1994 | Borowski et al. |
| 5,444,794 A | 8/1995 | Uhland, Sr. |
| 5,455,875 A | 10/1995 | Chevion et al. |
| 5,495,929 A | 3/1996 | Batalianets et al. |
| 5,506,691 A | 4/1996 | Bednar et al. |
| 5,519,786 A | 5/1996 | Courtney et al. |
| 5,526,447 A | 6/1996 | Shepard |
| 5,530,773 A | 6/1996 | Thompson |
| 5,544,043 A | 8/1996 | Miki et al. |
| 5,550,932 A | 8/1996 | Blaylock et al. |
| 5,592,377 A | 1/1997 | Lipkin |
| 5,602,936 A | 2/1997 | Green et al. |
| 5,678,046 A | 10/1997 | Cahill et al. |
| 5,687,250 A | 11/1997 | Curley et al. |
| 5,740,271 A | 4/1998 | Kunkler et al. |
| 5,784,610 A | 7/1998 | Copeland, III et al. |
| 5,812,989 A | 9/1998 | Witt et al. |
| 5,825,506 A | 10/1998 | Bednar et al. |
| 5,862,325 A * | 1/1999 | Reed et al. ................. 709/201 |
| 5,870,725 A * | 2/1999 | Bellinger et al. ............. 705/45 |
| 5,875,892 A | 3/1999 | Martin et al. |
| 5,917,965 A | 6/1999 | Cahill et al. |
| 5,940,844 A | 8/1999 | Cahill et al. |
| 5,963,659 A | 10/1999 | Cahill et al. |
| 6,004,276 A * | 12/1999 | Wright et al. ............... 600/508 |
| 6,006,249 A | 12/1999 | Leong |
| 6,035,412 A | 3/2000 | Tamer et al. |
| 6,091,835 A * | 7/2000 | Smithies et al. ............ 382/115 |
| 6,115,509 A | 9/2000 | Yeskel |
| 6,181,837 B1 * | 1/2001 | Cahill et al. ................ 382/305 |
| 6,216,104 B1 * | 4/2001 | Moshfeghi et al. ......... 704/260 |
| 6,236,993 B1 * | 5/2001 | Fanberg ........................ 707/6 |
| 6,445,905 B1 | 9/2002 | Pentikainen |
| 6,510,432 B1 * | 1/2003 | Doyle ......................... 707/10 |
| 6,603,921 B1 * | 8/2003 | Kanevsky et al. ............ 386/96 |
| 6,925,482 B2 * | 8/2005 | Gopal et al. ................ 709/201 |
| 7,054,910 B1 | 5/2006 | Nordin et al. |
| 2003/0208421 A1 * | 11/2003 | Vicknair et al. .............. 705/35 |

* cited by examiner

```
          APPLICATION SERVER TERMINATION PROGRAM
          ------------------------------------------
LIST OF SERVERS:

SERVER NAME             OWNER           PID
          -----------             -----           ---
     1.   ACCESSSRV               TEST 40         6100
     2.   BUSADMINSRV             TEST 40         5707
     3.   CORBA_NAMESRV           TEST 40         23209
     4.   DISKREPSRV              TEST 40         5909
     5.   LOGSERVICESRV           TEST 40         5747
     6.   OPTICALROBSRV           TEST 40         2580
     7.   PARAMETERSRV            TEST 40         5728
     8.   PROXYINDEXSRV           TEST 40         6059
     9.   REPPROXYSRV             TEST 40         6079
     10.  SETSERVICESRV           TEST 40         5869
     Q.   QUIT

ENTER SERVER NUMBER TO TERMINATE [Q=QUIT A=ALL]:
```

FIG. 6 — 600

```
RESULT: THE MATCH MENU OPENS AS SHOWN BELOW.
MATCH MENU
------------------

PLEASE CHOOSE FROM MENU

1 )    SELECT DOCUMENT TYPE         [CHECK]
2 )    SELECT MATCH SET             [ / VTEST/20010315]       — 805
3 )    ENTER BATCH ID               [ ]                       — 810
4 )    LOAD MATCH CONTROL FILE (S)  [ ]
5 )    PERFORM MATCH                [ ]
6 )    FREE ITEM SELECTION          [ ]                       — 815
7 )    FREE ITEM GROUP MOVE         [ ]                       — 820
8 )    MISSING ITEM INSERTION       [ ]
9 )    RESET MATCH
------------------------------
Q )    QUIT

ENTER CHOICE:
```
— 800

FIG. 8

| TYPE OF REPORT | DATE | SOURCE | MESSAGE |
|---|---|---|---|
| A | 2001:3:8:8:4822:750 | ACCESSFACTORY | IMAGE,ACCESSFACTORY,0,,2001/03/08,08:48:22,LOGIN,10.111.1.18,USR_ADMIN,,,,,,,,SUCCEED |
| A | 2001:3:8:8:4842:480 | ACCESSFACTORY | IMAGE,ACCESSFACTORY,0,,2001/03/08,08:46:42,QUERY,10.111.1.18,USR_ADMIN,,,20010308080846413 |
| A | 2001:3:8:8:4858:800 | ACCESSFACTORY | IMAGE,ACCESSFACTORY,0,,2001/03/08,08:48:58,QUERY,10.111.1.18,USR_ADMIN,,,20010308080848584 |
| A | 2001:3:8:8:4926:276 | ACCESSFACTORY | IMAGE,ACCESSFACTORY,0,,2001/03/08,08:49:26,QUERY,10.111.1.18,USR_ADMIN,,,20010308080849255 |
| A | 2001:3:8:8:4942:160 | ACCESSFACTORY | IMAGE,ACCESSFACTORY,0,,2001/03/08,08:49:42,QUERY,10.111.1.18,USR_ADMIN,,,20010308080849414 |
| A | 2001:3:8:9:2913:576 | SET UTILITIES | IMAGE,SETUTILS,,,03/08,01,9:26:13AM CST,DELETION,,,106,,,,,,,,,,,1,,,BBOND,20010307 |
| A | 2001:3:8:9:2846:186 | GIA-SESSION | SESSION COMPLETED,BBOND,20010308,CHECK,2934,32218096,0, |
| A | 2001:3:8:9:3958:800 | ACCESSFACTORY | IMAGE,ACCESSFACTORY,0,,2001/03/08,08:39:58,LOGIN,10.111.1.18,USR_ADMIN,,,,,,,,SUCCEED |

FIG. 11

```
DATA RANGE ? (Y/N) : N
N
SELECT SERVICES:
   1:  TAPEREPOSITORY
   2:  MIGRATION MENU
   3:  RECONCILEEXPORT
   4:  IDXPROXY
   5:  OPTICALREPOSITORY
   6:  ACCESSFACTORY
   7:  GIA-SESSION
   8:  MATCH
   9:  SETSERVICE
   10: OPTICALUTILITIESSERVICE
   11: SET UTILITIES
   12: IDXSERVICE

A : ALL
D : DONE

ENTER NUMBER /A/D :
```

| | | |
|---|---|---|
| DEVELOPERS | DEV GROUP NAME FOR REAL | |
| GROUP2 | VTTS EDITED GROUP | |
| LAURIE GROUP | NEW LAURIE GROUP | |
| TECHNICAL SUPPORT | PEOPLE OF THE TECHNICAL SUPPORT | |
| TRAINING | TRAINING PEOPLE | |
| USR_ADMIN | DEFAULT USER GROUP | |
| VICKIS GROUP | TITAN USERS | |
| WRITERS | TECHNICAL WRITERS | |

*1800*

| QUERY FILTER LIST | FILTER INFORMATION |

| QUERY FILTER | FILTER CONDITIONS |

QUERY FILTER NAME: n # 91502973      — 2005
DESCRIPTION: ROUTING TEST           — 2010
GROUP: ACCT # 429608
DOCUMENT TYPE: CHECK

| | |
|---|---|
| MATCH... | ENTER |
| DELETE | NUMPAD - |
| SKIP | NUMPAD + |
| OPTIONS | F3 |
| REFRESH | F5 |
| SHOW DATABASE, CYCLE AND BATCH WINDOW | F6 |
| HELP | F1 |
| HELP ABOUT | F2 |
| EXIT | F12 |

| OP | FIELD NAME | OPERATORS | VALUE1 | VALUE2 |
|---|---|---|---|---|
| ▷ | | EQUAL | | |
| OR | ACCOUNT | EQUAL | 111111112 | |
| AND | SERIAL | EQUAL | 538 | |
| | | EQUAL | | |
| OR | ACCOUNT | EQUAL | 123456789 | |
| AND | SERIAL | EQUAL | 531 | |
| | POSTING_DATE | EQUAL | | |
| | DIN | EQUAL | | |
| | EXCEPTION_CODE | EQUAL | | |
| | DECISION_TYPE | EQUAL | | |
| | USER_ID | EQUAL | | |

*FIG. 35*

| OP | FIELD NAME | OPERATORS | VALUE1 | VALUE2 |
|---|---|---|---|---|
|  | ACCOUNT | EQUAL | 5006575 |  |
| OR | ACCOUNT | EQUAL | 338482 |  |
| OR | ACCOUNT | EQUAL | 457722 |  |
| OR | ACCOUNT | EQUAL | 681235 |  |
|  |  | EQUAL |  |  |
|  |  | EQUAL |  |  |
|  |  | EQUAL |  |  |
|  |  | EQUAL |  |  |
|  |  | EQUAL |  |  |
|  |  | EQUAL |  |  |

FIG. 36

| OP | FIELD NAME | OPERATORS | VALUE1 | | VALUE2 | |
|---|---|---|---|---|---|---|
| | TRANSIT_ROUTING | EQUAL | 657578054 | | | |
| AND | | EQUAL | | | | |
| ( | | EQUAL | | | | |
| | ACCOUNT | EQUAL | 338482 | | | |
| OR | ACCOUNT | EQUAL | 457722 | | | |
| OR | ACCOUNT | EQUAL | 681235 | | | |
| ) | | EQUAL | | | | |
| | | EQUAL | | | | |
| | | EQUAL | | | | |
| | | EQUAL | | | | |
| | | EQUAL | | | | |

| DOUCMENT TYPE | CHECK | | | |
|---|---|---|---|---|
| TAG | CAPTUREDATE | SERIALNUMBER | ACCOUNTNUM | CHECKAMT |
| ☐ | 03/21/2000 | 12345 | 100818860 | 100.00 |
| ☐ | 03/21/2000 | 23456 | 100818860 | 26.72 |
| ☐ | 03/21/2000 | 34567 | 100818860 | 100.00 |
| ☐ | 03/21/2000 | 45678 | 100818860 | 19.10 |
| ☐ | 03/21/2000 | 56789 | 100818860 | 158.12 |
| ☐ | 03/21/2000 | 67890 | 100818860 | 50.00 |
| ☐ | 03/21/2000 | 78901 | 100818860 | 5.00 |
| ☐ | 03/21/2000 | 89012 | 100818860 | 45.00 |
| ☐ | 03/21/2000 | 90123 | 100818860 | 46.66 |
| ☐ | 03/21/2000 | 01234 | 100818860 | 26.72 |

FIG. 39

| | E | F | G | H | I | J |
|---|---|---|---|---|---|---|
| 1 | | | POSITIVE PAY LINE ITEM REPORT (NORTHERNTRUST) | | | |
| 2 | | | PROCESSED DATE: 9/17/2001 - 9/18/2001 | | | |
| 3 | CHECK SERIAL # | | PAYEE NAME | | CAR DOLLAR AMOUNT | |
| 4 | SEAL | RECOGNIZED | SEAL | RECOGNIZED | SEAL | RECOGNIZED |
| 5 | | | | | | |
| 6 | 00000004234 | 00000004234 | RAYMOND BLEDSOE | RAYMOND BLEDSOE | $126.93 | |
| 7 | 00000022937 | 00000022937 | BETTY LEE | BETTY LEE | $2156.44 | |
| 8 | 00000004980 | 00000004980 | CHASE SNEAD | CHASE SNEAD | $86.67 | |
| 9 | 00000005598 | 00000005598 | SHARLEEN SCHWARTZ - RAWNSLEY | SHARLEEN SCHWARTZ - RAWNSLEY | $115.48 | |
| 10 | 00000001149 | 00000001149 | ROBERT JOHNSON | ROBERT JOHNSON | $250.00 | |
| 11 | 00000002178 | 00000002178 | GEORGE YICK | GEORGE YICK | $300.00 | |
| 12 | 00000000492 | 00000000492 | MARTIN PETERSIL | MARTIN PETERSIL | $500.00 | |
| 13 | 00000005579 | 00000005579 | FRANCISCO ORTIZHARO | FRANCISCO ORTIZHARO | $600.00 | |
| 14 | 00000005135 | 00000005135 | POOL TECH SAN DEIGO | POOL TECH SAN DEIGO | $80.00 | |
| 15 | 00000001982 | 00000001982 | PLP COPY | PLP COPY | $115.02 | |

*FIG. 48*

United States Patent
US 7,379,978 B2

ELECTRONIC ITEM MANAGEMENT AND ARCHIVAL SYSTEM AND METHOD OF OPERATING THE SAME

BACKGROUND OF THE INVENTION

The invention relates to an electronic item management and archival system.

Individuals, businesses, government agencies, and other institutions of all types issue checks and similar financial documents to make payments in the United States and internationally. There is a well-defined and well-known process within the banking system that supports checks as a payment mechanism. Included within this process is the practice of imaging checks and performing document management on the imaged checks. Example document management processes include archiving and storing the imaged checks. After the checks are archived and stored, later document management processes can include querying the archive and retrieving stored documents from the archive.

Similarly, there are countless numbers of other industries that require archiving, storing, querying, and retrieving of images, audio recordings, or video recordings.

SUMMARY OF THE INVENTION

The invention provides an electronic item management and archival system for managing and archiving items. Each item includes at least one of image data, audio data, and video data. The system includes an item-generation device configured to provide items and a server in communication with the item-generation device. The server is configured to receive the items from the item-generation device, archive at least one of the received items to an archive, and retrieve at least one of the archived items from the archive. In some embodiments, the server includes architecture that supports a pool of threads promoting multiple, independent archive and retrieve operations concurrently. Some embodiments of the invention can further include a storage device in communication with the server. The storage device is configured to receive the archived items from the server and store the received items.

The invention also provides a host machine for an electronic item management and archival system. The host machine includes a communications endpoint that receives items, a processor connected to the communications endpoint, and software executable by the processor. In some embodiments, the software includes instructions that create one or more virtual servers. The one or more virtual servers include at least one server that facilitates independent and concurrent communication between multiple Common Object Request Broker Architecture (CORBA) applications and at least one server that creates and manages an archive.

The invention further provides a method of managing an archive having items. Each item including a virtual object and query data associated with the virtual object. Each virtual object is selected from the group consisting of image data, audio data, and video data. The method includes providing a plurality of items, archiving at least one of the provided items to an archive, querying the archive, retrieving at least one of the archived items from the archive, and repeating one or more of the providing, archiving, querying, and retrieving acts. In some embodiments, the method also includes structuring a bus that allows two or more of the providing, archiving, querying, retrieving, and repeating acts to occur concurrently.

BRIEF DESCRIPTION OF THE DRAWINGS

FIG. 6 is a screen print of the Application Server Termination Program Menu.

FIG. 8 is a screen print of the Match Menu.

FIG. 11 is a screen print of a sample Audit Report.

FIG. 20 is a partial screen print of the Filter Information card.

FIG. 31 is a partial screen print of a Right Click menu for the View Image window.

FIGS. 35-37 are partial screen prints of example advance queries.

FIG. 38 is a screen print having the Query Set text box.

FIG. 39 is a screen print of the Result screen.

FIG. 40 is a screen print of the Result screen menu.

FIG. 48 is a screen print of an example Report.

DETAILED DESCRIPTION

The invention is not limited in its application to the details of construction and the arrangement of components set forth in the following description or illustrated in the following drawings. The invention is capable of other embodiments and of being practiced or of being carried out in various ways. Also, the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" are used broadly and encompass both direct and indirect connections, couplings, and mountings. In addition, the terms "connected" and "coupled" are not restricted to physical or mechanical connections or couplings. As used herein the terms "machine," "computer," and "server" are not limited to a device with a single processor, but may encompass multiple devices (e.g., computers) linked in a system, devices with multiple processors, special purpose devices, devices with various peripherals and input and output devices, software acting as a computer or server, and combinations of the above.

Figure 1:
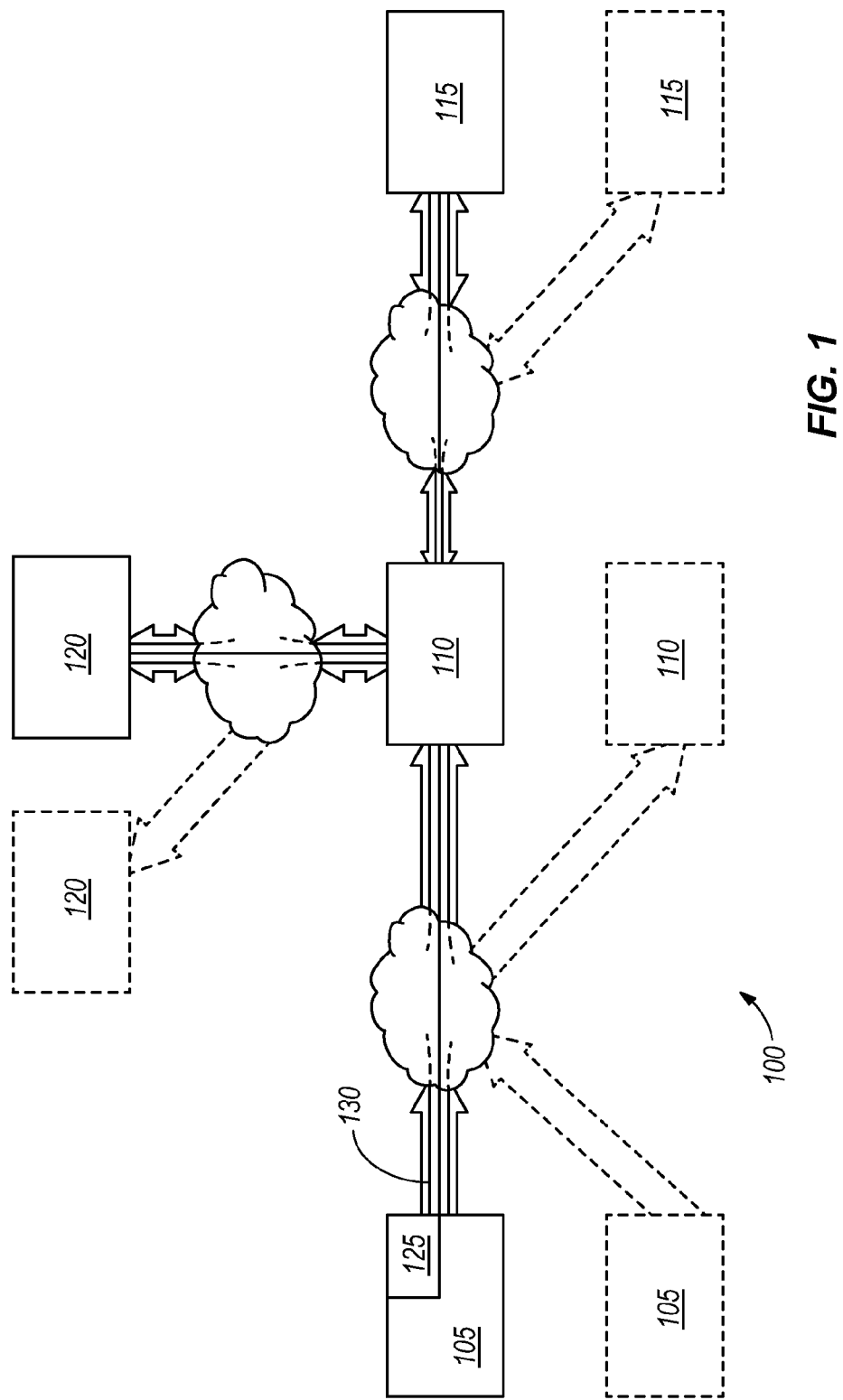
FIG. 1 is a schematic diagram of an Electronic Item Management and Archival (EIMA) system incorporating one embodiment of the invention.

FIG. 1 schematically shows an Electronic Item Management and Archival (EIMA) system 100 incorporating one embodiment of the invention. For the embodiment shown and described herein, the EIMA system 100 is based on an open architecture that accepts any type of image, video, or audio data from anywhere; stores, recomposes and/or reformats the image, video, or audio data; and outputs the recomposed or reformatted image, video and/or audio data. For example, the EIMA system 100 can reformat printstream data for use on the Web, via e-mail, or via fax. The open architecture provides the ability to accommodate new and more efficient technologies while still maintaining the functionality of previous systems.

As used herein, the term "image" data refers to data (or a file having data) that represents an image of a physical object. For example, the physical object can be a document (e.g., a financial document) and the "image" is data representing an image of the object. For another example, the physical object can be a form having entered information and the "image" is data representing the completed form. Example original documents include checks (e.g., for a demand deposit account (DDA)), signature cards, driver's licenses, photographs, applications (e.g., loan applications), reports, and other related documents. The term "video" data refers to data (or a file having data) that represents a plurality of images. The term "audio" data refers to data (or a file having data) that represents one or more sounds. The original image, plurality of images, or sound(s) are referred to as an "actual" object, and the item includes a "virtual" object representing the actual object.

Unless specified otherwise, the term "image" is used below to include "image" data, "video" data, or "audio" data representing an object. For simplifying the description below and unless specified otherwise, the EIMA system 100 is described in connection with check processing and the image is an image (front or back) of the check. However, the invention is not limited to check processing, and a claim should not be limited to check processing unless check processing is specifically recited within the claim.

Further, while an EIMA system 100 is described in detail below, not all aspects of the system are required in all embodiments. Rather, some embodiments include only some of the components and/or perform only some of the operations described below. Additionally, other embodiments can include additional components and/or include additional operations that are not disclosed below but nonetheless can be incorporated with the EIMA system 100.

I. EIMA System

As shown in FIG. 1, one embodiment of the invention comprises the EIMA system 100 that includes one or more item-input devices 105, one or more host servers 110, one or more workstation computers 115, and one or more peripheral devices 120. Each of these elements is described below.

A. Item-input Device

In general, the item-input device 105 provides information regarding a plurality of images (e.g., checks) to the host server 110. As used herein, the term "information" is broadly construed to comprise images and data relating to or obtained from the images. For example, if the provided information relates to checks, then the information may include the front and back images of each check and data (e.g., MICR data obtained from the check) obtained from each check. The image(s) and data for one document form an item. Example item-input devices (also referred to as item-generation devices) include scanners, check transports, video generation devices having a camera or similar component, sound generation devices having a microphone or similar component, and data feeds for receiving data from other devices (e.g., web feeds from other devices or feeds that receive previously stored data including items).

The item-input device 105 includes a controller 125 configured to control the input device 105 and/or to receive input data. The controller is configured to provide one or more "threads" 130 of data. Additionally, although only one item-input device is shown in FIG. 1, the EIMA system 100 can include multiple item-input devices 105 (a second is shown in phantom) providing multiple "threads" of information to one or more host servers 110 via a network connection 135. However, unless specified otherwise, the description below is for a system 100 having only one item-input device, and is specifically a check scanner.

1. Example Item-input Device

In one embodiment, the item-input device 105 includes a NCR 7780 scanner having multiple scanning components. The scanner scans financial documents (e.g., checks) and obtains related financial data from the document in a well-known manner. For example, the related financial data can include magnetic ink character recognition (MICR) information (account numbers, check numbers and related data, depending on specifics of the documents recorded, and the institution requirements), optical character recognition OCR information, and similar information. The resulting images can be in any format (e.g., jpeg, .tif, .bit, etc.).

The item-input device 110 also includes a controller 125 that, among other things, communicates with the scanner (e.g., via a LAN) to receive information from the scanner and to communicate the information to other components (e.g., to the host server 110). Example controllers include a computer (e.g., a PC) having software executed by the computer to configure the computer, a specially designed electronic device having programmable logic executed by the electronic device to configure the device, or application specific or special purpose circuits.

The item-input device 110 also has a sorter (e.g., a hard-wired sorter or a virtual sorter), which may be part of the scanner or the controller. The sorter includes a rule-based engine having rules that control the flow of the resulting scanned images and related data. That is, checks are provided to the scanner in a commingled relationship, the scanner scans the checks to create one or more images, the scanner obtains data relating to the checks, and the rule-based engine performs front-end processing on the checks to sort the checks. For a simple example, the rule-based engine may specify that a check having transit number "A" be provided on thread A and a check having transit number "B" be provided on thread B. The rule-based engine can include any number of rules to sort the checks. For other embodiments, the rule-based engine can include rules based on different image (or video or audio) items (e.g., different types of checks, different types of financial documents, etc.). In yet other embodiments, the host server 110 can include the virtual sorter.

The controller 125 further includes one or more connections (e.g., an Ethernet connection) that connect the scanner to the host server 110. The connection between the controller 125 and the host server 110 can be a direct connection or an indirect connection (e.g., via a network such as an intranet or the Internet).

As will be discussed further below, information travels throughout the system 100 using "threads." Each thread 130 contains information (e.g., a plurality of items) having one or more similar characteristics. Because of the similar characteristics, the same operations are performed on the information contained in a thread 130. For example, the information can be routed to a specific host server 110 or a specific storage device (discussed below). As will become more apparent below, the concept of utilizing multiple threads (and consequently performing multiple processes) can be utilized throughout the whole system 100.

B. Host Server

The EIMA system 100 includes a host server 110 that runs software. As used herein the term software is broadly construed to include computer programs, procedures, modules, data, etc. executable by one or more processors. The software includes software modules (also referred to herein as applications) that are executed by the host server to perform one or more processes or supporting functions. Some of the software modules result in the host server having "virtual" servers. The host server 110 is a Hewlett Packard V-Series server in one embodiment of the invention.

In some embodiments, the host server 110 receives information, including images and related data, from the item-input device 105; processes the information; archives the information; receives instructions or requests from the workstation 115; performs operations based on the received instructions or requests; and communicates information to the workstation 115 or to the one or more peripheral devices 120. An example of such a server is the Titan 4.0 server offered by ImageSoft Technologies of Maitland, Fla.

For the EIMA system shown, the host computer includes the servers listed in TABLE 1. It should be noted that not all of the servers described below are required for all embodiments and the EIMA system 100 can include additional servers not described below. The titles of the servers and the division of the functions of the servers are for explanatory purposes only. One or more functions performed by the one of the servers may be combined with other servers.

TABLE 1

| SERVER NAME | DESCRIPTION |
| --- | --- |
| CORBA Name Server | Responsible for facilitating communication between the different CORBA applications, and for handling server registrations and requests. |
| Bus Administrator Server | Responsible for providing application functionality and services (e.g., print, export, repair, import, etc.). |
| Parameter Server | Provides a central location for storing parameters that are used to control the operation of services and applications on the bus. Its primary role is to store parameters and track their modification. |
| Log Server | Responsible for logging events and storing messages that are related to bus archive operations. |
| Set Server | Responsible for maintaining the sets of data in the archive and the definition of document types. |
| Index Server | Responsible for providing database functionality for storage and retrieval of query data that is associated with objects stored in repositories. |
| Proxy Index Server | Coordinates and organizes traffic to the index servers. |
| Remote Distribution Server | Handles the print and fax capabilities of Export. This server allows users to remotely log in and request a print or fax job. |
| Disk Repository Server | Responsible for data mining and retrieval of objects stored on disk. |
| Optical Administration Server | Responsible for importing and exporting cartridges from the optical jukebox. |
| Optical Robotics Server | Responsible for running optical services. |
| Optical Repository Server | Responsible for storage and retrieval of objects stored on an optical storage device. |
| Tape Repository Server | Responsible for storage and retrieval of objects stored on tape. |
| Repository Proxy Server | Responsible for storage and retrieval of objects stored on RAID, optical, and tape. |

TABLE 1-continued

| SERVER NAME | DESCRIPTION |
| --- | --- |
| Access Server | Manages user definitions and security permissions for those users. All access from the Web server interface is funneled through the Access Server. The Access Server is the portal through which client applications are delivered through a graphical user interface (GUI) to the end user. The Access Server is an application on the CORBA bus. |
| Generic Import Server | Responsible for the import of data and images during an Image Capture session. |
| Repair Server | Responsible for Repair GUI. |
| Export Server | Runs Reconciled Export. |

TABLE 1A

| SERVICE | DESCRIPTION |
| --- | --- |
| Bus Service | At the service and applications level, the Bus Service is responsible for coordination of the entire archive. It coordinates the access that applications need with the services provided by the Bus Services. |
| Bus Applications Service | The Bus Applications service controls communication of the applications that provide application functionality and use of these services on the bus archive. |
| Repository Service | Storage and retrieval of objects (images), i.e., RAID, Optical and Tape, is the responsibility of the Repository Service. However, the Repository Service is not limited to these functions. |
| Indexing Service | Provides the database functionality for storage and retrieval of query data that is associated with objects stored in the Repository Services. |
| Set Service | Maintains the sets of data in the archive and the definition of document type (classes). |
| Parameter Service | Stores parameters and tracks their modification. Parameters are stored in tables (e.g., Sybase tables). The Parameter Service controls the operation of services that need to reference these parameters. |
| Log Service | The Log Service provides a centralized method and location for logging events, and storing messages related to the operation of the bus archive. The messages are stored in tables (e.g., Sybase tables). |
| Redundancy/ Replication Service | Coordination between archives that have parts of their data replicated at one or more locations is the function of the Redundancy/Replication Service. | the servers provide, among other things, the following services:

1. "CORBA" Bus

Among other things, in some embodiments the servers provide a multiple-threaded bus that allows multiple lines of communication to occur between modules of the system. For the embodiment described herein, the bus is based on a CORBA architecture. Other architectures can also be used without departing from the invention.

In general, the Common Object Request Broker Architecture ("CORBA") is a standard created by the Object Management Group ("OMG") that enables operation between different computers, operating systems, and programming languages (e.g., distributive computing). The CORBA standard generally specifies how client applications may invoke requests on server objects. CORBA specifies the Object Request Broker ("ORB") that allows applications to communicate with one another regardless of where the applications reside on a network. Using a standard Internet Inter-ORB Protocol ("IIOP"), a CORBA-based program from a vendor, on almost any computer, operating system, programming language, and network, may communicate with a CORBA-based program from the same or another vendor, on almost any other computer, operating system, programming language, and network. The IIOP specifies how ORBs communicate over networks and can utilize TCP/IP implementation of a General Inter-ORB Protocol ("GIOP"). The GIOP defines aspects of ORB communication including how messages are sent, how bytes are ordered, and how parameters are arranged for remote object invocations.

Creation of a distributed computing system based on the CORBA standard can generally begin with an outline of desired functionality and translation of the design into software objects. The objects are expressed in terms of Interface Definition Language ("IDL") interfaces and collected into related modules. In one embodiment of the invention, the IDL is utilized for creation of Application Programming Interface ("API") definitions that define how the client and host server systems communicate. One or more IDL files are compiled to generate stub code and skeleton code. The stub code becomes the interface that client applications use to initiate an operation from a server and is programming language independent. The skeleton code provides the interface to object implementations that the host and/or virtual servers may provide. Libraries provided through the IDL compilation provide the mechanism for communication between client and host server processes. The CORBA specification ensures that this communication be platform and language independent. Host and/or virtual server applications are created for publishing the object references by name through a naming service and, upon the request of a client application, a reference to a generic CORBA object is returned. This object reference is then narrowed to the stub representation of the remote CORBA object. The client can then invoke operations through the stub reference as if the object was local to the client. Requested operations from the client application are sent to the skeleton reference obtained through the naming service. Using the ORB, CORBA IDL stubs and skeletons serve as a connection between client and server application threads. In addition, each client and server can have threading definitions defined in a Portable Object Adapter (POA), which controls the communication to a CORBA Object by associating the object with the ORB. Each POA service may use single threaded or multiple-threaded communication protocols and the multiple-threaded protocols may be further defined as "pools" of threads or as a thread per client. The machine independence of the CORBA standard, as utilized by embodiments of the invention, allows for multiple processes to communicate across machines, platforms, and languages, thereby providing a distributed computing environment.

In another embodiment, the CORBA communication protocols are utilized to abstract client and server interactions.

Using the IDL, APIs are created that separate the architecture logic. Therefore, the CORBA communication layer acts to "hide" or "mask" the host and virtual servers from the client or business logic. Each server process in the EIMA system 100 can be defined to utilize the multiple-threaded "pools" of threads, thereby allowing non-blocking calls to be handled from a large number of client applications. Each client application can be handled independently and, therefore, do not block each other during communication with the servers. The name service and event service, defined by the CORBA specification, are used to handle name lookups for services and event routing or channeling. In addition, a host or virtual server may execute multiple Generic-Input Applications ("GIAs"), statement prints, and exports at the same time, all of which may execute independent of each other and interact separately with an archive or database. Implementation of the CORBA bus in this embodiment also includes providing object services for use by multiple distributed object programs. These services include domain-independent interfaces such as the naming service, a trading service, a repository service, an indexing service, a set service, a parameter service, a log service, an application service, and a redundancy/replication service. The services are available to CORBA objects and a client may initiate multiple services if desired. For example, a client application may invoke multiple services when interfacing data with input/output ("I/O") devices. Alternatively, multiple threads can exist within the services themselves. For example, depending on the operation, a user or client may invoke multiple threads within the repository service. In some embodiments, the EIMA system may also implement a factory concept whereby a server is a service "factory" that handles queries each time a client connects and requests an individual session. Each session manages its own client and then allows for the abstraction and separation of logic for multiple client applications.

Figure 50:
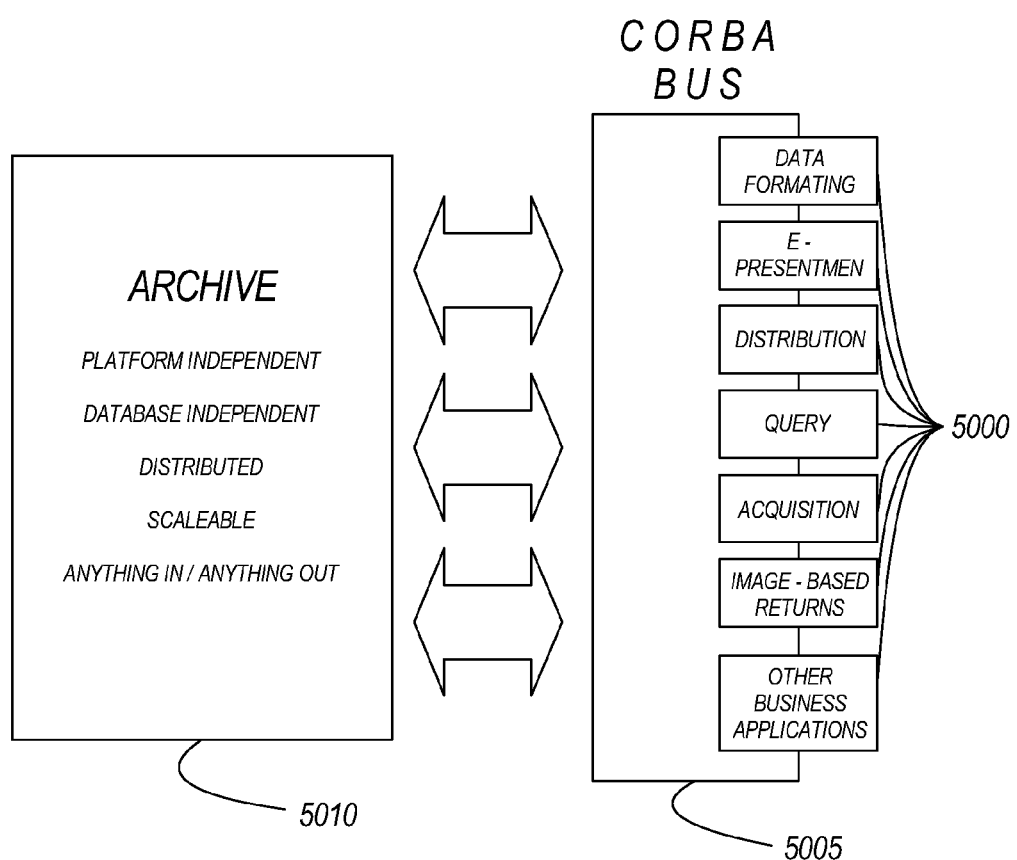
FIG. 50 is a schematic diagram representing the interaction between the CORBA BUS and the archive.

FIG. 50 schematically shows one embodiment of the interaction between a plurality of applications 5000 (discussed below), the CORBA bus 5005, and the archive 5010 (discussed below).

2. Applications

In addition to the software already described above, the host server 110 includes additional modules that interact with the one or more workstations to perform additional operations. This suite of modules generally comprise two sets of modules: 1) management programs and utilities (collectively referred to as management programs), and 2) Web-based user programs. The management programs allow an administrator to control the host server and, more broadly, the EIMA System. The Web-based programs, which run in a Web browser (e.g., Internet Explorer), are accessed from an EIMA Web site and allow users to perform operations (e.g., perform queries, print statements, export objects, etc.) on the archive. Various software modules that interact with the workstation are summarized in TABLE 2 and are further discussed in detail in the operation section. Similar to the servers, not all of the modules described below are required for all embodiments and the host server can include additional modules not described below. The titles of the modules and the division of the functions of the modules are for explanatory purposes only. One or more functions performed by the modules may be combined with other modules. Additionally, the operation section below may include additional modules that are not listed in TABLE 2, but would be apparent based on the description.

TABLE 2

| MODULE NAME | DESCRIPTION |
| --- | --- |
| Server Management | Controls the operation, including starting and stopping, of the servers. |
| Image Capture | Imports images or existing databases into the image archive database. |
| Image Match | Verifies that data in the Match Control File (MCF) matches the captured data in the archive. |
| Reports | Creates various reports. |
| Text File Batch Query (TFBQ) | Lists the required parameters for a text file batch query? |
| Exporting Images | Exports images to a CD-ROM writer. |
| File Management | Manages files and databases including deleting database cycles, deleting databases, and migrating from RAID to optical. |
| Image Print | Retrieves a subset of images from a database cycle for statement printing |
| Repair GUI | Helps control the quality of the Image Capture process by allowing the user to view images as well as correct MICR field data. |
| Optical and Tape Administration | Enables the system to store images on optical disc or tape. |
| Reconciled Export | Exports and distributes the results of a query to a CD-ROM writer. |
| NetQuery | A Web-based program that allows a user to query and view document information and images in a Web browser |
| System Administration | A utility that system administrators can use to control user access and activities in the EIMA system 100. |
| Decision Support | Support adds the capability to NetQuery to manage pay/no pay, pay amounts, and other factors for documents with fields that trigger the capture program's Exception Code generator. |
| TIFF Image Import Utility | Imports TIFF images for the purpose of transferring images from the main location to a satellite location. |
| Batch Update | Updates user fields in a query table after the cycle has been ingested into the archive database |

TABLE 2-continued

| MODULE NAME | DESCRIPTION |
| --- | --- |
| Archive | Store, track, and access images as they are migrated from one type of storage device to another |
| Capture Recovery | Rolls back tables and post information regarding the last item correctly ingested during Image Capture. |
| Verify Capture | Matches items in the flat file with rows in the Index table and provides reports with results of the match |
| MICR Exit | Changes data corresponding to an Image to conform to the data provided in the MCF. |

A number of the applications summarized above form a Generic-Input Application (GIA). The GIA is an application that receives data from the scanner 110, performs operations on the data (e.g., for consistency), and archives the data to one or more databases. The one or more databases form an archive (discussed further below). Example operations performed by the GIA include: Image Capture, Image Match, MICR Exit, Batch Update, and MICR exit.

Before proceeding further, it should be noted that an identifier used for identifying a particular component, application, tool, engine, operation, act, button, etc. is for identifying that component, application, tool, engine, operation, act, button, etc. only, and should not be limiting. For example, the term "Image Capture" identifies an application used by the EIMA system 100 for capturing images. Other terms for identifying the application could be used in place of "Image Capture."

The operations of some of the applications in TABLE 2 are briefly described below. A more detailed discussion of these applications are further discussed in the operations section below.

a. Image Capture

Image Capture allows a user to import images through 1) scanning documents into an archive and then using Image Match (discussed below) to insert images into the database, 2) importing raw files from disk or tape, 3) importing TIFFs or other objects, or 4) importing text documents using the Import Server.

b. Image Match

Image Match verifies the contents of an image database with a user-supplied match control file (MCF) and prepares the images for Image Print. The Image Match process verifies that all images expected for capture were captured and that no extra images exist. Images referenced in the MCF but not found in the database are referred to as missing items. Images in the database but not referenced by the MCF are called free items. After the images are validated by this process, they can be printed with statements (Match for Print). When Image Match is complete, it generates Missing and Free Items reports and appends a record to an Audit report, which lists the processing statistics.

c. Batch Update

The Batch Update feature lets the user update user fields in a query table after the cycle has been ingested into the archive database. In Batch Update, the user loads data from a specified source file or tape in a temporary table. This data file can include all or some of the items in a cycle. The EIMA system 100 finds matches in the cycle with items in the file. Only matched items will be updated with the fixed data in the input file. Batch Update is an option that appears at the end of an Image Match session.

d. Image Print

Image Print controls the statement printing process. It combines statement text data in the print control file (PCF) with the images from the image database to produce statements with images, instead of original items. The resulting imaged statement can be sent directly to the printer and/or to tape for offline printers, mainframe printers, or selective reprints. When the Image Print process has completed, a record that lists the processing statistics is appended to the Audit report.

e. Archive and Optical and Tape Administration

The archive function is used to store, track, and access images as they are migrated from one type of storage device (discussed below) to another. When images are first captured, they are initially stored on the fastest retrieval media (local hard drive) or RAID. After the images have been retained on the hard drive for a designated period of time, they are migrated to other media for more permanent storage. The archiving and distribution functions enable the system to store images on optical disk or tape.

f. Reconciled Export

Reconciled Export allows the user to export and distribute the results of a query to a CD-ROM writer. In one embodiment, the exported images are written as compressed, tagged image file format (TIFF) graphic images. You can use Image Library Offline to view and organize the CD-ROM images.

C. One or More Peripheral Devices 120.

The one or more peripheral devices 120 include one or more memory devices for, among other things, maintaining the archive. The one or more memory devices can include RAID, optical storage, tape-storage and similar storage devices. The one or more memory devices store a plurality of databases that form an archive, which can be of various types including "local" or "distributed." As will become more apparent below, a distributed archive can include multiple local archives.

1. Local Archive

An archive is designed to hold any type of item. That being said it is necessary to have routines to pass items to the archive, export items from the archive, and view items in the archive. In one embodiment, the local archive supports three storage media for image storage and one storage media for indexes.

The three media or tiers of the archive are RAID, Optical, and Tape. The composition of the archive is driven by cost, retrieval time, and/or service agreements. Each media has its advantages and disadvantages. RAID is a random accessible media with the highest cost per byte of storage, but it is self-recoverable and very fast. The cost of this media is falling but it still remains expensive per byte compared to other media.

Optical is a random accessible media, which uses a jukebox to reduce the number of active drives required to provide a level of service. The media is never brought into direct contact with anything that will damage it and as a result it is a very reliable long-term storage media for high activity with long life. This media is the best of the three for long-term storage and retrievability without a duplicate backup. With the ability to use multiple drives at any point in time, this media is highly accessible at a much lower cost per byte stored and can provide the fast access necessary for on-line queries.

Tape is a serial media, which uses a silo to manage the tape media. This is viewed by many institutions as the preferred media for long-term storage even with the need to maintain a duplicate of each media to insure recoverability. The media is brought into contact with the read/write heads and as a result is very susceptible to damage if used highly over a period of time. This media is the least expensive per byte stored but it is also the slowest media. The speed of the retrievals from this media is a direct function of the speed of the drives and the technique used to store the data on the media.

Each industry will have its own migration strategies relating to the movement of the images among levels of the archive. There are several methods to achieve this migration. The following discusses the different methods available to the institutions using an archive of the invention. Unlike previous archives, the archive of the invention moves images from any archive tier to any other archive tier. Also, through the use of different capture processes, the objects being received into the archive can be placed on any tier of the archive and any of the distributed archive locations at the same time. There are many considerations to doing this and just because the archive is capable of it does not mean that it is in the institutions' best interest to use this capability. Additionally, it should be understood that other aspects of the EIMA system 100 can use an archive of the prior art.

a. Migrate from the RAID Tier to the Optical Tier to the Tape Tier

This is the traditional method used by institutions and it allows the institution to purchase the least expensive solution while providing a system that supports good response time and the ability to optimize the data that is stored. This method allows the user to do all repair work on the object and deletion of extra objects prior to the migration to the next level of the archive. Some institutions will migrate from the RAID tier once maintenance is complete to both the Optical and Tape tier at the same time. Many institutions have the ability to store the object at capture time on all Tiers of the archive used by the site. This capability is available through the use of the prime pass capture capability, but the institution looses the ability to optimize the storage of objects identified later. The institution will inherently use more storage because the objects that are deleted during maintenance remain present on the slower tiers of the archive using space even though they are not accessible due to the deletion of the indexes.

b. Direct Capture to any Tier

This is available with the archive of the invention. In one implementation, the capture controller software takes a match control file (MCF) file from the mainframe that has the database to which the item is to be sent, and the document identification number (DIN) number of the item as part of the MCF entry. This allows the capture controller to read the MCF, populate all the data fields, use the DIN number to pull the item images, and send the item down the thread to the proper database. An advantage to the institution of this type of activity is that it avoids the time-consuming migration process from one media type to another. However, a detriment to the institution is that this method does not provide any method of optimizing the way objects are moved to the slower tiers of the archive so as to allow for retrievals that will roughly match the higher speed tiers of the archive.

c. Current Migration Strategy

To avoid the need to go through very time consuming reorganizes of the storage, the objects are migrated in large blocks, which, for example, can represent a days capture. Until all the objects in a block have been migrated, the block space cannot be freed for the storage of new objects. This method works well for all parts of the archive that have random access and if the long term archive tier is used very sparingly this method will also work for the serial tier of the archive. Because many institutions want to go to two tier archives it has become necessary to provide a migration strategy that will organize the object placed on the serial media in a way that will facilitate the optimal retrieval of the objects from this tier. The following defines this optimal migration strategy.

d. Organized Migration Strategy

This method can be used most effectively when an institution has a minimum number of days (e.g., 45 days) of RAID object storage. In this case, the migration takes place over a ten-day period for the previous thirty days of items on the archive. One tenth of the previous 30 days is migrated to tape every day so that after ten days all the items have been migrated. Of course, a different proportion can be used. These items are organized on the tape according to what data elements are used the most to retrieve the object. Once all the items have been migrated from this 30-day period, all the objects are deleted in a way so as to keep the number of days defined in the service level agreement (SLA) on the high-speed tier and the space is freed for the capture of additional objects. Once there is 30 days of un-migrated data on RAID, the 10-day migration cycle begins again. This method of migration is tailored to the maximum retrieval speed of objects on the long-term archive. With 45 days of RAID, the user has the long-term archive optimized on a 30-day bases and the days of storage are used in the following way:

First 30 days of storage period is being migrated.

Second 10 days of storage period is used to migrate the objects from the first 30 days.

Third 5 days of storage period is used as safety to insure that if any problems are encountered in the migration there is time to solve the problems and complete the migration.

Once all the 30 days of cycle objects have been migrated, the server proceeds to delete all cycles until no non-migrated cycles remain then.

The process repeats again after 15 days of no activity (when we are again at the 31 day in a new period).

e. Capture to Database

This capability allows the capture of any object into any database on either a collective basis or an individual object basis. When a capture is started it can be directed into a specific database or, through the use of a front-end capture routine, can route the individual objects to different databases based on the accompanying index data. In the case of an item-processing department, this means that transit items can go to one-database and on-us items to a different database. This also means that the banks that process for other banks can route the items for each of its bank customers to its own database.

2. Distributed Archive a. Introduction

When an institution outgrows a single site environment or would like to have more than one active system to back-up data, a distributed archive can be used. The distributed archive feature allows some embodiments of the invention comprising the EIMA system 100 to add data to multiple separate archives at multiple locations, while providing many threads of internal archive access. The feature supports maintenance and retrieval of archive data from the various sites, in addition to optional long-term storage sites within the network. Each location has all the capabilities identified as basic to the local archive but, through the distributed archive, capabilities appear to each application (e.g., Export, Statement Print, Query, etc.) as if the plurality of archives are one distributed archive.

In one embodiment, the distributed archive is server based and makes full use of the CORBA Bus. The distributed archive server makes all sites look and operate as one. This means that any function that operates at one location can have full access directly to all other locations within the security capabilities allocated to the distributed archive. The speed of the distributed archive is only constrained by the speed of the line connecting the geographically dispersed locations.

To manage the network traffic and to eliminate the delivery of duplicates, the distributed archive includes internal rules. Example internal rules include rules for routing request to the fastest service location and rules that allow for the removal of duplicates prior to responding to a query.

As shown earlier, through the use of the direct capture to a database capability, there is the ability to deliver items to many databases at the same time with each database on different media and locations. An update capability can be used to automate the updating of all locations that house the same item. This capability makes full use of the distributed archive capability of the system to find all locations housing an item that is being updated and then it also is used to update the same items held in different databases as well as at different geographical locations.

In some embodiments, the distributed archive provides the institution with the ability to have different geographical locations, provides full "hot" backup for other locations without forcing the purchase of full redundant hardware at each location and/or different physical servers in a single location (or any combination of physical servers and geographical locations), and/or provides hot backup for other locations (or servers), thus leveraging the use of existing and planed hardware. The loss of a single geographical location does not effect the retrieval of requested information from sites that are operational and, if the same data is redundant in an alternate location, the request is be fully satisfied automatically from the alternate site. If the data is not held at an alternate location or has not arrived at the alternate location, the requesting user is provided with all available data and is notified that a site is down that may have additional data and that the user may want to request that data at a later time. When the site that is down comes back on line, it will connect back into the network automatically and without the involvement of institution personnel.

If the distributed archive is used with a hot backup strategy, then it can be coupled with the appropriate migration strategy. If the institution has enough bandwidth on their network, this synchronization is done through the network. If the institution's network is not robust enough to handle the volume created by image data, it will be moved via tape. When tape is used to synchronize the archives, then, when the tape arrives at the remote location and is loaded into the appropriate tier of the archive, the indexes at the distributed location are updated and a verification record is forwarded to the originating location identifying the fact that the synchronization tape has arrived and is now in the remote location. If no synchronization record arrives after a period of time, a new tape is created to replace the original tape.

Although specific installations may vary on the basis of hardware and/or network configuration, the functionality remains the same for some embodiments of the invention. The use of CORBA and Java enable the EIMA system 100 to run on any operating system and hardware, regardless of platform, database, operating system, programming language or network hardware/software used. The distributed architecture is highly scaleable and is sufficiently dynamic to accommodate a verity of potential archive systems. Further, the Java programming enables the system to link to other Web-centric applications (e.g., online banking).

In some embodiments, the distributed archive contains multiple sites all of which have the capability of querying across connected sites. A set of user-defined rules determines the level of query capability accorded to each user of the system. Query capability is the functionality of being able to search the system indexes on the basis of an individual object attribute or combination of object attributes to find the token necessary to retrieve the desired object. Query capability can be either local or global. Retrieval of an object on the basis of a call with a token argument is not considered query capability, it is simply a retrieval operation supported by a low-level media specific local index.

Upon the completion of either prime pass capture, utilizing Image Import, re-pass capture, MICR repair, match and missing/free item resolution (all of which are discussed further below), a captured items index is stored and available for query and retrieval. If any changes occurred in the index data as a result of any of these activities and the objects have already moved to the alternate location(s), then update index data should automatically be forwarded to all locations now housing the object. Access to these items, as well as items captured at other sites within the distributed environment, will be facilitated by the appropriate distribution Proxy(s). The Proxy Servers provide the ability to submit requests and return responses from multiple distributed locations without any user intervention. This ability to satisfy individual query and retrieval requests by gathering responses from multiple sites is the foundation of Distributed Archive.

Items captured at a particular site can remain at that site on any installed and supported media (magnetic disk, optical platter or tape) for as long a period as is suitable to the needs of the installation. This time period could be as short as one day or could be counted in years. Additionally, captured data can be exported in whole or in part to one or more Global Archive Sites at any time and then be deleted from the original source location once it is confirmed that the data has been successfully archived at the new site. This deletion indicator only indicates that the item is eligible for deletion. The actual deletion is governed by the local archive parameters.

In a purely geographically distributed archive, indexes reside on the same server as the tables showing the physical address of images on various media. To the system, physical locations may appear as a single virtual index.

b. Use of the Distributed Archive in Providing Institutions with Items.

In one embodiment, users of the distributed archive are institutions with multiple facilities that are used for item processing. The institutions typically have network connections between the associated sites (e.g., a WAN). However, the system configuration can be adapted based on the user's access needs, locality of reference, and desire to modify existing network connectivity. The network speed and traffic pattern can dictate the objects are moved via sneaker-net via the high-speed network. An institution having the distributed archive can also be a very large processing center which has many clustered capture platforms, each operating independently, but to the user being viewed as a single unit.

In some embodiments, every location is considered a master location; there are no slave or redundant locations. When objects are moved from one location to another, that data is imported into the new location and the introduction of a new item into an archive cause no action except the update of the object and index archive. If any index item is read for the purpose of updating a query, the index item is set to all locations to determine if that index set is held at a different location. All locations that respond instruct to make this index set read only for the duration of the update operation.

All updates to the indexes are distributed to all locations having the same index set. This is done by monitoring the write operations, retaining all the changes to the indexes, then issuing a distributed query for the item that was changed and sending the changes to all locations responding that this object is held at the location. If any location fails to respond, the update is held until a response is obtained from the location that the item updated is not housed. Once all sites are updated then the read only lock can be removed from all other locations.

Security features exist on two levels in some embodiments: 1) within the application and 2) through the login and password features provided by the database management system. The security facility within the application is used in establishing a connection to the database data server.

By consolidating similar objects together, the archive reduces the number of tapes involved in retrieval and makes more objects available on a single tape storage media. As an example, if a subpoena was received for all items that were received for an account over the previous 4 years, this request would be processed as follows:

(Present Process) Each cycle is migrated to tape and depending on the size of the tape there can be any number of cycles on a tape. For purposes of this example there will be only one cycle per tape and one required object per tape. With 260 cycles per year this would mean to satisfy this request would mean that it would be necessary to mount 1040 tapes less the number of cycles still on tiers 1 and 2 assuming at least one item is received daily.

(Organized Migration Strategy) The number of days of items on a single tape is a function of the number of days of tier 1 storage that the institution has purchased (see Organized Migration Strategy earlier in this document). If there are 45 days of tier 1 storage, then a single tape will have 30 cycles worth of objects for this account grouped together on a single tape. This would mean that to satisfy the request the system would only have to mount 35 tapes less the number of cycles still on tier 1 and 2. This represents 3.37% of the mounts when compared to the prior art systems and the number of mounts will go down in direct relationship to the number of days of tier 1 storage that is maintained.

In some embodiments, the virtual sorter front-end to GIA provides the ability to take a feed from any device either prime pass or re-pass and route the objects through the use of rules to any database. The database thread to which the item is routed retains its ability to have a MICR exit tied to that thread only. When the transaction exit capability is added to the virtual sorter the institution now has the ability to populate a transaction identification field identified in the class definition for the type of object being captured. The composition of a transaction is defined by rules contained in the exit and is independent of the rules used to route an object to a database. The application of the transaction rules is done prior to the application of the routing rules.

The following example is how item processing can use the above capabilities to maintain the content of a deposit as a transaction:

In this case the items are arriving from the prime pass and each deposit ticket precedes the checks associated with the deposit.

The exit rules state that whenever a deposit ticket is encountered a unique identifier is to be generated and inserted into the transaction identification field.

The exit rules further state that the current unique identifier is to be placed in the transaction identification field of any object encountered that is not a deposit ticket.

Once the transaction exit rules have been executed the object proceeds to the routing rules which can state anything, but as an example the following has been defined: any item with this institutions route/transit number will be sent to the On-Us item database, any item having a different route/transit number will be sent to the Transit item database.

Once the objects are in the archive the user can make use of the index database and define different views of the archive based on how the user wants to use the items in the archive. The transaction field may or may-not be part of the data used to create these specialized views. In most cases these workflow related archive views will be only available for specified periods of time and will be used for very special work processing.

Through the use of this capability the user can structure any views they please of the archive no matter whither the items are held in the archive in different databases at their local facility or at different locations. In the case of the financial institution these views can include: all-items in Capture Sequence, cash letter (which can have multiple document types tied together by unique deposit identification), on-us (or account) number order, route/transit number order, exception items (which can be by type, institution, etc.), high dollar amount, etc.

c. Site Management Reports

To better manage the distributive archive it may be necessary to provide more and better reports on what is going on within the archive. These reports can take the form of screen and paper reports, and can be used to balance the transaction activity within the archive.

As an example of a management report, the system can balance the number of items received from a sorter with the number of items sent. Further, the system can balance the number of images that should have been sent against the number received and archived by database. In one embodiment, these reports address all parts of the system in such a way that there is no function performed in the system without appropriate balancing and management reports.

This balancing and management reporting can include: capture, export, print, queries, and inventory.

d. Performance Requirements

The performance of the distributed archive is largely dependent upon the network configuration. The system architecture is designed to minimize the data to be sent over the network by limiting network activity to remote procedure calls and image movement upon query requests only. Large data movement between archive sites is targeted for high-volume media such as tape. However, nothing in the system design will preclude the use of a network for large-scale image movement for institutions who wish to invest in network communications with sufficient bandwidth to support that activity.

e. Export to a Remote Archive

Export to a remote archive allows for data captured at any site to be exported to any other location. The export media can be a tape, which can then be physically transported to another site. Alternately, the network connection can be utilized for an export to a remote site. Export can also be directly to an NFS mounted UNIX file system or a PC based Remote File System (RFS).

Once transported to the new site, the information can be reingested into the remote archive through the GIA module. Once the data is successfully ingested into the archive a message can be sent to the originating site indicating that the original data has been successfully migrated and it can be deleted when its retention time expires.

Due to the large volumes of data to be exported, the exported data will be drawn directly from the local archive as the export is in progress, only a catch large enough to insure maximum network transmission speed will be maintained.

f. Example

Figure 3:
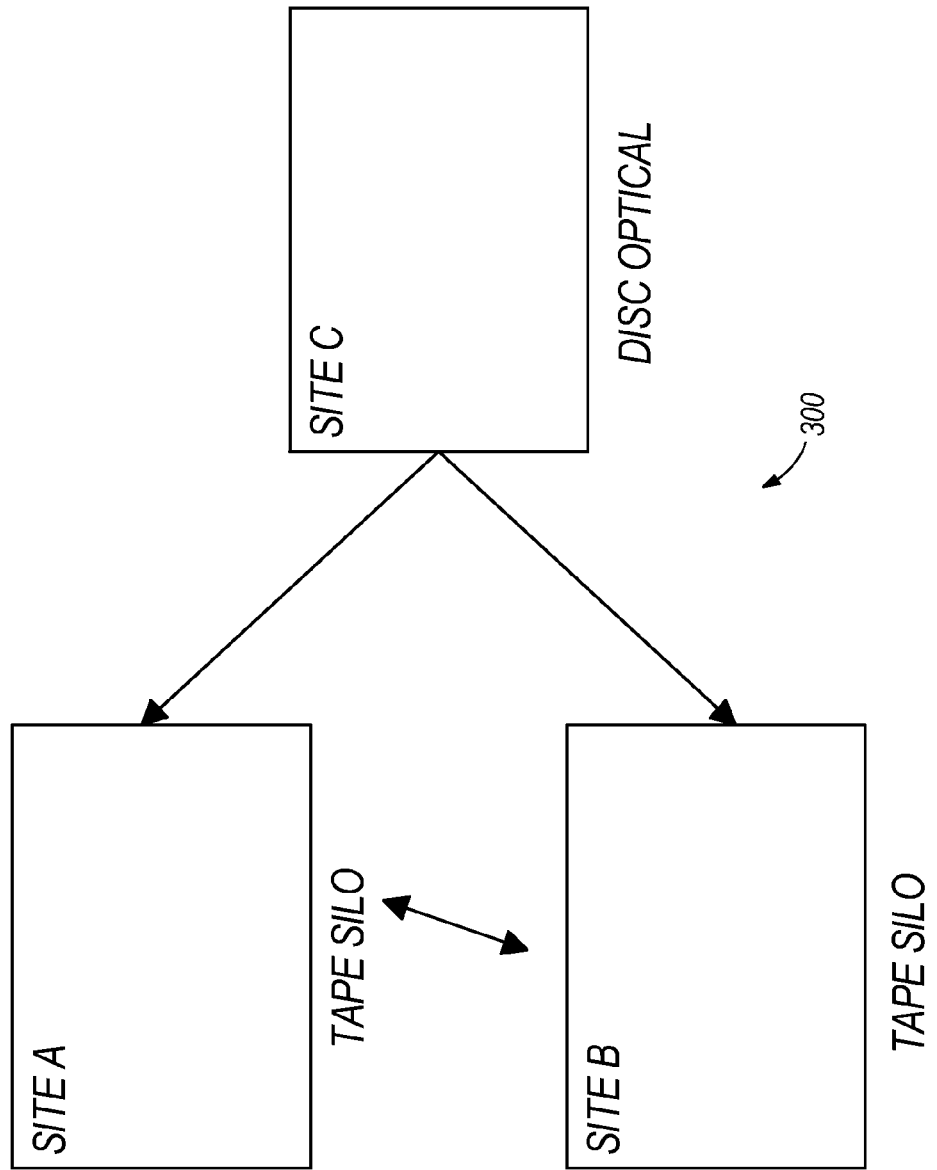
FIG. 3 is a schematic diagram showing a distributive archive.

An example of a distributed archive 300 configured in accordance with some embodiments of the invention is shown in FIG. 3. Site A sends its data to Site B for backup and Site B sends its data to Site A for backup. Since Site C does not have a tape silo and it keeps only 180 days on raid and optical. Site C sends their data to both Site A and Site B. For this embodiment, there are two copies of Site C's information. The end result is that there are two copies of all data. Distributive Archive allows multiple copies to be at multiple locations and allows a site (e.g., Site C) to search multiple sites. Site C can use the distributed network to obtain the data as fast as possible and based on its location and the network speed to either Site A or Site B.

g. Functional Description

Figure 4:
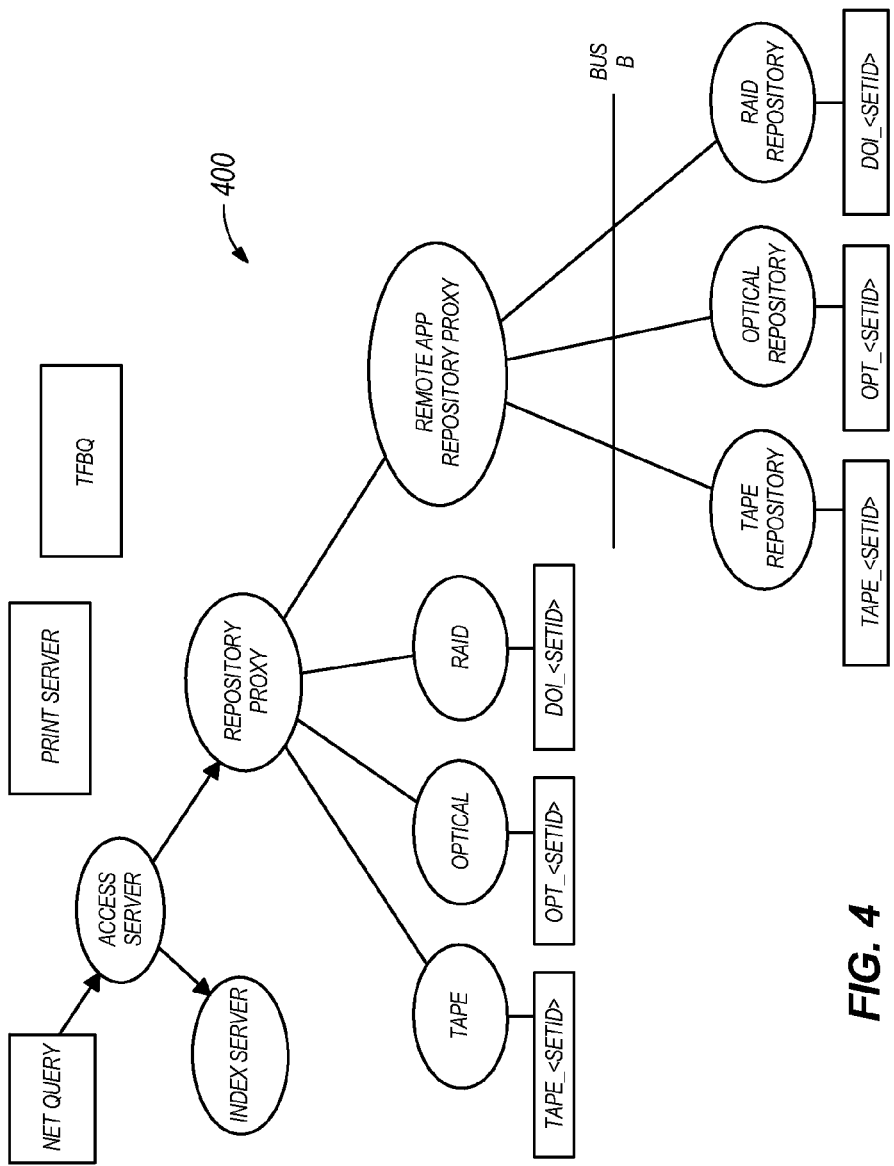
FIG. 4 is a schematic diagram showing the interaction of repositories in a distributed network.

For a local archive, a Repository Proxy Server manages communications with Optical Repository, Tape Repository and Disk Repository. For a distributive archive, in one configuration, each repository creates a Remote Repository Proxy. The Remote Repository Proxy communicates with the local Optical Repository, Tape Repository, and Disk Repository, but it will also log into the remote buses locations and communicate with the Optical Repositories, Tape Repositories, and Disk Repositories (See FIG. 4).

When the Remote Repository Proxy is called, it is provided with a list of items needed. The indexes are retrieved without starting actual image retrieval until the user tags the image as needed. A similar proxy can be used for the index database.

h. Other Peripheral Devices 120

As will become apparent below, the one or more peripheral devices 120 can include other devices such as a printer (e.g., Xerox, IBM, and HP-PCL compatible printers) for printing statements, an optical disc writer (e.g., a CD-ROM writer), a communications port for sending facsimile transmissions or electronic communication (e.g., email) transmissions, or other known peripheral devices.

D. One or More Workstations.

In some embodiments, the one or more workstations 115 provides an interface between the EIMA system 110 and a user or administrator, provides requests or instructions (both also referred to as inputs) to the host server 110 (which are initiated by the user or administrator), receives information from the host server 110 (e.g., originating from the archive), and provides information to the user. An example workstation is a personal computer. However, other workstations are possible including Unix machines, laptop computers, handheld devices, Internet appliances, and similar devices. The operation of the workstations for initiating an application (e.g., a query, an export, a statement printing, etc.) are further described in the operations section below.

Figure 2:
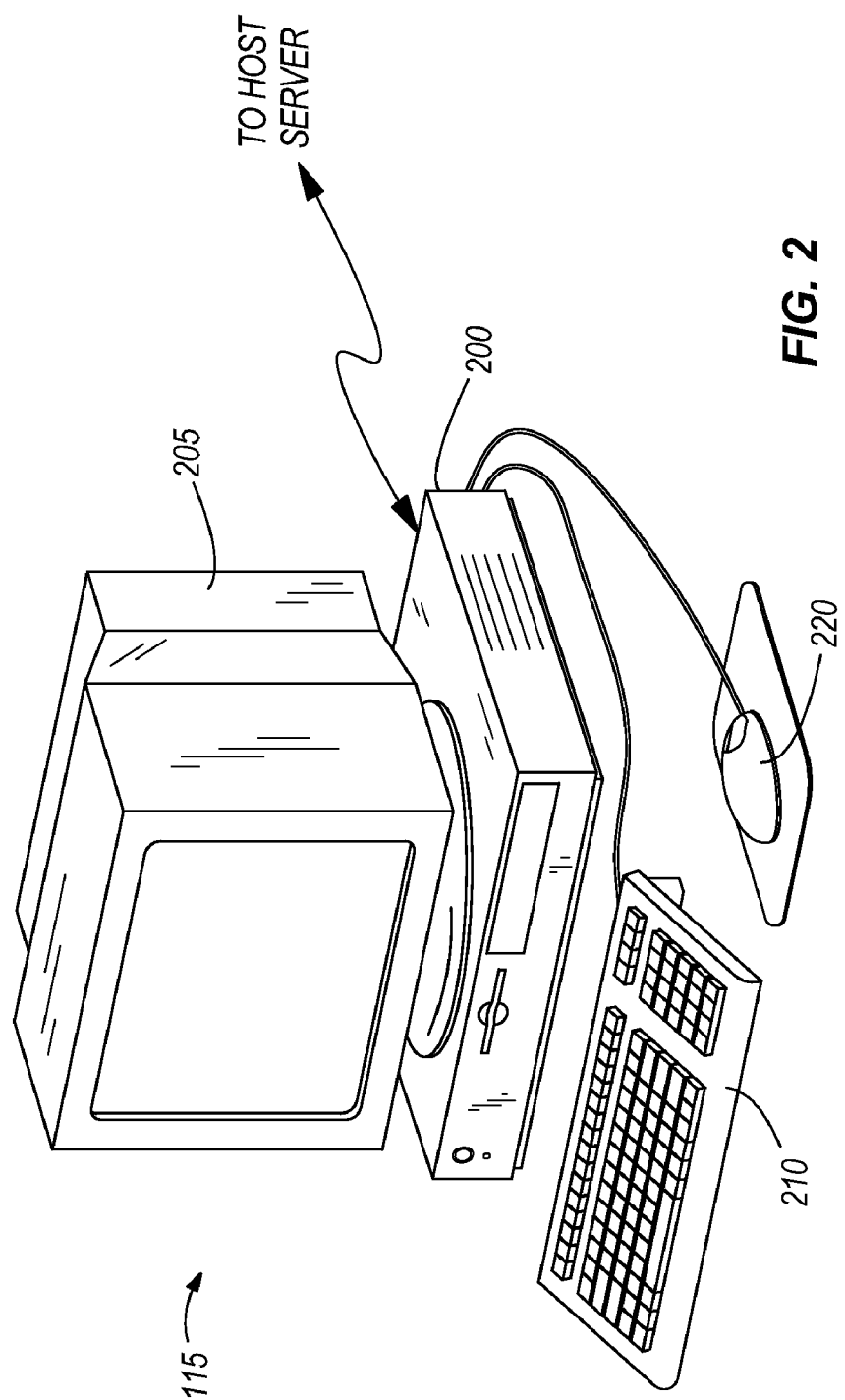
FIG. 2 is a diagram of a workstation.

A diagram of one workstation 115 is shown in FIG. 2. One specific workstation is an Intel™ based computer employing a Windows™ operating system and an Explorer™ browser. Other types of computers with appropriate operating systems can be used.

The workstation 115 includes a communications port 200 for communicating with the host server 120, one or more input devices, and a visual display unit 205. In one embodiment, the one or more input devices includes a keyboard 210 and a mouse 220 that allows a user to input data to the workstation 115. Other data input devices can be used including a keypad, trackball, touch screen, touchpad, pointing stick, microphone or similar device. The input devices 210 and 220 having a corresponding driver program stored in the workstation allowing the workstation to communicate with the input devices 210 and 220. The corresponding driver program for the mouse 34 is a pointer driver program that generates a "pointer" on the display unit 205. The pointer driver program allows the pointer to be moved on the visual display unit when a user manipulates the mouse 220 and to select items when the user pushes buttons on the mouse 220 in a prescribed order. Of course other input devices can have corresponding driver programs and can perform functionally similar to the mouse 220.

II. OPERATION

A. General Description

While the discussion herein relates to scanned documents (and specifically checks) other objects, including video and audio objects can be imported, archived, and exported. The names of the modules (or applications) below are for explanatory purposes only. The operations performed by most of the modules described below can be extended to other types of objects. Additionally, none of the modules described below are essential to the invention, although many embodiments use many of the modules.

1. Image Capture

Image Capture allows a user to import images through 1) scanning documents into the EIMA archive and then using Image Match (discussed below) to insert images into the database, 2) importing raw files from disk or tape, 3) importing TIFFs or other objects, or 4) importing text documents using the Import Server.

For checks, Image Capture inputs scanned images and associated MICR data and then stores the MICR data in a temporary table. Any records with invalid MICR data are automatically flagged for repair, and Repair GUI (discussed below) is used to validate these records.

2. Image Match

Image Match verifies the contents of the image database with a user-supplied match control file (MCF) and prepares the images for Image Print. The Image Match process verifies that all images expected for capture were captured and that no extra images exist. Images referenced in the MCF but not found in the database are referred to as missing items. Images in the database but not referenced by the MCF are called free items. After the images are validated by this process, they can be printed with statements (Match for Print). When Image Match is complete, it generates Missing and Free Items reports and appends a record to an Audit report, which lists the processing statistics.

3. Batch Update

The Batch Update feature lets the user update user fields in a query table after the cycle has been ingested into the archive database. In Batch Update, the user loads data from a specified source file or tape in a temporary table. This data file may include all or some of the items in a cycle. The EIMA system 100 finds matches in the cycle with items in the file. Only matched items will be updated with the fixed data in the input file. Batch Update is an option that appears at the end of an Image Match session.

4. Image Print

Image Print controls the statement printing process. It combines statement text data in the print control file (PCF) with the images from the image database to produce statements with images, instead of original items. The resulting imaged statement can be sent directly to the printer and/or to tape for offline printers, mainframe printers, or selective reprints. When the Image Print process has completed, a record that lists the processing statistics is appended to the Audit report.

5. Archive and Optical and Tape Administration

The archive function is used to store, track, and access images as they are migrated from one type of storage device to another. When images are first captured, they are initially stored on the fastest retrieval media (local hard drive) or RAID. After the images have been retained on the hard drive for a designated period of time, they are migrated to other media for more permanent storage. The archiving and distribution functions enable the system to store images on optical disk or tape.

6. Reconciled Export

Reconciled Export allows the user to export and distribute the results of a query to a CD-ROM writer. In one embodiment, the exported images are written as compressed, tagged image file format (TIFF) graphic images. Image Library Offline can be used to view and organize the CD-ROM images.

B. Operation of One Embodiment of the EIMA System

1. Overview of the Main Menu of the Host Server as Accessed by a Workstation

Figure 5:
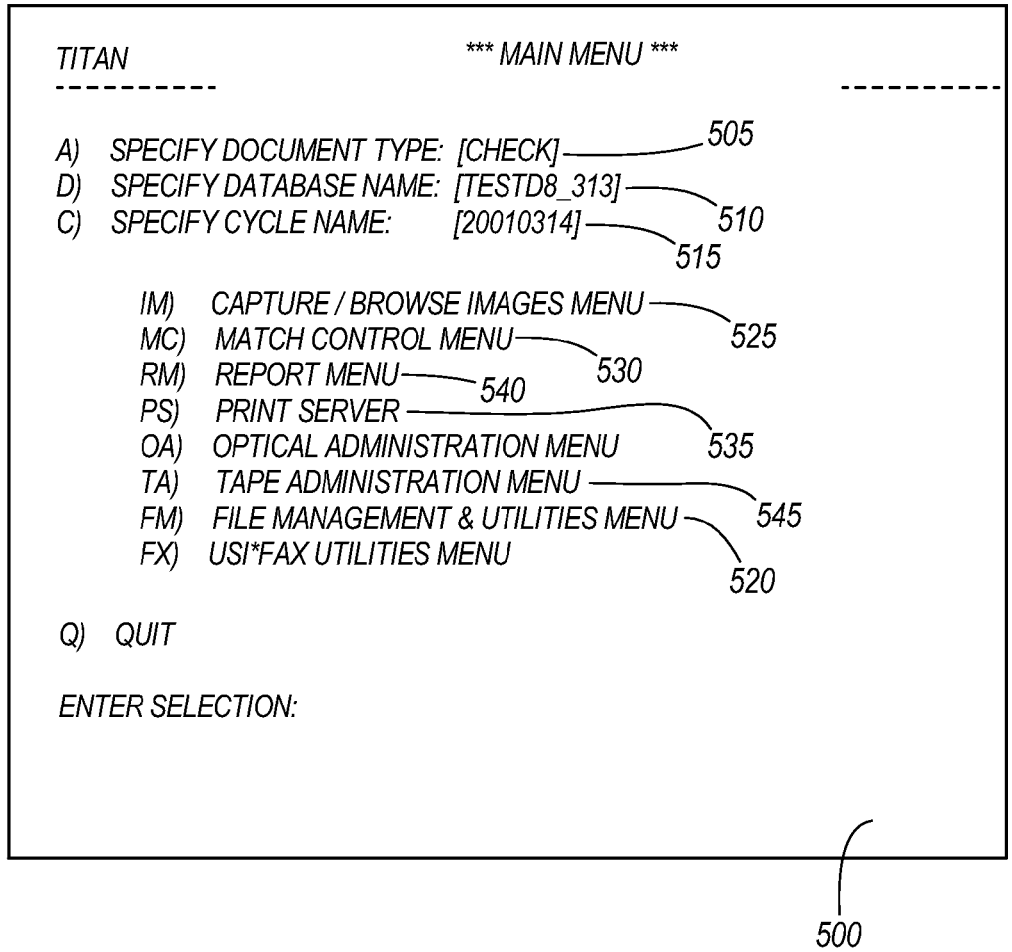
FIG. 5 is a screen print of the Main Menu of the Host Server.

FIG. 5 is a screen print of the Main Menu 500 of the host server 110 as accessed by a workstation 115. To access the Main Menu 500, a user establishes a TELNET session using the workstation 115 to the appropriate host (e.g., Unix) server 110 as is known in the art. The user then enters a login name and password. Assuming the login name and password are correct, the user enters the name of the Main Menu 500 at the prompt (e.g., Unix prompt). The Main Menu 500 then opens. The Main Menu 500 contains options for setting the document type, database, and cycle, and also has options for launching the submenus of system modules.

Before most EIMA system 100 procedures can be performed, the user specifies the document type, database, and cycle on which the user wants a particular function to be run. However, setting the database and cycle is not a prerequisite for all EIMA procedures. For example, running Reconciled Export (discussed below) does not require the user to select a database and cycle. The user can tell which document type, database, and cycle is currently selected by viewing the text in brackets (505, 510, and 515) that appears after the first three main menu options. In the example shown in FIG. 5, the selected document type is Check, the database is TestDB_313, and the cycle is 20010314. The user can change the document type, database, and cycle by entering text in the appropriate field.

2. Server Management

The user verifies that a server is running by checking if the server's abbreviation appears in the List of Servers on the Application Server Termination Program menu 600 (FIG. 6). If the server abbreviation appears on the list, then the server is running. If the server abbreviation does not appear on the list, then the server needs to be started.

Figure 7:
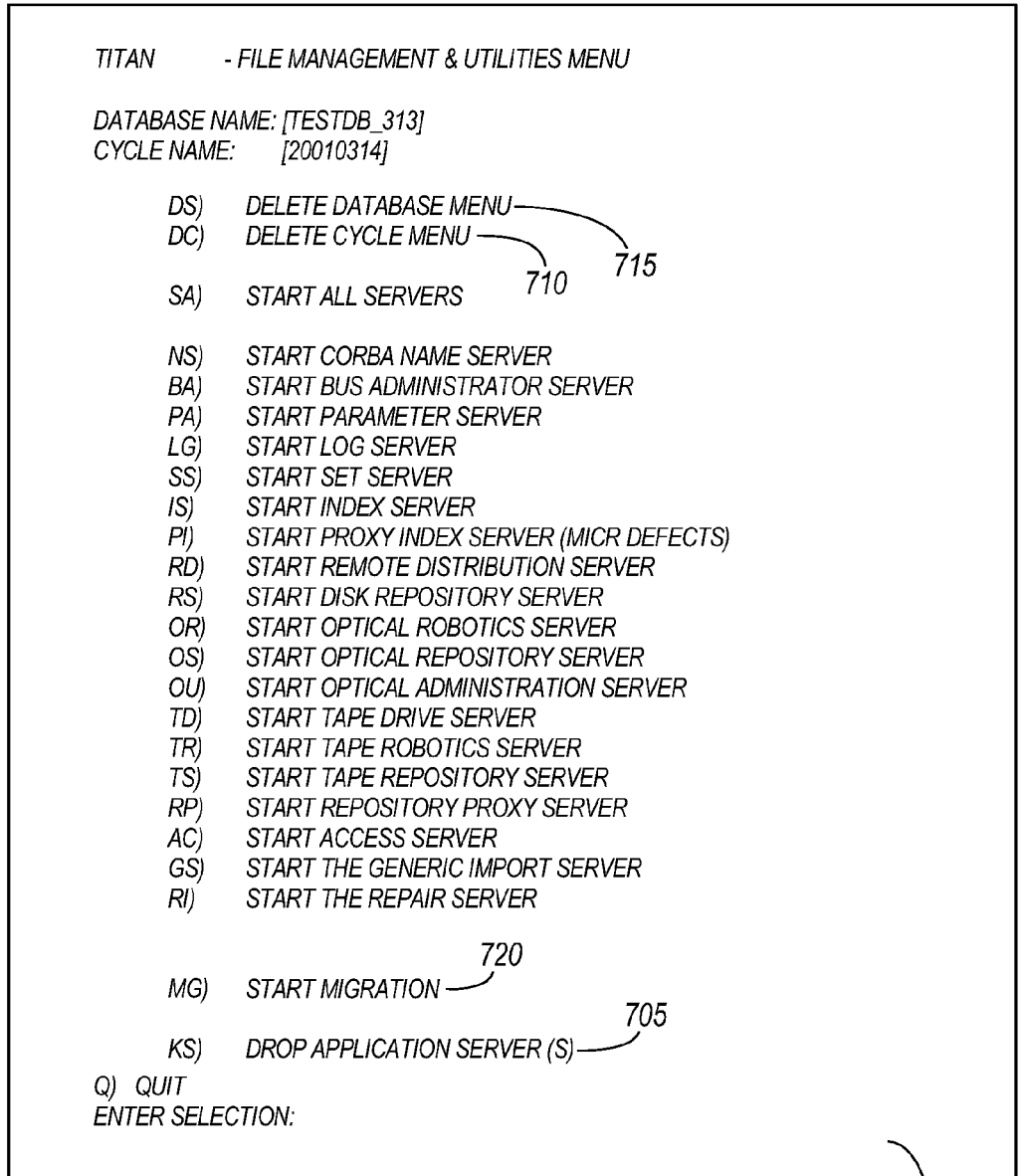
FIG. 7 is a screen print of the File Management & Utilities Menu.

To get to the menu of FIG. 6, the user selects the File Management & Utilities Menu option 520 (FIG. 5). At the File Management & Utilities Menu 700 (FIG. 7), the user enters the Drop Application Server(s) option 705. This results in the Application Server Termination Program Menu 600 being displayed. The Application Server Termination Program Menu 600 provides information on the status of each virtual server. For the embodiment shown in FIG. 6, the Application Server Termination Program Menu 600 uses abbreviations, which correspond to the servers shown in TABLE 1, and, if the server is listed, then the server is running. Further, entering the number of a server and then pressing Enter stops that server.

3. Image Capture a. Overview

Image Capture should be performed for the desired documents before the user runs Image Match or Image Print. The user can import images into the EIMA system using the following methods: 1) Scanning documents into the archive and then using Image Match to insert images into the database, 2) importing raw file data from disk or tape (raw file import is used for testing only), 3) importing objects (e.g., TIFF images), 4) and importing text documents using the Import Server.

Image Capture transfers the document images and associated information (MICR code) from the scanning device to the host system, reviews each MICR code for correct syntax, stores the images and associated information in an image database, scans and stores the special images used by Image Print, and/or adds a record to the Audit report that lists the processing statistics. The images and their associated MICR data are supplied from the scanning device(s).

(i) Parameters

Image Capture requires that the images and associated MICR data for a specific database/cycle name and image capture parameters. The parameters that define Image Capture processing requirements are defined in a Default and Override Parameter files. The Default Parameter file is used by Image Capture each time it is executed. It is also used by all databases in the environment.

(ii) Quality Monitor

During Image Capture, Quality Monitor can display a sample of the images as they are added to the archive. Quality Monitor displays a new image according to the user-specified time increments (e.g., seconds). See the discussion for Repair GUI below for more information on using Quality Monitor.

(iii) Multiple Scanners

Multiple scanners are supported by executing separate copies of Image Capture software concurrently. The concurrently running copies of Image Capture can be output to separate databases or the same database. Access to a separate Main Menu 500 is required for each software copy of Image Capture.

(iv) MICR Errors

The user corrects any MICR errors detected by Image Capture by using MICR Repair. The user performs MICR repair any time after Image Capture is started. After Image Capture and MICR Repair have been completed, the user is ready to initiate the Image Match process to validate images and associated data against the match control file (MCF). After Image Match is complete, the user can run the Image Print process to print images and associated data on customer statements.

(v) Batch Tickets

If the user runs Incremental Match, the user can scan a batch ticket prior to scanning the corresponding batch of items or type the Batch ID at the Main Menu 500. A batch ticket is a MICR-encoded document that contains a four-character ID that uniquely identifies the batch. The batch ID is appended to the Match Control File name when the file is brought into the system using File Load. In this way, the scanned images are matched to the correct MCF.

b. Image Capture for Systems Using Match

The user begins Image Capture when he is ready to scan a new batch of items. If the user uses the Windows version of Quality Monitor, the Quality Monitor program is running on the client. Scanned images are stored in an image database that is identified by a unique combination of database and cycle name. When the user is ready to capture images, the user can create a new database and cycle for the new set of images or can append the images to an existing database. The database and cycle names may be predetermined by predefined procedures and the name can be related to a corresponding match control file (MCF).

In one embodiment, the user performs the following acts to capture document data and images into a database cycle:

At the Main Menu 500, the user enters the Capture/Browse Images Menu option 525 resulting in the Capture/Browse Images Menu opening.

In the Capture/Browse Images menu 525, the user enters a Capture Using GIA gate option. If the system has more than one scanner installed, the user will see a Capture Source Menu to select a scanner. This results in the user connecting to a scanner PC. Typically, the scanner typically comes with a controller PC that communicates with the host system.

When the Ethernet connection to the scanner is complete, the user can then begin scanning documents. The steps for starting a scanner varies based on the scanner type. Two example documents that can be referred to for operating the scanner are DP500 Administrator's Guide for Unisys Scanners and NCR 7780 Users Guide for NCR scanners, both of which are published by ImageSoft Technologies of Maitland, Fla. A sample of the images can be displayed on the Quality Monitor workstation if that option is activated. As scanned images are added to the system, Image Capture statistics are displayed in a text window. These statistics include total images stored, image size, total MICR defects, and the scanning rate.

After completing the scanning of the items, it is preferable that the user shuts down Image Capture to prevent database corruption. To shutdown Image Capture after items have been successfully scanned, at the scanner controller PC, the user exits the scanner controller program as specified by the scanner when all items have been scanned and the scanner hopper is empty. A message indicating that a successful shut down occurred should appear at the workstation.

c. Capture Recovery

If Capture terminates as a result of an user error or system problem such as a server returning an exception, the Capture Recovery process can accurately roll back tables and post information regarding the last item correctly ingested. The capture recovery process on the host system is as follows:

When Capture is interrupted, Capture Recovery displays information about the last item captured successfully (committed to the database). The user should not rely on the scanner's report of the last item it captured (scanned) successfully. Rather, the user must use the last item that Titan reports as successfully captured and ingested.

Reboot the scanner controller to flush the scanner buffer.

Reload and scan the items into the scanner that did not get captured successfully.

d. TIFF Image Import Utility (i) Overview

The user can import TIFF images from tape, CD-ROM, a UNIX processor or other devices for the purpose of transferring images from a main location to a satellite location or for importing special document types. The TIFF Image Import Utility supports 3480 (square tape), Quarter Inch Cartridge (QIC), CD-ROM, UNIX process, 8 mm tape, Digital Linear Tape (DLT), Tiff Import using GiaGate (imports directly into the archive without using Micr Repair/Repair GUI or Image Match), and Import from third party applications.

(ii) Importing Tiff Images

To import TIFF images, the user performs the following acts to capture images from tape:

Initiate two separate Telnet sessions and proceed to the main menu in both Telnet sessions.

Establish the database cycle in both Telnet sessions.

Choose the Capture/Browse Images Menu 525 (FIG. 5) for the first session.

Choose a Capture using GIA gate option (TIFF Import).

Choose the Capture/Browse Images Menu 525 (FIG. 5) for the second session.

Choose Capture Using GIA gate.

Performing the above acts connects the second work session to the Tape Import Process running in the first session. It also provides information about the number of images sent to the defined database cycle. When all the images are imported, the host displays information in the second session screen that includes how many images you added to the database. It also shows MICR data for the last check images.

After the process has ended, the host also displays information in the first session screen that indicates the image count and the number of skipped bytes. It is normal for the process to skip bytes. The user can validate the success of the import process by selecting Browse Item Images from the Capture Menu or viewing images in NetQuery.

e. Overview of Importing Images

As an alternative to scanning the images directly into the Image Archive database through the Image Capture program, the user can use Image Import to convert an existing image database to the format used by Image Archive and use the Import server to import the images into the archive.

(i) Archive Import API

Due to the unique aspects of an existing image database, each client may need a specialized interface that connects to Archive Import API. The user can also use a Generic Importing Application offered by ImageSoft Technologies of Maitland, Fla. The Generic Importing Application (GIA) resides over the Archive Import API and acts as a socket server to more easily obtain the images from other platforms.

A ScanGate II program resides on the host system and is an import application that receives images from the network and imports them directly into the Archive database using the Archive Import API application. Although ScanGate II can accept images directly from an Image Soft scanner application, its main purpose is to receive images from another image system where the images have already been validated and associated with other control information. Images and data that have been ingested by ScanGate II are not sent to the ImageSoft MICR Repair system.

(ii) Image Sets

The existing image database may already have assigned names that identify the sets of images, but these names need to be converted to the format used by the Archive. During Image Import, a database/cycle name is assigned to each set of images imported from the image database. For the EIMA system 100 described herein, the cycle name should be in the format YYYYMMDD, which typically represents the original processing date for the set of images. The database name/set name typically represents the customer or business entity owning the images or if desirable this may represent the type of image.

4. Image Match a. Overview of Image Match

For reconciliation purposes, Image Match is used to verify that data in the user-provided match control file (MCF) matches the captured data in the archive. Image Match also allows the user to view free items, move items, and insert missing items into the archive. The Match Menu also contains an option for clearing the currently selected match file. The Match procedure is performed after the user has scanned MICR data and images and resolved MICR problems, and before images can be queried and viewed in an image viewing program, such as Net Query (discussed below).

Image Match also provides ability to add additional search fields to each of the image records using Batch Update. Batch Update allows the user to update the captured data with additional field data that is not part of the original MICR data. For example, the user's company may require that a microfilm number be added as a search field to all the records in the captured data. Image Match further provides the ability to generate match statistics reports.

For the embodiment described herein, Image Match is required for Image Archiving and Distribution and Statement Generation. The Print server is used to organize images before statement generation (discussed below).

When documents are scanned, the data from the MICR line is captured and then ingested into the image capture index in the archive. When Image Match is run, data in the MCF is compared to the captured data in the archive. Image Match looks at specific fields in both sets of data, and then attempts to verify if the data matches or does not match. Following the Image Match process, a match statistics summary that details the results of the match session is displayed onscreen.

Each MCF record preferably contains MICR data, including the fields required for Image Match, group ID and period in statements, and user fields. Each record in the captured data contains information about the corresponding image including MICR data (made up of the account number, serial number, amount, transaction code, and transit/routing number) and the fields required for retrieving the image from the database (e.g., the image location and the size of the image). The MICR data corresponding to the image may have been changed by a MICR Exit program to conform to the data provided in the MCF.

The Match Control Menu (MC) option 530 of the Main Menu (FIG. 5) is used to access the Match Control menu, which includes a perform match option on the Match Menu to initiate match. ScanGate II users do not need to run Image Match for archiving and distribution.

b. Types of Match

For one embodiment, two levels of match are run. One level or both levels of match can be processed during Image Match. The user sets parameter to determine which fields are used to perform the match assessment. The actual fields that Image Match uses for data verification vary depending on the user's operational needs.

The first level of Image Match is by account field, serial field, and amount field. This type of match attempts to match the two sets of data using the account number, serial number, and amount fields; and then optionally, by the transaction code field and transit routing number field. If Image Match is unable to make a match against these fields, it will try to match the data against the account number field and the serial number field, and then, optionally, using the transaction code field and transit routing number field.

The second level of Image Match is by account field and amount field. This type of match attempts to match the two sets of data by comparing the account number field, and amount field, and then, optionally, by the transaction code and transit routing number fields. This match is used only after the other items in an account have been matched by the account number, serial number, and amount fields. Other criteria of levels for performing a match are possible.

c. Initiating Image Match

The Image Match process allows captured data and images to be available for query and viewing in the Net Query program. After running Image Match, missing and free items are generated, and the user can generate a Free Items report, a Match Statistics report, a Missing Items report, and an Audit report. In addition, Image Match can perform statement printing.

During an Image Match session, the user will have an option to run a batch update. Batch Update allows the user to update the captured data with additional field data that is not part of the original MICR data.

When performing a match, the match database and cycle should be selected. Additionally, the user should start (if not already running) the CORBA Name Server, the Set Server, the Bus Administrator Server, the Proxy Index Server, the Parameter Server, the Disk Repository Server, the Log Server, and the Repository Proxy Server before performing the match.

To run Image Match, the following acts are performed:

Open the Match Menu:

At the Main Menu 500, the user enters the Match Control Menu option 530, resulting in a Match Control menu 800 (FIG. 8) opening. At the Match Control menu 800, the user navigates the software resulting in the initiation of the Image Match process.

The user then selects the Enter Batch ID option 805. A Batch ID list appears for the user's review. At the Batch ID list, the user selects the batches for the matching procedure. After selecting the batches, the user is returned to the Match Menu 800.

Figure 9:
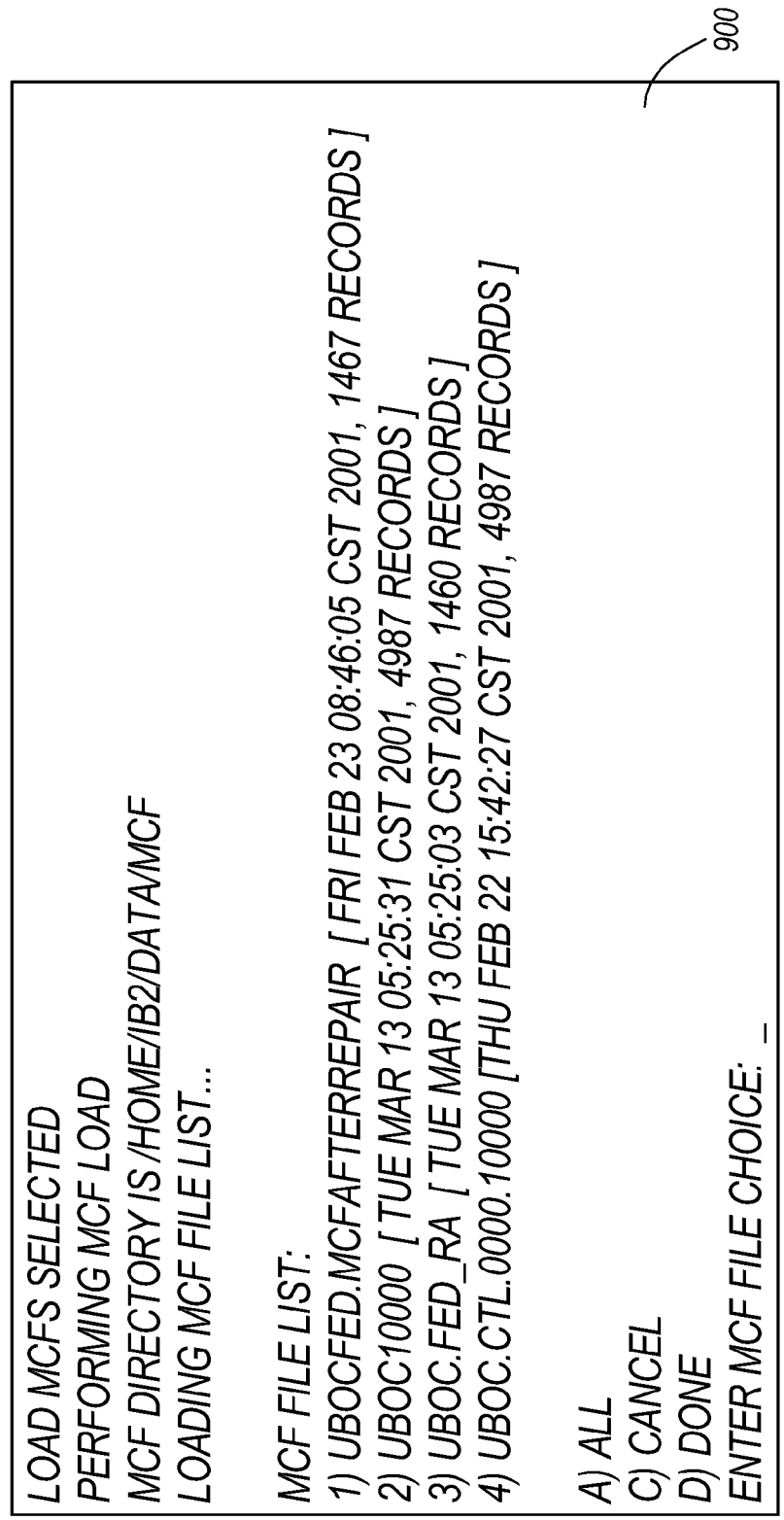
FIG. 9 is a screen print of an example MCF File List.

At the Match Menu 800, the user selects the Load Match Control File(s) option 810, resulting in an MCF File List being displayed. An example list 900 is shown in FIG. 9. The user then selects the correct MCF files from the MCF File List 900 corresponding to the batch files. After selecting the MCF files, the user is returned to the Match Menu 800.

At the Match Menu 800, the user selects the Perform Match option 815. This results in the Image Match process beginning. Upon completion, a summary of the match results displays and then the free item selection prompt appears.

The user can then perform a free item selection. After free item selection is performed, a directory of the defect items is displayed, and then the Batch Update prompt appears. At the Batch Update prompt, the user can populate the captured data with additional field data. A list of match summary results is displayed and then the Image Match process is completed and the user returns to the Match Menu 800.

d. Resetting Match

The resetting match options clears the temporary match space. For example, if user loads the wrong match file, resetting match will clear the match file, so that the user can load the proper match control file.

e. Correcting Free and Missing Items

If any missing or free items are noted in the onscreen match results summary, the user can correct these items and then rerun Match. Free items are extra images that have been noted in the capture data, but not in the match control file (MCF). Free items indicate that there is a discrepancy between the number of items in the capture data and the number of items in the MCF.

Missing items occur when there are records in the MCF with no corresponding images. There is usually a direct correlation between the number of free items and the number of missing items.

Free items can be the result of scanned items that do not belong in the current database cycle or incorrect MICR data. If a large percentage of free items appear on the report, there was likely a mechanical problem during Image Capture. It is possible that the wrong tray was scanned or not all of the trays were scanned. In this case, the user runs Image Capture again. If the percentage of free items is small, the discrepancies are probably the result of incorrect or illegible MICR data. In this case, the user needs to release the images to the MICR Repair workstation for correction. Once the MICR data is repaired, the user should be able to run Match again without error. To correct the unmatched items, the user performs the following acts in this embodiment of the invention:

At the Match Menu 800, the user verifies that the selected document type, match set, and batch ID settings are correct. The user then selects the Free Item Selection option 820. The system flags the free items for MICR Repair.

The user then uses the MICR Repair workstation discussed below to correct the MICR data for the free items. After completing all the corrections, the user runs Image Match again.

If the report still lists Free Items, then the user either use the MICR Repair Skip command to delete the item if the item is invalid, or corrects the MCF if the item is valid but not found in the MCF.

If there are still missing items listed in the report, then the user either scans the item into the data base and then reruns Image Match if the item is valid, or corrects the MCF if the item is not valid. If the user cannot locate the missing item, then the user can assign a surrogate image in its place. If the missing item is located later, the user can scan the item into the database and then rerun Match.

After all problems have been corrected, the user selects the Free Item Group Move option from the MATCH MENU to move the items into the archive.

5. Verify Capture a. Overview of Verify Capture

If the image data is captured 'clean' (i.e., defective data has been repaired and the MICR exit has taken place), then after capture takes place, the index tables are set as matched. If, however, the user would still like to verify whether all the items that have passed to GIA are actually stored in the archive, then the user can provide a text file containing a user-defined set of fields to be matched against. The match fields can be configured through the parameter service. Verify Capture matches items in the file with rows in the Index table and provides reports with results of the match. Verify Capture provides match statistics, a list of missing items, a list of free items. The differences between Image Match and Verify Capture include: Image Match performs match incrementally, Verify Capture does not, Image Match only matches those items that are marked as "unmatched" and Verify Capture matches items that are already marked as "matched," Image Match updates a user-specified set of fields from items in the MCF file and Verify Capture does no updates.

To perform Verifying Capture, the user navigates from the Main Menu 500 to the Verify Capture option. Upon initiation of Verify Capture, the MCF file is loaded and matched against the database and cycle. The match results are displayed. The user can then generate capture reports.

6. Text File Batch Query (TFBQ)

a. Overview of Text File Batch Query (TFBQ)

To export a selected group of images to media such as a CD-ROM, the user can create a text file that includes query criteria and destination specifications. This file is called a Text File Batch Query (TFBQ).

The TFBQ can be created on a PC using any ASCII editor that does not embed formatting characters into the file. The file can also be created on a UNIX system using "vi", the text editor for Unix systems. Once created the user creates the file, moves or copies the file to a directory on the host system and then executes the file to locate the images.

Each TFBQ includes of one or more queries or jobs. Jobs are written using the following guidelines:

Each job has at least one valid query ID or an actual query specified.

A job can contain pre-existing NetQuery type query ID's to be exported and/or the user can specify actual queries to be submitted to Query Server and then exported to Export Server.

Every job has a job name.

Every job has a customer name.

Every job has a job type field.

A job can have multiple destinations denoted with the start/end destination pair.

Every destination has a media ID or destination ID.

A destination has an image format.

Any fields that are not required can be omitted and will receive a default internal value.

Comments within the text file can be specified using a comments character (e.g., #) Anything starting with the character and ending with a newline character will be designated as a comment.

7. Exporting Images a. Overview of Reconciled Export

Reconciled Export allows the user to export check items and images that meet a specific criteria to a CD-ROM writer (other method of deliveries are possible). Once the job has been exported to the CD-ROM writer, the user can create CD-ROMs that contain the query results of the TFBQ. The CD-ROM's can then be distributed for viewing with an Image Library Offline program. An example Image Library Offline program is offered by ImageSoft Technologies of Maitland Florida. The scope of items that are exported to the CD-ROM writer is determined by the Export Job's query criteria. A text file batch query is used to specify each export job's query definition and destination specifications.

Prior to running Reconciled Export, the user should verify that the export job's query and export destination parameters are defined in the TFBQ, the export job's TFBQ and corresponding match control file (MCF) are placed in the correct directory, the export job's parameters are set in the job control file (JCF) and then placed in the correct directory, and the Export server is running.

During Reconciled Export, the user reviews the Job List report that is updated after the user starts the export process. The Job List report shows if any missing items have been found for a particular export job. If missing items have been detected, the user should correct these items and then rerun Image Match. A Missing Item report can be generated from the Export Reconciliation Menu. After a successful export, the export job is released to the CD-ROM writer for CD-ROM production.

b. Overview of the Job Control File

The Job Control File contains the parameters that are used to process an export job in Reconciled Export. These parameters define the export job's name and the directory locations of the files that contain the query specifications, and the MCF and report data. A job control file can contain multiple export jobs. Before running Reconciled Export, the job control file parameters should be set. The job control file parameters include JOB_NAME, TFBQ_FILE, and MCF_FILE parameters, which are typically required; and REPORT parameters, which is optional. The JOB_NAME parameter designates the name of the export job, which is generated before and after Reconciled Export. The TFBQ_FILE points to the location of the text file batch query (TFBQ) file in EIMA system. The TFBQ file contains the export job's query criteria and the destination specifications. The MCF_FILE points to the directory location of the match control file (MCF). During Reconciled Export, data in the MCF is compared to the captured data in the archive. The MCF contains the MICR data, the Group ID, and period in statements, and the query fields. The REPORT parameters point to the location of an optional report file.

c. Overview of the Job List Report

The Job List report is generated and updated during the Reconciled Export process to help the user track the progress of the user's export jobs. The Job List report shows the before and after status of the export jobs. Before items are exported, the Job List report lists the number of items that will be exported to the CD-ROM writer, and if any missing items were detected. After items have been exported to the CD-ROM writer, the Job List report shows the ID that was assigned to each export job.

The Job List report provides the batch that contains the items and images that will be exported to the CD-ROM writer based on the query criteria in the text file batch query (TFBQ), the Name of the job as specified in the job control file, the number of items that met the TFBQ's criteria and the number of items that will be exported to the CD-ROM writer, the number of items in the batch but missing from the MCF, and the number assigned to the export job. This number assigned to the export job can be used to track the progress of the export job. If the user uses the Job Manager or Resource Manager program, the same export ID number that appears in the Job List report is shown in both of these programs.

d. Running Reconciled Export

The Reconciled Export process enables the user to export images to a CD-ROM writer by loading the job control file that contains the query specifications. If missing items are detected, the user has the option of viewing a Missing Item Report.

To export images to a CD-ROM, the user performs the following acts:

At the Main Menu 500, the user selects the Reconciled Export option, resulting the Reconciled Export Menu.

At the Reconciled Export Menu, the user selects the file he wants to export. A message appears asking if the user wants to run Reconciled Export on this file. If the user answers positively, the user sees a series of messages indicating progress.

Upon completion, an option is given whether the user wants to view the Missing Items Report. If the user answers positively, the user views the Statistics Report.

After viewing the Statistics Report, the user can export the images to CD. If the user answers affirmative, the images are submitted to CD and a job id number is displayed. To track the status of existing export jobs in the EIMA system, the Job Manager program can be used to troubleshoot, customize, control, and monitor jobs by export ID number. The Resource Manager program is also available for creating new media destinations.

8. File Management a. Deleting a Cycle

The user can delete a database cycle from the following locations:

TABLE 3

| SERVICE | DESCRIPTION |
|---|---|
| RAID repository | Selecting this option deletes the database cycle from the RAID repository. |
| IDX service | Selecting this option deletes the database cycle from the module that keeps track of item descriptors or query tables. |
| Set service | Selecting this option deletes the database cycle from the module that tracks database and cycle names |

To delete a database cycle from one or all of the following locations, the user performs the following acts:

At the Main Menu 500, the user selects the File Management & Utilities Menu option 520.

Figure 10:
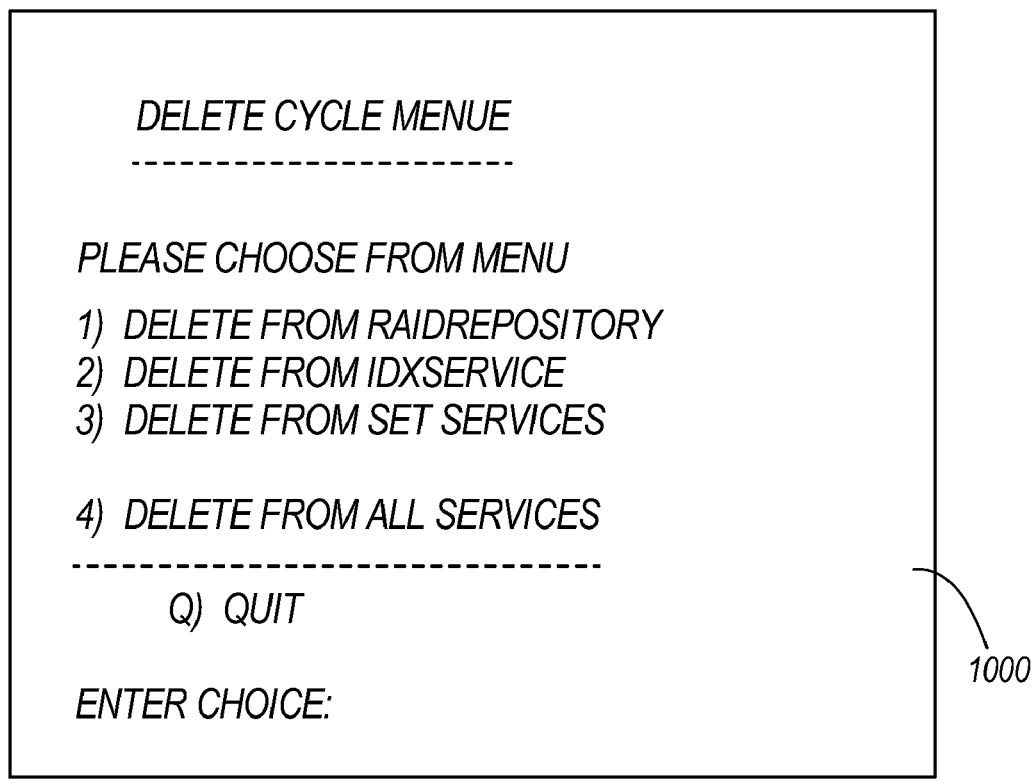
FIG. 10 is a screen print of the Delete Cycle Menu.

At the File Management & Utilities Menu 700, the user selects the Delete Cycle Menu option 710. The Delete Cycle Menu 1000 opens as shown in FIG. 10.

The user then enters the number of the repository or service that the user wants the cycle to be deleted from. The cycle is deleted from the selected location and the Delete Cycle Menu 1000 changes to reflect the remaining locations where the cycle still exists.

b. Deleting a Database

Deleting a database permanently removes the database from the archive. Before the user deletes a database, the user should delete all cycles within the database.

The user performs the following acts to delete a database:

At the Main Menu 500, the user selects the File Management & Utilities Menu option 520.

The user then selects the Delete Database option 715. The user can then select a database to delete. That database is deleted from the archive.

c. Migrating from RAID to Optical

Migrating from RAID to optical allows the user to move a copy of the document data and image files in a particular database cycle from disk (RAID) to an optical device. The migration process enables the user to free up disk space. After the user has successfully migrated the files from disk to optical, the user can delete the database files from disk. The Optical Repository server and the Optical Robotic server need to be running. To migrate images from RAID to Optical, the user performs the following acts:

At the Main Menu 500, the user checks that the correct database and cycle that he wants to migrate to RAID are selected. The user then selects the File Management & Utilities Menu 520 option.

At the File Management & Utilities Menu 700, the user selects the Start Migration option. The user then chooses the source (e.g., RAID repository) and the destination. Once the source and destination are selected, the migration is performed.

d. Restoring from Tape

The Restore procedure for multi-file backup is the same as the standard restore procedure except that now the system keeps track of cycles that the user has backed up and their corresponding tape Volume IDs. The system will request that the user mount the specific tape Volume ID for the cycle he has selected to restore.

9. Image Print a. Overview of Print Server

The purpose of the Print Server is to allow the user to retrieve a subset of images from a database cycle for statement printing. For example, the user can have a database that contains all items for an entire month, or the user may want to pull out items for customers who require statement print. The user uses a match control file to match up the items that he wants to print. The user can then run statement print for the clients that require it.

The print server retrieves the objects directly from the archive database. Any objects received and placed into a new cycle are in a format that is immediately viewable by NetQuery. In addition, the Print Server allows the user to export print images to a remote server for printing purposes instead of on the main host system.

b. Retrieving Images Using the Print Server

The following steps refer to two different servers: a main server and a receiving server. To retrieve images using the Print Server, the user performs the following acts:

At the Main Menu 500, the user selects the File Management & Utilities Menu 520 and starts the GIA Server if it is not already running.

From the Main Menu 500, the user selects the Database containing the source images and one of the cycles containing images.

From the Main Menu 500, select the Print Server option 535. The Print Server Menu appears.

The Source Set Dates identify the range of processing dates to determine whether to retrieve an image for printing. If Source Set Dates are incorrect, the user changes the range.

The user sets the destination set name that corresponds to the database name. This name should be typed as it exists on the destination server or the execute print function will fail.

The user sets the destination cycle date. The user should have already created a cycle with this date on the destination server.

If the user wants to change the print export to a remote machine, then the user types the name of the remote machine. The user is then prompted to enter the name of the port on the host.

The user selects the MCF for MCF File Specification. The system provides a list of all existing Match IDs. The user selects one or all of the available Match IDs.

The user then selects the Execute option. Messages appear indicating the success of the process. Messages are posted to a log report as well. The user can use NetQuery to confirm that the images reached the cycle successfully. If the user runs this process again from a second range of cycles, the additional images will be added to the images already present in that cycle.

c. Overview of Image Print

Image Print produces account statements with both text and images in some embodiments of the invention. Image Print retrieves images that are predetermined by Image Match from the image database, processes them, blocks them on a page, and formats them for a particular laser printer with the appropriate header information. It then merges the images with statement text data in an output data stream to a designated printer and/or tape drive.

(i) Surrogates

If the user has defined surrogate images, they will be printed in place of any missing items during the Image Print process. Parameters for surrogate images may be defined using the Parameter Menu.

During the Image Print process, communications software controls the actual transmission of documents to the output device. The ability to format customer statements for output to a laser printer, and merge the statement text with the blocked images, is an important Image Print feature.

(ii) Different Statement Formats by Database

If the user wants to modify the format of statements by groups of account numbers, the user must place all image statements for a set of accounts in a single database and use the Parameter Menu to modify the format parameters. In addition, Image Print parameters provides the user with several options for increasing efficiency and controlling presentation of the final output.

Types of parameters the user can change by database include:

(a) Page Formatting

Arranges text information on statement and image pages. For images, the user can specify page size and margins, page numbering, duplex support, image placement, and image bordering. For text data, the user can specify font, print position, and include text lines on image pages. The user can add text such as serial number and amount on or under the images.

(b) Account Separator Images

The user can use Account Separator Images to separate multiple accounts associated with the same customer for consolidated printed statements. This is necessary when a customer (single customer number) has several accounts. The user can create up to 99 different line separators by using the Image Match line parameter. The line separator can be a simple as a horizontal line or it can be more elaborate.

(c) Statement Splitting

Splitting statement printing into batches is a very useful and timesaving function of Image Print. This function enables the user to specify how Image Print processes statement information for maximum efficiency.

(d) Good/Bad Split

Statements identified as having exceeded a user-specified ratio of missing or bad images can be processed into a separate file for further processing while good statements continue through the printing process unhampered. For example, the user can specify that each statement missing more than three individual images and/or more than 10 percent of total images is bad.

Good/bad splitting is executed from the Print Control Menu and is controlled by parameters specified in the default and/or override parameter file. If the specifications designated by the parameters are exceeded, the statements are processed as bad.

The user may find it beneficial to use the Good/Bad Split function even if he does not require the statements to be split. This Split function performs many of the same processes as Print, but in a fraction of the time. This provides a way to review for errors before running Print.

(e) Volume Split

Statements can be sorted into different print files according to their size (volume) as defined by the user in the parameters file. This enables the user to use printing and processing hardware in a more efficient manner. The user can direct large volume files, grouped for example by zip code, to special handling equipment or configure equipment in the fashion which best suits each type of printing session.

(f) Defining Output Segments

The document sets that are produced by Image Print can be grouped into output segments, so that one segment can be completed and begin printing while later document sets within the same job are still being formatted.

(g) Defining the Target Printer

Statements can be formatted for a variety of Xerox, IBM, and HP-PCL compatible printers. The target printer may have special parameter requirements.

Before running Image Print, the following conditions should exist:

Image Print parameters should be defined—Image Print parameters provide information for page formatting, headings, printer channel assignments, splitting routines, etc. As many sets of parameters can be maintained as are required to meet different processing requirements. For example, a banking institution may require one set of parameters for printing account statements and another for money market accounts. During the initial installation period, a trial and error approach to adjusting parameter specifications may be necessary in order to fine tune the statements' final presentation.

All required images should be present in the image database—Image Match should have successfully run.

All images which are referenced by the Match Control File (MCF) should have been added to the image database by Image Capture. The images remain in the same format in which they were received from the scanner in some embodiments of the invention.

The Print Control File should be loaded and ready for processing—For standard Image Print runs, the Print Control File (PCF) is built by the institution's account processing procedures. The PCF contains the body of the standard statement text and determines the accounts to be printed and their sequence.

Image Match processing for the proposed run should be complete—The Image Match process uses information contained in the user-produced Match Control File (MCF). The MCF is generated by the institution's account processing system and this information is then used for Image Print.

d. Printing Directly to HP or IBM Printers

Before printing statements, the user defines the print parameters (e.g., identifies page formatting, headings, etc.), defines the load parameters (e.g., identifies where the files are located, PCF exit program to use, etc.), and defines Capture, Match, and Archive Parameters. The Capture, Match, and Archive parameters determine scaling of images, levels of matching, etc. Additionally, the user obtains a Match Control File (MCF), obtains a Print Control File (PCF), and retrieves image objects from different cycles. To print directly to HP or IBM printers, the user performs the following acts:

From the Main Menu 500, the user checks the Database/Cycle name.

Assuming the Database/Cycle name is correct, the user selects the File Load Menu. At the File Load Menu, the user loads the current file load parameters.

The user then selects an input media (e.g., tape, disk, etc.) The Current File Load Media toggles to the media type.

If the input device is tape, then the user loads the tape containing the file; and when the tape drive indicates it is "online," the user types the input filename. While the file is loading, status messages display indicating if the file was found and if it was loaded successfully.

If the input device is Disk, the user enters the filename. When the file is loaded, the user can run Image Match as discussed earlier to verify accuracy of the MCF.

After running Image Match, the user loads the Print Control File (PCF). The acts to load the PCF can be similar to the MCF.

From the Main Menu, the user selects the Print Control Menu. The user can run the "Good/Bad Split." To do this, the user starts the Image Print process for the good items while researching any Missing Items. After correcting the missing items, the user runs Image Match again and prints the remaining "bad" image statements still marked as "bad" by the system. If the user runs Good/Bad split, the user is prompted whether to print all statements, only good statements, or only "bad" statements.

The user should type the letter of choice and press Enter. Statements are printed either to tape or to a specified printer depending on the configuration of the system. While Image Print is running, a processing status message displays on the system console that indicates the number of statements processed. When the Image Print process is complete, messages and processing statistics display on the system console. Press Enter to return to the Print Control Menu.

e. Printing to Tape

In addition to printing directly to HP or IBM Printers, the user can print to tape. The user first obtains the image objects, MCF and PCF as discussed in the previous section. The user then loads a blank tape into the tape drive. Typically, a minimum of two blank tapes, one for the index and one for the data is required. After loading the tape the user "prints" the information to the tape. When this process is complete, the user takes the data tape to the printer that the user uses for printing the statements. The user loads the tape into the print controller's tape drive. The user can then print the statements.

f. Direct Printing to Xerox HPIP

An HPIP server processes the print stream in a manner that replicates data as if it came from a tape. The EIMA includes an HPIP board and HPIP software in a workstation allowing the user to print directly to the printer at a faster speed. The user first obtains the image objects MCF and PCF as discussed earlier.

The user then performs the following acts to directly print to the HPIP as follows:

On the printer console, the user determines if the SDI (Shared Disk Interface) is already started. If it is not started, then the user starts it.

On the HPIP server, the user stops and starts the spooler as is known in the art.

Also at the HPIP server, the user starts the Print Manager by either clicking the printer icon in the lower-right of the screen or clicking on Control Panel and then clicking on Printers. The Xerox job window should open with an area to display the spooled jobs as they occur.

At the Main Menu 500, the user confirms that the database and cycle are set correctly. The user then selects the Print Control Menu option and initiates printing. The files are then sent to the Print Manager on the PC, and, then, the PC sends the files to the Xerox console and statements are printed.

g. Generating a PCF

Using the Print Control File options in the Support Menu, the user can customize bank information and control printing of separator pages. The user performs the following acts to generate a PCF from the EIMA system 100 instead of loading a specific PCF from another system:

From the Main Menu 150, the user selects the Support Menu option. In the Support Menu, the user selects the option for creating a Print Control File (PCF). The user can use standard separator pages. In addition, the user can create or change back information for the statements. The result is a PCF for printing statements. If the user wishes to print images statements via network transmission, this can be done via the Image Export Menu using a TCP/IP connection and BLAST software or using other suitable connections and software.

h. Miscellaneous Topics Relating to Printing

If the print jobs are large and taking up too much space on the hard drive of the workstations, the user may want to divide the jobs into segments.

Occasionally, individual statements may be damaged or lost after they have been distributed to customers. After processing images, some customers delete the images from the database. Deleting the images makes it impossible to recreate the run or perform restarts to reprint lost or damaged statements. Implementing an archiving procedure allows the user to access copies of the text and images required for statement reprinting.

Image Print provides a reprint utility that can be used to reprint statements which is archived to tape at the end of each Image Print run. Each run also creates an index that is saved to tape or disk depending on the selection in the parameters. The archive records are similar to the records written to the statement output file, except that each statement is preceded by a header record simplifying the statement identification.

The reprint capability enables the user to print a single statement or a range of statements from an index tape. To reprint statements, the user can reprint to a tape first and then print, or can reprint directly to the printer.

To reprint, the user performs the following steps:

From the Main Menu 500, the user makes sure the database and cycle names are correct. The user then selects the Print Control Menu option.

The user then selects the reprint option. A UNIX text editor, vi, is loaded with the reprint request selection file. Other editors can be used as well.

The user then specifies the statements to be reprinted. Statement records must be referenced by a customer number. The user can enter as many lines in the request file as are necessary. Customer numbers should be entered in exactly the same format as in the original MCF. The user can print by customer number, print by logical ranges of customer numbers, or print a range of statements based on where they physically fall on the media.

The user then saves the file and is prompted to run Reprint. Assuming the user provides an affirmative response, the user enters a database and cycle name, and is prompted to load the index file or tape. As Reprint processes the request, the user is prompted for input tape numbers as produced by the print program. If the user is reprinting to tape, as each output tape is created, the user is prompted to switch the current tape with a scratch tape. After writing a scratch tape, the user is prompted to replace the input tape. If the user is reprinting directly to the printer, the user does not receive prompts for tapes. The output is sent to the printer.

10. Reports a. Overview of Reports

To get information about specific activities in the EIMA system, there are several types of reports the user can run. Reports can be viewed onscreen or printed. The system uses a report browser in some embodiments. TABLE 4 below, provides a description of these reports.

TABLE 4

| TYPE OF REPORT | DESCRIPTION |
| --- | --- |
| Audit Reports | Audit reports provide logs of user activity and usage, including capture data and query activity, in the EIMA system. Audit reports can be filtered by a particular service. Each record in an Audit report is preceded by an A. |
| Log Reports | Log reports show informational error and warning messages that have been generated by EIMA services. Log reports can be filtered by a particular service. In log reports, the following characters appear before each log |
| TYPE OF REPORT | DESCRIPTION record to indicate the type of log message: I - Indicates that the log message is informational. W - Indicates that the log record contains a warning. E - Indicates that the log record contains an error message. |
| Match Statistics Report | Match statistic reports contain the following information about a particular Image Match session: The total number of processed images and statements; the total number of MCF records read, matched and not matched; and the total number of records written. |
| Free Items Report | Free item reports list the images in a particular batch that have not been requested by the MCF. The report data is sorted by time of capture. |
| Missing Items Report | Missing item reports show items that are present in the MCF but that do not have corresponding images in the database. The total number of unmatched records appears at the end of the report. |
| Cycle Location Report | Cycle location reports list the repository location of cycles in a particular database. |
| Optical Jukebox Occupancy Report | Optical jukebox occupancy reports display information about the optical jukebox's platters, slot and volume numbers, side, and availability. |
| Tape Repository Reports | Tape repository reports contain information about cycles that have been migrated to tape; how much space is available on a specific tape volume; and the current status of tape devices. | b. Overview of Audit Reports

Audit reports allow the user to find out information about user and system activity by a particular service. The example shown in FIG. 11 shows a sample Audit Report 1100 that has been imported into an Excel spreadsheet.

With reference to FIG. 11, the type of report column 1105 contains the alpha code that indicates the report type. In this example, an A indicates that the record contains an audit-related message. The date column 1110 shows the date and time that the message was generated by the service. The source column 1115 lists the service that generated the message.

In Audit reports, the message column 1120 contains several fields of data, and a comma parates each field. The fields in the Message column vary depending on the service that generated the message and the activity that was logged. The six fields in TABLE 5, are found in most Audit report records.

TABLE 5

| FIELD #/ POSITION | FIELD | DESCRIPTION |
| --- | --- | --- |
| 1 | <hostname> | The UNIX host server generating the log. |
| 2 | <processname> | The system process that was performed. Examples of system processes are Access Factory, Set Utils, Migration Menu, and GIA-Session. |

TABLE 5-continued

| FIELD #/ POSITION | FIELD | DESCRIPTION |
| --- | --- | --- |
| 3 | <procpid> | The process ID of the logging program. |
| 4 | <date> | The date that the process occurred. |
| 5 | <time> | The time that the process occurred. |
| 6 | <logtype> | The type of log entry. A log entry describes the process that occurred. |

To generate an Audit Report, the user performs the following acts:

From the Main Menu 500, the user selects the Report Menu option 540 thereby opening the Report Menu.

At the Report Menu, the user selects the option for preparing an Audit Report. The user then views the report in the Report Browser.

c. Filtered Audit Report

The Filtered Audit report allows the user to get information about user and system activity by a particular service or services. The user is able to select which services' messages are included in the report. Information in the Audit report, of one embodiment, is listed by date, message source, and message.

To generate a filtered Audit Report, the user performs the following acts:

At the Main Menu 500, the user selects the Report Menu option 540.

At the Report Menu, the user selects the option for a Filtered Audit Report.

A "Date range? (y/n)" prompt appears. At the "Date range? (y/n)" prompt, the user types y if he wants to specify that only data from a specific date range is included in the report. The user can specify that only data from a specific time period is shown in the Filtered Audit report. To limit the report data to a date range, the user types y and then presses Enter at the "Date range? (y/n)" prompt. At start and end date prompts, the user enters the start and end dates.

Figure 12:
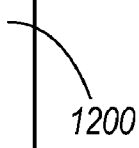
FIG. 12 is a screen print of the Select Services Menu.

A Select Services Menu 1200 then appears (FIG. 12). The Select Services Menu 1200 lists the services that the user can get specific audit information on in the report. The user selects the desired service. Multiple services can be selected. After finishing selections, the user selects the done option. The filtered Audit Report then displays in the Report Browser.

d. Overview of Log Reports

Log reports contain informational, error, and warning messages that have been generated by specific EIMA system services. In one embodiment, log report records are designated with the following alpha codes: I—Indicates that the message is informational; E—Indicates an error message; W—Indicates a warning message. These alpha codes appear at the beginning of each record in a log report. The Message field in a Log report record contains the actual message that the service generated.

The Log report lists informational messages that have been issued by services in the EIMA system 100. Log report data is organized by date, the service that generated the message, and the log message.

To generate a Log report, the user performs the following acts:

From the Main Menu 500, the user selects Report Menu 540.

At the Report Menu, the user selects the option for generating a Log Report.

e. Filtered Log Report

The Filtered Log report lists informational messages that have been issued by a particular service or services in the EIMA system 100. The user is able to select which services' messages are included in the report. Filtered Log report data is organized by date, the service that generated the message, and the log message.

To generate a Filtered Log report, the user performs the following acts:

From the Main Menu 500, the user selects Report Menu option 540.

At the Report Menu, the user selects the options for a Filtered Log Report.

At a "Date range? (y/n)" prompt, the user types y if he wants to specify that only data from a specific date range is included in the report. At the start and end date prompts, the user enters the start and end dates in a year-month-date format. For example, if the user would like to see audit data for Jan. 1, 2001 through Jan. 3, 2001, he would enter 20010101 as the start date and 20010103 as the end date.

The Select Services Menu 1200 then appears. The Select Services Menu 1200 was discussed above. The user selects the desired service. Multiple services can be selected. After finishing selections, the user selects the done option. The Filtered Audit Report then displays in the Report Browser.

f. Warnings and Errors Log Report

The Warnings and Errors Log Report lists error and warning messages that have been issued by various services in the EIMA system 100. Each record in the Warnings and Errors Log Report contains an entry for the date, the service that generated the message, and the actual warning or error message.

To generate a Warnings and Errors Log Report, the user performs the following acts:

From the Main Menu 500, the user selects the Report Menu option 540.

At the Report Menu, the user selects the option for generating a Warnings and Errors Log Report. The Error/Warning report displays in the Report Browser and the total number of records in the report is displayed above the report.

g. Filtered Warnings and Errors Log Report

The Filtered Warnings and Errors Log report lists error and warning messages that have been issued by a particular service or services in the EIMA system 100. The user is able to select which services' messages are included in the report. Each record in the Warnings and Errors Log report contains an entry for the date, the service that generated the message, and the actual warning or error message.

To generate a Filtered Warnings and Errors Log report, the user performs the following acts:

From the Main Menu 500, the user selects Report Menu option 540.

At the Report Menu, the user selects the options for a Filtered Warning and Errors Log Report.

A "Date range? (y/n)" prompt appears. At the "Date range? (y/n)" prompt, the user types y if he wants to specify that only data from a specific date range is included in the report. The user can specify that only data from a specific time period is shown in your Filtered Log report. At the start and end date prompts, the user enters the start and end dates.

The Select Services Menu 1200 then appears. The Select Services Menu 1200 was discussed above.

The user then selects the desired services. Multiple services can be selected. After finalizing selections, the user selects the done option. The Filtered Warnings and Errors Log Report then displays in the Report Browser.

h. Understanding the Message Data in an Audit Report

Records in an Audit report can contain a variety of log type values. The log type value indicates the activity that a service recorded. The log type value is listed as a Message field in Audit report records. TABLE 6, below, lists the log type values that can appear in Audit and Log reports.

TABLE 6

| LOG TYPE VALUE | VALUE INDICATES THE FOLLOWING ACTIVITY OCCURRED: |
|---|---|
| LOGIN | A user logged on to NetQuery. |
| LOGOUT | A user logged out of NetQuery. |
| CAPTURE | Items were captured from a scanner. |
| GIA_SESSION | An import session using the GIA server. |
| QUERY | Generates one entry for each query item. |

TABLE 6-continued

| LOG TYPE VALUE | VALUE INDICATES THE FOLLOWING ACTIVITY OCCURRED: |
|---|---|
| DISPOSITION | Viewing, faxing, or printing in NetQuery. |
| TEXT_BATCH_QRY | A text file batch query was generated. |
| MIGRATION | Migration of images to storage media devices. |
| VERIFICATION | Verification of image migration. |
| DELETION | Cycles were deleted. |
| SET_PASSWORD | A password was changed. |
| ADD_USER_GROUP | A user was assigned to a group in the System Admin program. |
| ADD_GROUP_CAP | A capability was assigned in the System Admin program. |
| DELETE_GROUP_CAP | A capability was deleted in the System Admin program. |
| CREATE_USER | A new user ID was created in the System Admin program. |
| DELETE_USER | A user ID was deleted in the System Admin program. |
| CREATE_GROUP | A new group was created in the System Admin program. |
| DELETE_USER_GROUP | A group was deleted from a user in the System Admin program. |
| STORE_DOCUMENT | Text documents stored in archive. |
| STORE_STATEMENT | Account statements stored in archive. |
| DISTRIBUTE | Query results distributed to media using Reconciled Export. |
| EXPORT | Export images to media using Reconciled Export. | i. Log Type Value Processes

In an Audit report, the fields following a log type value will vary depending on what log value is listed. To help understand the information in the Message column of a paticular Audit report record, the following topics contain descriptions of the fields that follow a specific log type value. These topics are organized by the type of process associated with a particular log type value: Login/Logout, Capture Value, GIA_Session Value, NetQuery Log Type Values, Migration Log Values, Set_Password Value, System Admin Values, Store Values, Export Values, Distribute Log Type Values, Text_Batch Value.

(i) Fields Following a Login or Logout Log Type Value

TABLE 7, below, provides a description of the fields that follow the Login or Logout log type value in an Audit report record. These fields appear after the log type value in the Message column. Field values are delimited by commas.

TABLE 7

| FIELD # | FIELD | DESCRIPTION |
|---|---|---|
| 4 | <Date> | The Date the Login or Logout occurred |
| 5 | <Time> | The Time the Login or Logout occurred |
| 6 | <Log type> | LOGIN and LOGOUT |
| 7 | <Wrkst IP> | The workstation IP address |
| 8 | <Login ID> | The LOGIN ID of the user who logged in or out of the NetQuery or Image Library Offline program |
| 9-14 | 6 empty fields | |
| 15 | <Duration> | Length of time in seconds the user was connected. This field applies to items with LOGOUT as the Log type. |
| 16-19 | 4 empty fields | |
| 20 | <Outcome> | SUCCEED or FAIL |

(ii) Fields Following a Capture Log Type Value

TABLE 8, below, provides a description of the fields that follow the Capture log type value in an Audit report record. These fields appear after the log type value in the Message column. Field values are delimited by commas.

TABLE 8

| FIELD # | FIELD | DESCRIPTION |
|---|---|---|
| 6 | <Log type> | CAPTURE |
| 7 | <IP address> | Workstation IP address used to issue the command |
| 8 | <Login ID> | The name of the user who opened the Capture session on the UNIX host system |
| 9-11 | 3 empty fields | |
| 12 | <# Images> | Number of images captured from scanner |
| 13 | <# bytes> | Number of bytes received |
| 14-18 | 5 empty fields | |
| 19 | <Destination> | The database name used for the capture |
| 20 | <cycle> | Cycle receiving the capture images and data |

(a) Fields Following a GIA_Session Log Type Value

TABLE 9, below, provides a description of the fields that follow the GIA_SESSION log type value in an Audit report record. These fields appear after the log type value in the Message column. Field values are delimited by commas.

TABLE 9

| FIELD # | FIELD | DESCRIPTION |
|---|---|---|
| 6 | <Log type> | GIA_SESSION |
| 7 | <Session Status> | SESSION FAILURE, SESSION CLOSE FAILED, REGULAR FILE GENERATION FAILED, or SESSION COMPLETED |
| 8 | <set name> | Database name receiving the images |
| 9 | <Set date> | Cycle receiving the images |
| 10 | <class name> | Indicates the type of images, for example, checks |
| 11 | <# of items> | # of items imported. 1 item may represent 2 images if fronts and backs are imported |
| 12 | <# bytes> | # of bytes imported |
| 13 | <# failed> | # of items for which insertion failed |
| 14 | <additional status> | empty field or "INSERTS DISABLED |
| 15-20 | Empty fields | |

(iii) Fields Following NetQuery Log Type Values

TABLE 10, below, provides a description of the fields that follow a Query log type value in an Audit report record. These fields appear after the log type value in the Message column. Field values are delimited by commas.

TABLE 10

| FIELD# | FIELD | DESCRIPTION |
|---|---|---|
| 6 | <Log type> | QUERY |
| 7 | <Workstn IP> | If the system uses fixed IP addresses rather than recycling available IP addresses as needed, the user can use this field to identify the workstation that generated the query. |
| 8 | <Login ID> | The Login ID of the user who generated the query. |
| 9-10 | 2 empty fields | |
| 11 | <Qryfile> | The query name as posted from Image Library. Typically the date and time of the query. |
| 12 | <# images> | The number of images that resulted from the query. Note: The total number of images is provided even if the user stops the query before completion. |
| 13-20 | 8 empty fields | |

TABLE 11, below, provides a description of the fields that follow a Query log type value in an Audit report record.

These fields appear after the log type value in the Message column. Field values are delimited by commas. The DISPOSITION log type value indicates query activity based on each item that is tagged and retrieved individually for display.

TABLE 11

| FIELD# | FIELD | DESCRIPTION |
|---|---|---|
| 6 | <Log type> | DISPOSITION |
| 7 | <IP Address> | IP address of the Image Library workstation |
| 8 | <Login ID> | The Login ID of the user who generated the query |
| 9-17 | 9 empty fields | |
| 18 | <itemsize> | Size of items sent from the query server to the NetQuery workstation |
| 19 | <Media type> | UNKNOWN, DISK, OPTICAL, TAPE |
| 20 | <Destination> | The destination used for query results at a NetQuery workstation is typically DISPLAY |

(iv) Fields Following Migration Log Type Values

TABLE 12, below, provides a description of the fields that follow the MIGRATION log type value in an Audit report record. Migration field values indicate that items have been migrated to a storage device. These fields appear after the log type value in the Message column. Field values are delimited by commas.

TABLE 12

| FIELD# | FIELD | DESCRIPTION |
|---|---|---|
| 6 | <log type> | MIGRATION |
| 7 | <IP Address> | IP address of the workstation issuing the command |
| 8 | <Login ID> | User who is performing the migration commands |
| 9-10 | 2 empty fields | |
| 11 | <# Images> | The number of images migrated |
| 12 | <Type> | This is set to "mig |
| 13 | <# bytes> | Number of bytes migrated |
| 14-18 | 5 empty fields | |
| 19 | <source media> | Source media of images: 1 = DASD; 2 = optical; 3 = tape |
| 20 | <Destination media> | Destination media of images: 1 = DASD; 2 = optical; 3 = tape |
| 21 | <set name> | Name of the set migrated |
| 22 | <set date> | Name of the cycle migrated |

The following fields indicate that verification of migration was performed. Please note that there are two verification log entries: one is used for the number of images verified and the other is used for verification error count. The only difference between the two is the use of the #Images field.

TABLE 13

| FIELD# | FIELD | DESCRIPTION |
|---|---|---|
| 6 | <log type> | VERIFICATION |
| 7 | <IP Address> | Workstation IP address used to issue the command |
| 8 | <Login ID> | User ID that issued the command |
| 9-10 | 2 empty fields | |
| 11 | <# Images> | The number of images verified or number in error |
| 12 | <Type of verification> | The first verification entry is set to "ver and reports the # of images verified successfully, the second line is set to "err and reports the # of images with errors |
| 13-14 | 2 empty fields | |
| 15 | <verify %> | Percent of migration verified |
| 16-18 | 3 empty fields | |

TABLE 13-continued

| FIELD# | FIELD | DESCRIPTION |
|---|---|---|
| 19 | <source media> | Source media of images: 1 = DASD; 2 = optical; 3 = tape |
| 20 | <Destination media> | Destination media of images: 1 = DASD; 2 = optical; 3 = tape |
| 21 | <set name> | Name of the set verified |
| 22 | <set date> | Name of the cycle verified |

The DELETION log type value, below, indicates that a cycle has been deleted after migration and migration verification.

TABLE 14

| FIELD# | FIELD | DESCRIPTION |
|---|---|---|
| 6 | <log type> | DELETION |
| 7 | <IP Address> | Workstation IP address used to issue the command |
| 8 | <Login ID> | The User that issued the command |
| 9-18 | 10 empty fields | |
| 19 | <source media> | Source media of images: 1 = DASD; 2 = optical; 3 = tape |
| 20 | empty field | |
| 21 | <set name> | Name of the set deleted |
| 22 | <set date> | Name of the cycle deleted |

(v) Fields Following a Set_Password Log Type Value

TABLE 15, below, provides a description of the fields that follow the SET_PASSWORD log type value in an Audit report record. The SET_PASSWORD value indicates that a login password change occurred. These fields appear after the log type value in the Message column. Field values are delimited by commas.

TABLE 15

| FIELD# | FIELD | DESCRIPTION |
|---|---|---|
| 6 | <Log type> | SET_PASSWORD |
| 7 | <IP Address> | Shows if the password change was generated from the System Administration application; shows the password change command comes from NetQuery; shows the IP address of the UNIX server managing the query server. |
| 8 | <Login ID> | User ID that issued the command to change password |
| 9 | <User ID> | If a system administrator is changing someone else's ID, this field shows the User ID that received a new password. If this field is blank, this field shows that the Login ID in field 8 changed their own password. |

(vi) Fields Following System Admin Log Type Values

TABLE 16, below, provides a description of the fields that follow the ADD_USER_GROUP log type value in an Audit report record. These fields appear after the log type value in the Message column. Field values are delimited by commas.

TABLE 16

| FIELD# | FIELD | DESCRIPTION |
|---|---|---|
| 6 | <Log type> | ADD_USER_GROUP |
| 7 | <IP Address> | Workstation IP address used to issue the command. |

TABLE 16-continued

| FIELD# | FIELD | DESCRIPTION |
|---|---|---|
| 8 | <Login ID> | User ID that issued the command |
| 9 | <User ID> | The UserID that received a new group assignment |
| 10 | <Group Name> | The Group that this User ID has been assigned. |

TABLE 17, below, provides a description of the fields that follow the DELETE_USER_GROUP log type value.

TABLE 17

| FIELD# | FIELD | DESCRIPTION |
|---|---|---|
| 6 | <Log type> | DELETE_USER_GROUP |
| 7 | <IP Address> | Workstation IP address used to issue the command. |
| 8 | <Login ID> | User ID that issued the command |
| 9 | <User ID> | The UserID that had a previously affiliated group deleted from it's set of groups |
| 10 | <Group Name> | The Group that no longer includes this user. |

TABLE 18, below, provides a description of the fields that follow the CREATE_USER log type value.

TABLE 18

| FIELD# | FIELD | DESCRIPTION |
|---|---|---|
| 6 | <Log type> | CREATE_USER |
| 7 | <IP Address> | Workstation IP address used to issue the command. |
| 8 | <Login ID> | User ID that issued the command |
| 9 | empty field | |
| 10 | <User ID> | new User ID that was created |
| 11 | <Max Retention> | Maximum Retention |
| 12 | <Default Retention> | Default Retention |
| 13 | <User Dept> | User's Department |
| 14 | <Page Print Limit> | Page Print Limit |
| 15 | <Active> | Whether the user is Active or not. YES or NO |
| 16 | <User Description> | User Description |

TABLE 19, below, provides a description of the fields that follow the DELETE_USER log type value.

TABLE 19

| FIELD# | FIELD | DESCRIPTION |
|---|---|---|
| 6 | <Log type> | DELETE_USER |
| 7 | <IP Address> | Workstation IP address used to issue the command. |
| 8 | <Login ID> | User ID that issued the command |
| 9 | <User ID> | User ID that was deleted |

TABLE 20, below, provides a description of the fields that follow the CHANGE_USERDEF log type value.

TABLE 20

| FIELD# | FIELD | DESCRIPTION |
|---|---|---|
| 6 | <Log type> | CHANGE_USERDEF |
| 7 | <IP Address> | Workstation IP address used to issue the command. |

TABLE 20-continued

| FIELD# | FIELD | DESCRIPTION |
|---|---|---|
| 8 | <Login ID> | User ID that issued the command |
| 9 | <Sybase ID> | Sybase User ID (numeric) |
| 10 | <User ID> | User Name that is being changed. |
| 11 | <Max Retention> | Maximum Retention |
| 12 | <Default Retention> | Default Retention |
| 13 | <User Dept> | User's Department |
| 14 | <Page Print Limit> | Page Print Limit |
| 15 | <Active> | Whether the user is Active or not. YES or NO |
| 16 | <User Description> | User Description |

TABLE 21, below, provides a description of the fields that follow the CREATE_GROUP log type value.

TABLE 21

| FIELD# | FIELD | DESCRIPTION |
|---|---|---|
| 6 | <Log type> | CREATE_GROUP |
| 7 | <IP Address> | Workstation IP address used to issue the command. |
| 8 | <Login ID> | User ID that issued the command |
| 9 | <Group Name> | The new Group Name that was created |
| 10 | <Group Description> | Description of the Group. |

TAABLE 22, below, provides a description of the fields that follow the ADD_GROUP_CAP log type value.

TABLE 22

| FIELD# | FIELD | DESCRIPTION |
|---|---|---|
| 6 | <Log type> | ADD_GROUP_CAP |
| 7 | <IP Address> | Workstation IP address used to issue the command. |
| 8 | <Login ID> | User ID that issued the command |
| 9 | <Group Name> | The Group that received a new capability |
| 10 | <Capability> | The Capability that was added to the group. |

TABLE 23, below, provides a description of the fields that follow the DELETE_GROUP_CAP log type value.

TABLE 23

| FIELD# | FIELD | DESCRIPTION |
|---|---|---|
| 6 | <Log type> | DELETE_GROUP_CAP |
| 7 | <IP Address> | Workstation IP address used to issue the command. |
| 8 | <Login ID> | User ID that issued the command |
| 9 | <Group Name> | The Group that had a capability deleted |
| 10 | <Capability> | The Capability that was deleted from the group. |

(vii) Fields Following Store Log Type Values

These log type values indicate specific details about document and statement storage in the archive. TABLE 24, below, provides a description of the fields that follow the STORE_DOCUMENT log type value in an Audit report record. These fields appear after the log type value in the Message column. Field values are delimited by commas.

TABLE 24

| FIELD# | FIELD | DESCRIPTION |
|---|---|---|
| 6 | <Log type> | STORE_DOCUMENT |
| 7 | <IP Address> | Workstation IP address used to issue the command. |
| 8 | <Login ID> | User ID that issued the command |
| 9-11 | 3 empty fields | |
| 12 | <# Documents> | The number of documents stored. |
| 13 | <# Bytes> | # of bytes that were stored |
| 14-20 | 7 empty fields | |
| 21 | <set name> | Database name receiving the documents |
| 22 | <cycle date> | Cycle name that received the documents |

TABLE 25, below, provides a description of the fields that follow the STORE_STATEMENT log type value in an Audit report record. These fields appear after the log type value in the Message column. Field values are delimited by commas.

TABLE 25

| FIELD# | FIELD | DESCRIPTION |
|---|---|---|
| 6 | <log type> | STORE_STATEMENT |
| 7 | <IP Address> | Workstation IP address that issued the command. |
| 8 | <Login ID> | Login ID of the user who issued the command. |
| 9-11 | 3 empty fields | |
| 12 | <#Images> | The number of statements stored. |
| 13 | <# bytes> | # of bytes of data stored. |
| 14-20 | 7 empty fields | |
| 21 | <set name> | Database name that received the statements |
| 22 | <cycle date> | Cycle name that received the statements |

(viii) Fields Following Export Log Type Values

TABLE 26, below, provides a description of the fields that follow the EXPORT_JOBDESTVOL log type value in an Audit report record. These fields appear after the log type value in the Message column. Field values are delimited by commas.

TABLE 26

| FIELD# | FIELD | DESCRIPTION |
|---|---|---|
| 6 | <Log type> | EXPORT_JOBDESTVOL |
| 7 | <JobID> | System assigned Job ID. (Numeric-8 digits) |
| 8 | <Job Name> | The name of the job as entered in Job Manager or via NetQuery. |
| 9 | <Job Description> | The description of the job as entered in Job Manager or NetQuery. |
| 10 | <Login ID> | The name of the user who submitted the job. |
| 11 | <Customer ID> | The Customer ID who is receiving the export. |
| 12 | <Job Type> | The type of job which may be AUTOMATIC, MANUAL, DEFERRED or UNKNOWN JOB TYPE. |
| 13-15 | 3 empty fields | |
| 16 | <Submit DateTime> | The date and time the job was first submitted to the export server. For example May 11 1999 8:20 A.M. |
| 17 | empty field | |
| 18 | <img count> | # of images exported |
| 19 | <# bytes> | # bytes |
| 20 | <JobDestID> | The job destination ID. (Numeric 8 digits) |
| 21 | <Dest ID> | Destination ID. |
| 22-23 | 2 empty fields | |
| 24 | <DestState> | Destination state may be: PENDING, READY, EXECUTING, COMPLETED, STOPPED, DEFERRED, RESOURCEWAIT, UNKNOWNJOB STATE. |
| 25 | <DestStatus> | The destination status of a job may be COMPLETED, STOPPED, FAILED, EXECUTING, NOT STARTED, UNKNOWN DEST STATUS |
| 26 | <Media Type> | General description of the output media. Media types can include UNIX TAPE, UNIX PRINT, UNIX FAX, REMOTE FAX, REMOTE PRINT, REMOTE DISKETTE, REMOTE TAPE, TRANSMIT, UNIX DISKETTE, CD-ROM or UNKNOWN MEDIA TYPE. |
| 27 | <Img Format> | Image Format may be TIFF, PCL, PS, COF or RAW |
| 28 | <Priority> | Priority of the job (1 through 9) |
| 29 | <CreateDBF> | Whether the system should generate a DBF (index) file on this media. TRUE or FALSE |
| 30 | <CreateIDX> | Whether an index should be generated. TRUE or FALSE |
| 31 | <CreateMICR> | Whether or not MICR data should be generated. TRUE or FALSE |
| 32 | <# of copies> | Number of copies to be made. |
| 33 | <Img/per/page> | For Fax or print, lists the images per page. |
| 34 | <Fax Phone> | The fax phone number |
| 35 | <volcnt> | Volume Count |
| 36-37 | 2 empty fields | |
| 38 | <VolIndex> | Volume Index (count starts at 1) |
| 39 | <VolImgCnt> | The number of images placed on the volume |
| 40 | <VolByteCnt> | The number of bytes for that volume or fax. |

(ix) Fields Following Distribute Log Type Values

TABLE 27, below, provides a description of the fields that follow the DISTRIBUTE log type value in an Audit report record. These fields appear after the log type value in the Message column. Field values are delimited by commas. The DISTRIBUTE value indicates that an export to a remote printer/fax was performed.

TABLE 27

| FIELD# | FIELD | DESCRIPTION |
|---|---|---|
| 6 | <Log Type> | DISTRIBUTE |
| 7 | <IP Address> | Workstation IP address used to issue the command. |
| 8 | <Login ID> | The name of the user who sent the request. |
| 9 | <Cust ID> | For an immediate request, the Customer ID displays as USER_ |
| 10 | <Qryfile> | The name of the query file. |
| 11 | empty field | |
| 12 | <# images> | Number of images |
| 13-15 | 3 | empty fields |
| 16 | <#pages/phone#> | For Print, the number of pages printed. For Fax, the phone number of the recipient. |
| 17-19 | 3 empty fields | |
| 20 | <Destination> | PRINT, FAX |

(x) Fields Following a Text_Batch Log Type Value

TABLE 28, below, provides a description of the fields that follow the TEXT_BATCH log type value in an Audit report record. The TEXT_BATCH log type indicates that a text file batch query job was exported. These fields appear after the log type value in the Message column. Field values are delimited by commas. The DISTRIBUTE value indicates that an export to a remote printer/fax was performed.

TABLE 28

| FIELD# | FIELD | DESCRIPTION |
|---|---|---|
| 6 | <Log type> | TEXT_BATCH |
| 7 | <IP Address> | Workstation IP address used to issue the command. |
| 8 | <login ID> | The User ID that issued the command at the Electronic Distribution menu to process a Text file batch query. |
| 9 | <CustID> | Customer ID |
| 10 | <Queryfile> | Batch Query filename |
| 11 | <QryID> | If your TFBQ includes more than one query, this field identifies the query sequence number. For example, the second query in a batch will have QryID = 2. |
| 12 | <# Images> | Number of images resulting from the query. |
| 13-19 | 7 empty fields | |
| 20 | <Destination> | The destination used for query results of a TFBQ. For example, Print, Fax, Database, CDROM, Diskette, and Tape. | j. Image Match Reports (i) Match Statistics Report

To view, print, or delete an Image Match report, the user performs the following acts:

From the Main Menu 500, the user selects Report Menu 540.

The user then selects the option for providing a Match Statistics Report. The information contained in the Match Database Statistics report is accumulated during processing. In one embodiment, this report provides run-specific information about the total number of images processed, the total number of statements processed, the total number of MCF records read, matched and not matched, and the total number of records written during the Image Match processing. The Match database statistics report contains the following information:

TABLE 29

| ITEM | DESCRIPTION |
|---|---|
| Regular fronts | Lists the total number of image items in the database. |
| Used fronts | Lists the total image items that have been matched. |
| Unused fronts | Lists the total number of image items that have not been matched. These are referred to as free items. |
| Statements Processed | Indicates the number of unique account numbers processed. |
| MCF Records read | Lists the total number of records in the MCF. |
| Dummy records | Indicates the number of synchronization records corresponding to no-activity statements or one dummy record per statement. The value in this field depends on the structure of the MCF. |
| MCF advertising images | Lists the total number of records that have requested advertising images. |
| MCF advertising images in error | Indicates the total number of advertising images requested by the MCF but not found in the database. |
| MCF records matched | Specifies the number of MCF records successfully matched to an item in the database. |
| Matched on Acct/Ser/Amt | Indicates the total of images matched on account number, serial number, and amount. |
| Matched on Acct/Ser | Indicates the total number of images matched on account and serial number. The dollar amount did not match and could contain blanks and/or zeros. |
| Matched on Acct/Amt without serial no. | Indicates the total number of images matched on account number and amount. No serial number was present in the MCF. |
| Matched on Acct/Amt with serial no. | Indicates the total number of images matched on the account number and amount. A serial number was present in the MCF but no matching serial number was found in the MICR data. |
| MCF records not matched | Indicates the total number of MCF records for which there was no match in the database. |

TABLE 29-continued

| ITEM | DESCRIPTION |
| --- | --- |
| % Unmatched | Indicates the number of missing image items expressed as a percentage of MCF records. |
| Records written | Specifies the number of records written to each output file. |

(ii) Free Items Report

The Free Items Report lists the images contained in a particular batch of a database cycle that have not been requested by the MCF. The report is sorted by time of capture. To view, print, or delete a Free Items Report, the user performs the following acts:

At the Main Menu 500, the user selects the Report Menu option 540.

The user then selects the option for providing a Free Items Report. The report title can contain the date, time, database name, and cycle name. Following is a description of the Standard and Custom Free Items Report fields.

TABLE 30

| ITEM | DESCRIPTION |
| --- | --- |
| Match Status (A/U) | Indicates whether the unmatched record account number is in the MCF. A indicates that the account number is in the MCF. U indicates that the account number is not in the MCF. |
| Account Number- | If the report displays binary zeroes this means that the account |
| Account number | number could not be read and needs to be repaired using the MICR Repair module. |
| Serial number | Serial number |
| Reference # | Reference number |
| Amount | Dollar amount. |
| TranCode | Transaction code |
| Routing | Transit routing number |
| Sort Code | Sort Code |
| Usage records read | Total number of Free Items read. |
| a - type usage records selected | Total number of unmatched records having an account number in the MCF. |
| u - type usage records read | Total number of unmatched records not having an account number in the MCF. |

(iii) Missing Items Report

The Missing Items Report lists any items that are present in the MCF but have no corresponding image in the database. The total number of unmatched records appears at the end of the report. To generate a Missing Items Report, the user performs the following acts:

At the Main Menu 500, the user selects the Report Menu option 540.

The user then selects the option for a Missing Items Report. The report title can contain the date, time, database name, and cycle name. Following is a description of the Missing Items Report fields:

TABLE 31

| ITEM | DESCRIPTION |
| --- | --- |
| Comment | Specifies results of Good/Bad Split. Blank indicates that Good/Bad Split was not run. |
| Customer Number | Customer number (account number) associated with the unmatched item contained in the MCF. |
| Account Number | Account number associated with the unmatched item. |

TABLE 31-continued

| ITEM | DESCRIPTION |
| --- | --- |
| Trcode | Transaction code for the item. |
| Serial Number | Serial number associated with the item. |
| Serial Number Reference # | Reference number associated with the item. |
| Routing | Routing information associated with the institution processing the item. |
| Amount | Dollar amount associated with the unmatched item as found in the MCF. |
| Sort Code | Sort code associated with the item. |
| Unmatched records read | Total number of records present in the MCF for which no matching items were found in the image database. | k. Cycle & Optical Reports (i) Cycle Location Report

The Cycle Location report lists the current location of database cycles by repository. The report indicates if a cycle is located in one or more of the following repositories:

TABLE 32

| Raid Repository | In the report, a "D" indicates that the cycle resides on RAID. |
| --- | --- |
| Optical Repository | In the report, an "O" indicates that the cycle resides on optical. |
| Tape Repository | In the report, a "T" indicates that the cycle resides on tape. |

To generate a Cycle Location report, the user performs the following acts:

At the Main Menu 500, the user selects the Report Menu option 540.

At the Report Menu, the user selects the Cycle Location Report option. At this point, the user has the option of viewing the report onscreen, sending the report to a UNIX printer or canceling the report. Upon selecting an option, the report is provided.

(ii) Optical Jukebox Occupancy Report

The user can generate an Optical Jukebox Occupancy report to get information about the data that has been migrated to optical. To generate an Optical Jukebox Occupancy report, the Optical Administration server should be running. The Optical Administration server and the Optical Repository server should not be running at the same time. The user should stop the Optical Repository Server and then start the Optical Administration server before running the Optical Jukebox Occupancy report.

To generate an Optical Jukebox Occupancy report, the user performs the following acts:

At the Main Menu 500, the user selects the Report Menu option 540.

At the Report Menu, the user then selects the option that generates the Optical Jukebox Occupancy Report. The Optical Jukebox Occupancy Report displays in the Report Browser.

1. Tape Repository Reports (i) Overview of Tape Repository Reports

Tape Repository Reports allow the user to get specific information about tape devices and data that has been migrated to tape. The following tape reports can be run from the Report menu:

TABLE 33

| REPORT | DESCRIPTION |
|---|---|
| Tape Repository Occupancy report | Lists a history of database cycles that have been migrated to tape |
| Tape Repository Volume report | Provides the available space on a specific tape volume |
| Tape Repository Drive Status report | Shows the current status of tape devices |

(ii) Tape Repository Occupancy Report

The Tape Repository Occupancy report provides a history of database cycles that have been migrated to tape. This report contains the following information:

TABLE 34

| INFORMATION | DESCRIPTION |
|---|---|
| Set | Lists the document type and database cycle that has been migrated |
| Date Written | Shows the date (month-date-year format) that the cycle was migrated to tape. |
| Volume | Lists the internal volume number of the tape that the cycle has been migrated to. |
| Images | Lists the total number of images in the migrated cycle. |

To generate a Tape Repository Occupancy report, the user performs the following acts:

At the Main Menu 500, the user selects the Report Menu option 540.

At the Report Menu, the user selects the option to create a Tape Repository Occupancy Report. The Tape Repository Occupancy report displays in the Report Browser.

(iii) Tape Repository Volume Report

The Tape Repository Volume Report shows the amount of available storage space on your tape volumes. This report contains the following information:

TABLE 35

| INFORMATION | DESCRIPTION |
|---|---|
| Volume | Lists the internal volume number of each tape volume. |
| Type | Shows the date (month-date-year format) that the cycle was migrated to tape. |
| Status | Indicates if the tape volume is available for reading or writing. |
| Available Space (MB) | Lists the available storage space in megabytes (MB) on the tape volume. |

To generate a Tape Repository Occupancy report, the user performs the following acts:

At the Main Menu 500, the user selects the Report Menu option 540.

At the Report Menu, the user selects the option to create a Tape Repository Volume report. The Tape Repository Volume report displays in the Report Browser.

(iv) Tape Repository Drive Status Report

The Tape Repository Drive Status report provides status information about tape storage devices. This report contains the following information:

TABLE 36

| INFORMATION | DESCRIPTION |
|---|---|
| Drive | Lists the drive that the tape storage device is assigned to. |
| Host | The UNIX host server that the tape storage device is mounted on. |
| Device | The path that the tape device resides in. |
| Device Type | Shows details about the tape storage device hardware. |
| Status | Indicates if the tape volume is available for reading or writing. |
| Use | Lists if the tape device can be read or written to (R = Read, W = Write). |

The user performs the following acts to generate a Tape Repository Drive Status report:

At the Main Menu 500, the user selects the Report Menu option 540.

At the Report Menu, the user selects the option to create a Tape Repository Drive Status Report. The Tape Repository Drive Status report displays in the Report Browser.

11. Tape Administration a. Overview of Tape Administration

The Tape Administration menu contains options for managing tape volumes that contain Titan cycles, which have been migrated from RAID to tape. The Tape Administration menu includes tasks for verify tape drive availability, mount and unmount tape volumes, add and remove tape volumes to and from the tape silo, remove tape volume data, place a tape drive online or offline, and recover a failed tape drive.

While tape volumes are in the tape silo, users can query tape data through the NetQuery program. The tape silo's robotic arm transfers tapes into the tape drives as tape volumes are requested for migration and querying purposes. The number of tapes that can be stored in your tape silo depends on the make and model of the equipment.

b. Checking the Availability of a Tape Drive

The user can view the read/write capability of tape drives that are not currently in use by selecting the Check drive status option on the Tape Repository Administration Menu. The Drive Status report lists the following information about each available tape drive:

TABLE 37

| INFORMATION | DESCRIPTION |
|---|---|
| Drive | The directory location of the tape drive on the UNIX system |
| Host | The computer that the tape device is connected to |
| Device | The filename and location of the tape drive's device file |
| Device Type | The type of tape device |
| Status | The current activity of the tape drive; a tape drive may be shown as Available, Writing or Reading |
| Use | The read/write permissions of a tape drive |
| Volume | If a tape is in the drive, this column shows the six-digit volume ID assigned to the tape volume |

To generate an onscreen Drive Status report that displays tape drive availability, the user performs the following acts:

At the Main Menu 500, the user selects the Tape Administration Menu 545.

At the Tape Repository Administration Menu 545, the user selects the option for checking the Drive Status report option. The user can then note which tape drives are available.

c. Mounting a Tape Volume

Tape volumes should be mounted to make them accessible for reading or writing. The Mount option on the Tape Administration menu allows the user to instruct the tape silo to load a specific tape volume into a particular tape drive.

To mount a tape volume into a tape drive, the user performs the following acts:

At the Main Menu 500, the user selects the Tape Administration Menu option 545.

At the Tape Repository Administration Menu, the user selects the option for mounting a specific volume in a drive. A Drive Status Menu displays. The Drive Status menu lists the currently available tape drives. Only tape drives that are available for mounting are shown in this report.

The user selects the number of the drive that the user wants to mount. A prompt then displays for entering the number of the tape volume that the user wants to mount into the drive.

12. Optical Administration a. Overview of Optical Administration

Optical Administration is used to transfer images and related database files to and from optical cartridges stored in a jukebox. This transfer is called "migration", or most commonly "optical migration". The Optical Administration application includes an Optical Migration procedure and Optical Administration procedure.

Optical Administration allows the user to migrate your data from: RAID to Optical, Optical to RAID, Optical to Optical, Optical to Tape, and Tape to Optical. Optical Administration Procedure allows the user to add and remove cartridges from the jukebox.

Each jukebox has its own Optical Administration database. Each jukebox has an assigned identifier (e.g., OR1, OR2, OR3, etc). Each jukebox's optical system uses three servers, which are listed below:

TABLE 38

| SERVER | DESCRIPTION |
| --- | --- |
| Optical Robotics Server | Should be running to perform optical services. |
| Optical Repository Server | Used for viewing and migrating images stored on an optical disk. |
| Optical Administration Server | Used for importing and exporting cartridges from the jukebox. | b. Optical Cartridges

The optical system supports two types of optical cartridges: reusable (Erasable Optical Cartridge) and write once, read many (WORM). The user uses the Erasable Optical Cartridges for data that he does not require permanently. Once the user no longer require that data on a reusable optical cartridge, he can erase it and reuse the cartridge. Alternatively, the user uses WORM cartridges when he requires a permanent record of the data. A Jukebox Occupancy Report is available to describe the contents of your system jukeboxes.

The following describes the optical storage process data flow for one embodiment:

Run ImageCapture and ImageMatch (or import the images using another method).

Copy the images from disk to optical cartridge.

Delete the images from the disk. If the user generates a query using NetQuery, and the user has previously migrated the images to optical cartridges, and if the cartridge containing the results of the query is located in the jukebox, then the system immediately sends the query results to NetQuery.

C. Other Applications

While Section 2B describes operating one embodiment of the EIMA system 100, other methods of operation can be used as well. Additionally, the sections below describe other applications that are used by other embodiments of the invention.

D. System Administration

1. Introduction to System Administration a. Overview of System Administration

System Administration is a utility that system administrators can use to control user access and activities in the EIMA system 100. The administrator must have administrative rights to log on to System Administration.

When a user logs on to the EIMA system 100, the system checks the user's password and capabilities and then grants access to programs based on the user's security level or capabilities. The system administrator is responsible for assigning capabilities to each group. Users cannot log on to the system until the system administrator has added the user account to System Administration.

The administrator can perform the following tasks in System Administration: 1) create and manage user accounts, 2) create and manage groups, 3) assign groups to users, 4) set group permissions, 5) create filters to control data access, 6) define weekends and holidays in the calendar, and 7) create decision-making windows.

The System Administration module in the embodiment described herein, utilizes a Java Plug-in.

b. System Requirements

The table below lists the hardware and software requirements of a workstation 115, for one embodiment, that calls System Administration.

TABLE 39

| COMPONENT | RECOMMENDATION |
| --- | --- |
| Processor | Pentium II or better, 200 Mhz |
| Minimum Hard Drive Space | 6-10 Megabytes |
| Recommended RAM | 64 MB |
| Operating systems | Windows NT, Windows 95 and 98, Unix, Linux |
| Screen Resolution | 800 × 600 pixels. For instructions on changing your screen resolution, see Changing Your Screen Resolution. |
| Web Browser Plug-ins | Internet Explorer 5.5 or Netscape Navigator 4.7 Java ™ 2 Runtime Environment, Standard Edition including the Java ™ Plug-in download. For more information about this plug-in, please read Overview of the Java Plug-in. | c. Running System Administration

The first time the administrator logs on to the EIMA Web site, the administrator will be prompted to download and install the Java Plug-in if it is not already installed on your computer. The Java Plug-in is required to run the System Administration applet.

To begin logging on to the EIMA system 100 (specifically the host server 110), the administrator enters the address of the EIMA Web site in the Address bar of the Web browser. After the login information has been authenticated, the administrator is able to access System Administration and any other EIMA applications for which the administrator has been granted permissions to use. The administrator must have administrator capabilities to use System Administration.

d. Overview of the System Administration Screen

Figure 13:
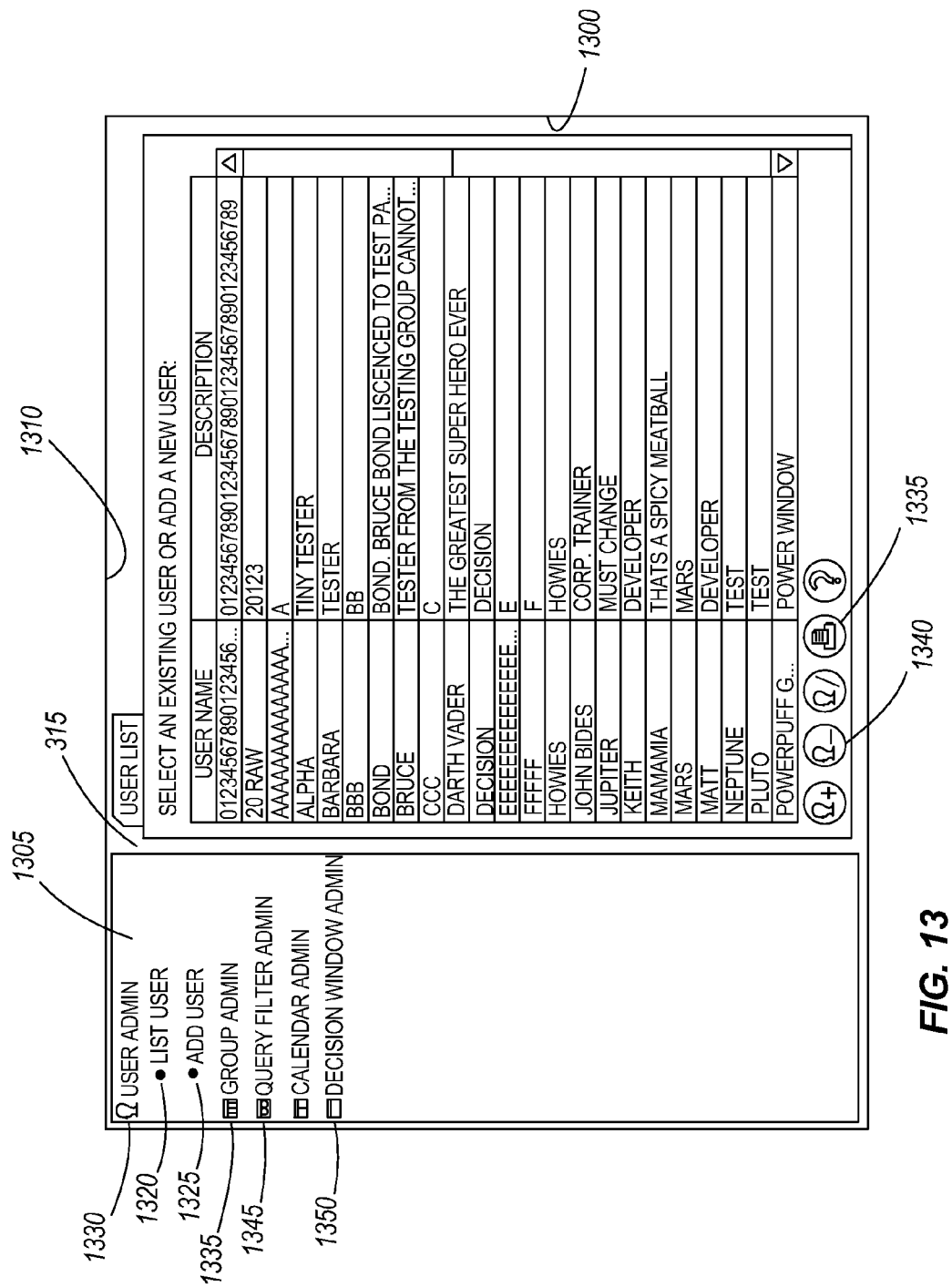
FIG. 13 is a partial screen print of the System Administration Main Screen.

After the user launches System Administration, the System Administration Main Screen 1300 (FIG. 13) loads in the Web browser. For the embodiment shown, the System Administration screen is divided into two panes: the left pane 1305 and the right pane 1310. A split bar 1315 separates these two panes. Of course, other arrangements are possible.

The currently selected option in the left pane 1305 controls the content of the right pane 1310. The left pane 1305 contains five main menu items. Double-clicking a menu item in the left pane 1305 expands or collapses the options under the menu item. The following main menu items are available in the left pane:

TABLE 40

| ITEM | DESCRIPTION |
| --- | --- |
| User Admin | Contains options for listing and adding user accounts |
| Group Admin | Contains options for listing and adding groups |
| Query Filter Admin | Contains options for listing and adding query filters |
| Calendar Admin | Contains an option for setting the decision control calendar |
| Decision Window Admin | Contains options for setting decision-making time limits for exception items |

The right pane 1310 displays the tab or tabs for the selected option in the left pane. Clicking a menu item option changes the content of the right pane 1310.

The split bar 1315 is the horizontal line that separates the left pane 1305 and the right pane 1310. The administrator can adjust the size of the right and left panes by clicking-and-dragging the split bar to the right or left.

e. Java Plug-in

In one embodiment, System Administration is a Web-based Java applet that is embedded in HTML, although other architectures can be used as well. The System Administration applet runs in a Web browser and is part of the EIMA system Web page. To run System Administration, the Java Plug-in should be installed on the client workstation 115.

2. Listing Users a. Overview of Users

The administrator can view user accounts and their descriptions in the Users List. The User Name column contains the account name; the Description column provides more details about the account.

The administrator performs the following acts to display all user accounts:

If the User Admin options are not visible in the left pane, the administrator double-clicks User Admin. The User Admin menu expands.

Figure 30:
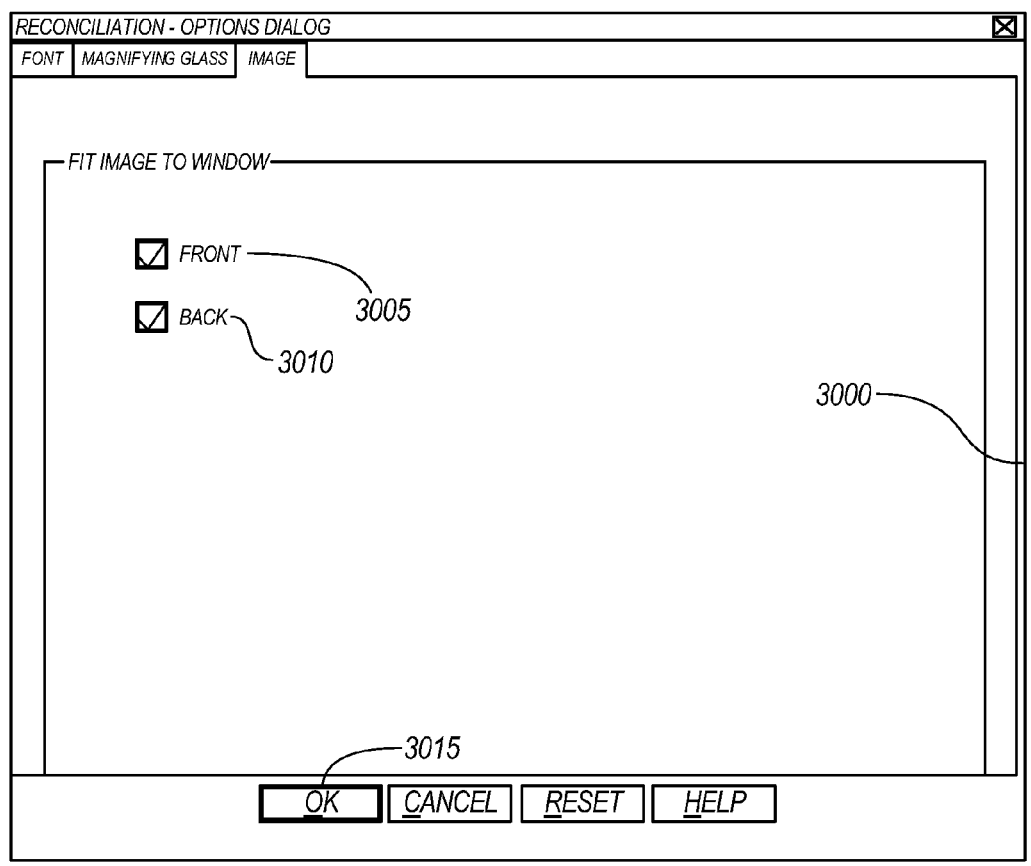
FIG. 30 is a screen print of the Image tab of the Option Dialog window.

The administrator clicks the List Users 1320 option. The User List is displayed in the right pane 1310, as shown in FIG. 30.

A user is an individual who can log on to the EIMA Web site and perform specified activities in EIMA applications. Users with similar access rights are usually members of the same group; however, a user may belong to more than one group. Group membership designates the activities that a user can perform in the EIMA system.

b. Adding a User

The administrator can begin to add a new user by clicking the Add User option 1325 under User Admin in the left navigation pane. The administrator supplies the following information for each new user account: 1) name of the account, 2) description, 3) password, and 4) group assignment. To assign a group to a user, the administrator should have already added the group to System Administration.

The administrator performs the following acts to add a new user account to the EIMA system:

If the Add User option 1325 in the left pane is not visible, the administrator activates the User Admin option 1330. The User Admin menu expands.

Figure 14:
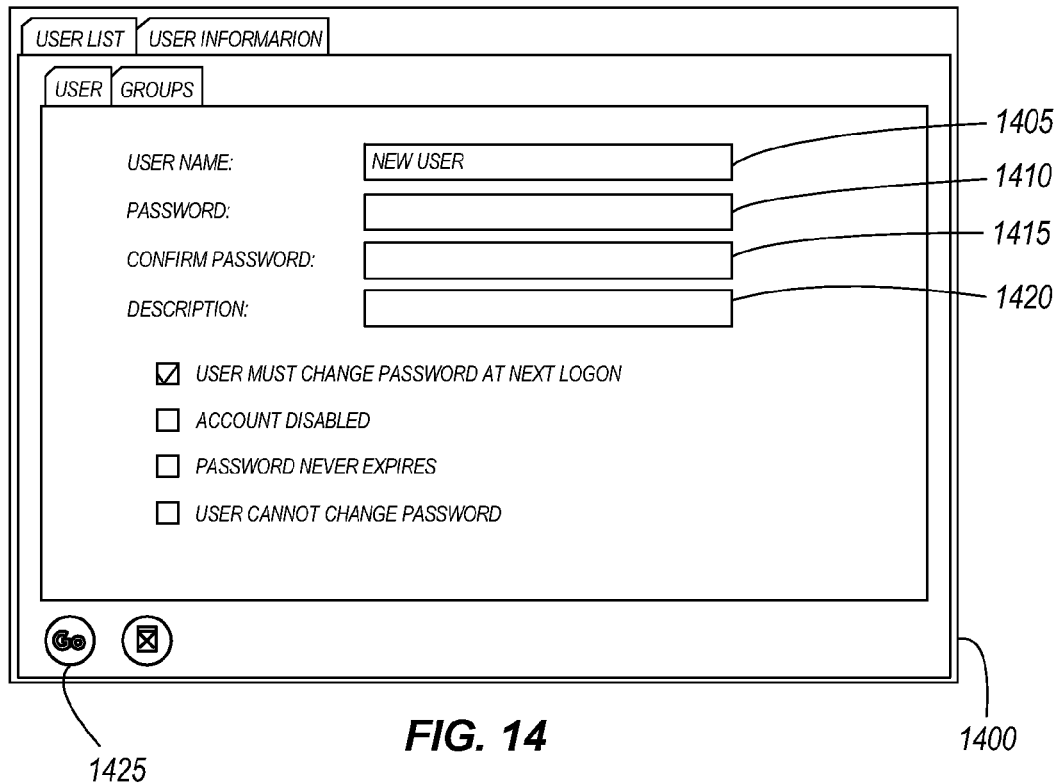
FIG. 14 is a partial screen print of the User Information card.

Under the User Admin menu, the administrator activates the Add User option 1325. The User Information card 1400 displays in the right pane 1310, as shown in FIG. 14.

In the User Name text box 1405, the administrator types the full name of the user account. In the Password text box 1410, the administrator types the password for the user account. In the Confirm Password text box 1415, the administrator re-enters the same password that was entered earlier. In the Description text box 1420, the user types a description for the user account.

The administrator selects the appropriate options as needed:

TABLE 41

| OPTION | DESCRIPTION |
| --- | --- |
| User Must Change Password at Next Logon | This option forces the user to change the account password the next time he or she logs on to the EIMA system. By default, this option is already selected. |
| Account Disabled | This option deactivates the user account and does not allow the user to log on to System Administration. |
| Password Never Expires | This option lifts the x-day mandatory password change option from the user account. The user will not be required to change their password after x days. |
| User Cannot Change Password | This option prevents the user from changing the account password. |

The administrator clicks the Groups tab. The Groups card displays (discussed below).

The administrator clicks a group in the left box, then click the Add button. The group is added to the right list box and the user account is assigned to the group.

The administrator clicks the "Go" button 1425. The administrator can later modify the user account.

c. Printing a User List Report

The administrator can print a report that lists all the users and groups in the EIMA system 100. The first part of the report contains a list of current users; the second part of the report lists group information. The following data is included in the report: user name and description, group names, and password and account status of each group.

Figure 15:
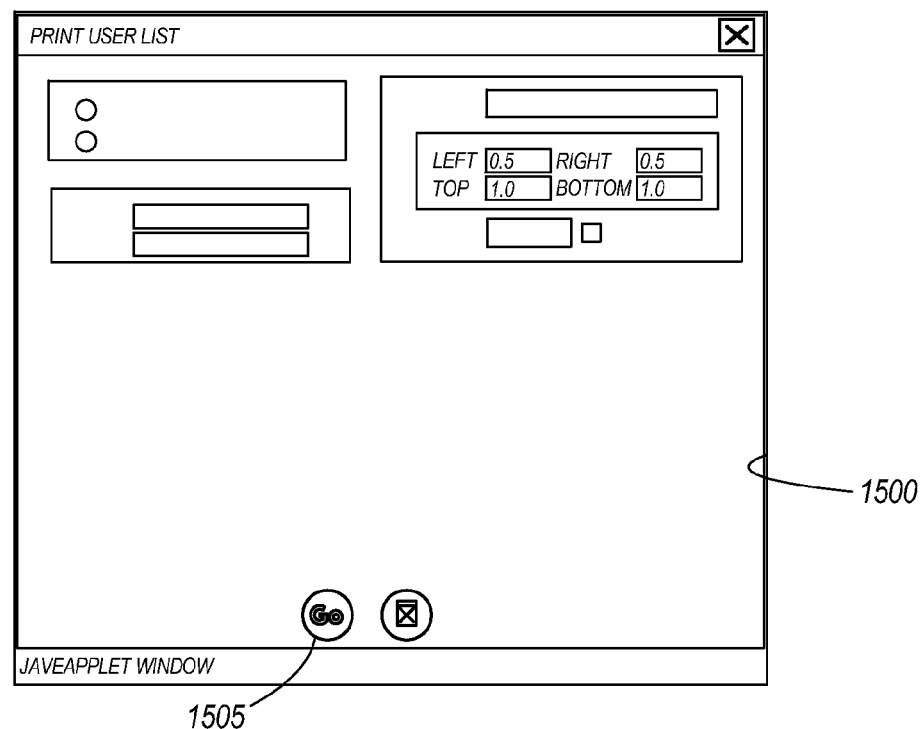
FIG. 15 is a partial screen print of the Print User List dialog box.

The administrator performs the following steps to print a User List report:

- If the User Admin options are not visible in the left pane 1305, the administrator double-clicks User Admin 1330. The User Admin menu expands.
- The administrator activates the List Users option 1320. The User List is displayed in the right pane 1310.
- Below the User List, the administrator clicks the Print User List button 1335. The Print User List dialog box 1500 opens as shown in FIG. 15.
- In the Print User List dialog box, the administrator modifies the following settings as needed.

TABLE 42

| SECTION | DESCRIPTION |
| --- | --- |
| Orientation Section | Select Portrait to print images across the short side of the page. Select Landscape to print images across the long side of the page. |
| Margins Section | Click the Units down-arrow, then select a unit of measurement. Enter the desired margin sizes in the Left, Right, Top and Bottom text boxes. Click the Resolution down-arrow, then select 150, 300 or 600. Select the Print margins option to print the margins on the page. |
| Text Properties Section | Click the Font down-arrow, then select a font for the report. Select the Size down-arrow, then select the font size for the report. |

In the Print User List dialog box, the administrator clicks the "Go" button 1505. The report is printed.

d. Removing a User Account

The administrator can permanently delete a user account using System Administration. Deleting a user account prevents the user from logging on to the EIMA system. User accounts are deleted in the Users card.

The administrator performs the following acts to remove a user account using System Administration:

- If the User Admin options are not visible in the left pane 1305, the administrator double-clicks User Admin 1330. The User Admin menu expands.
- Under User Admin, the administrator activates the List User option 1320. The User List displays in the right pane 1310.
- In the right pane 1310, the administrator clicks the row that contains the user account to delete which highlights the row in the user table.
- The administrator activates the Deleted Selected User button 1340. The application deletes the user account and removes the row from the user table.

e. Changing a User Password

There are two ways to change a user's password. As the system administrator, she can change a user's password from the Users card. Users also can change their own passwords.

f. User Information Card (i) Overview of the User Information Card

The User Information card 1400 is where user account information is entered and modified. The User Information card is comprised of the User and Group cards. The following table contains a description of the fields and options in the User card:

TABLE 43

| FIELD OR OPTION | DESCRIPTION |
| --- | --- |
| User Name Text Box | Enter a descriptive name for the user account. |
| Password Text Box | Enter the password that the user will use to log into the EIMA system. |
| Confirm Password Text Box | Re-enter the same password that was entered into the Password text box. |
| Description Text Box | Enter a word or phrase that further describes the user account. |
| User Must Change Password at Next Login Option | Select this option to force a user to change his or her password at next log on. |
| Account Disabled Option | Select this option to prevent a user from logging on to the EIMA system. |
| Password Never Expires Option | Select this option to allow a user to log on the EIMA system with the same password for an unlimited period of time. |
| User Cannot Change Password Option | Select this option to prevent a user from changing his or her password. |

(ii) Overview of the Groups Card

Figure 16:
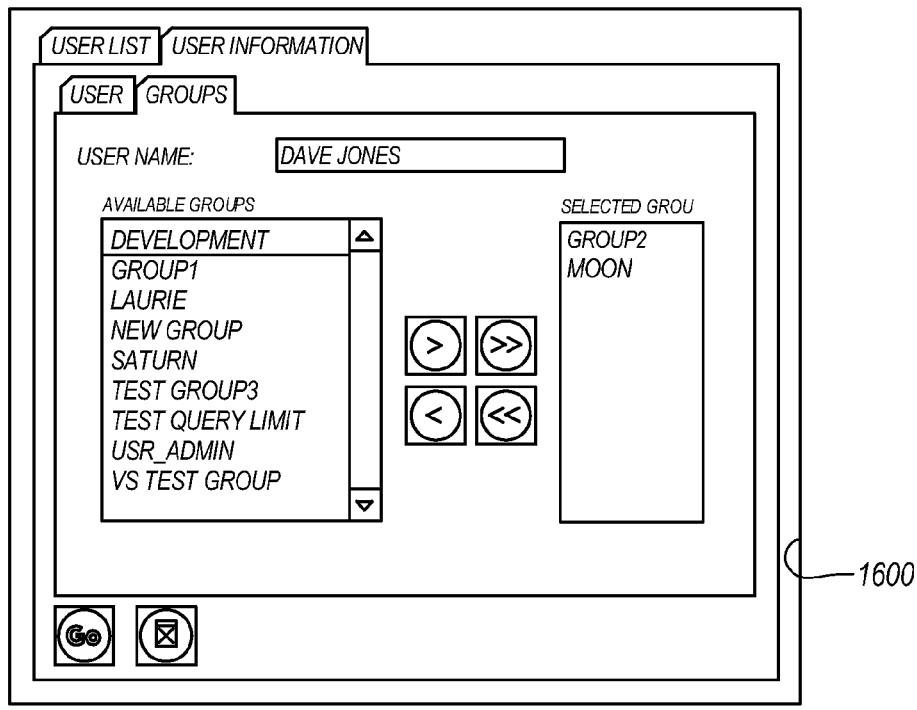
FIG. 16 is a partial screen print of the Groups card.

The Groups card 1600 (FIG. 16) is where the administrator assigns or unassigns a group or groups to a user account. The following table contains a description of the Groups card's fields and options:

TABLE 44

| FIELD OR OPTION | DESCRIPTION |
| --- | --- |
| User Name Field | Displays the name of the user account that is currently open for editing. |
| Available Groups List Box | Contains a list of all groups in the EIMA system. Depending on the number of existing groups, you may need to scroll through the list to see more group names. |
| Add/Remove Buttons: | Clicking the Add button when a group is highlighted in the Available Groups list box moves the group to the Selected Groups List. Clicking the Add All button moves all groups to the Selected Groups List. Clicking the Move button when a group is highlighted in the Selected Groups list box moves the group to the Available Groups list box, and unassigns the group. Clicking the Move All button moves all groups in the Selected Groups list box to the Available Groups list box. |
| Selected Groups List Box | Displays any groups that are currently assigned to the user. |

3. Group Administration a. Overview of Groups

A group is a collection of users with common capabilities and limitations. Groups allow the administrator to control user access and activity in the EIMA system 100. The Group Admin menu is located in the left pane 1305 and contains options for creating and managing groups. In one embodiment, the administrator can double-click Group Admin option 1335 to expand or collapse its options.

A group is made up of the following information:

TABLE 45

| INFORMATION | DESCRIPTION |
| --- | --- |
| Group name | Name assigned to a collection of users. |
| Description | Provides additional information about the group. This field also appears in the Group List window. |
| Available Query Date Range | Sets the date range that group members can query document items. |
| Capabilities | Defines the activities group members can perform in the EIMA system. Capabilities also control what programs group members can access. |

TABLE 45-continued

| INFORMATION | DESCRIPTION |
| --- | --- |
| Databases | Lists the databases that group members can query. |
| Filters | Restricts the information that group members have access to. |
| Users | User accounts assigned to the group. | b. Overview of Capabilities

A capability restricts or permits the activities that members of a group can perform in the EIMA system 100. Capabilities also control what applications a user can access. Capabilities are assigned at the group level.

Figure 17:
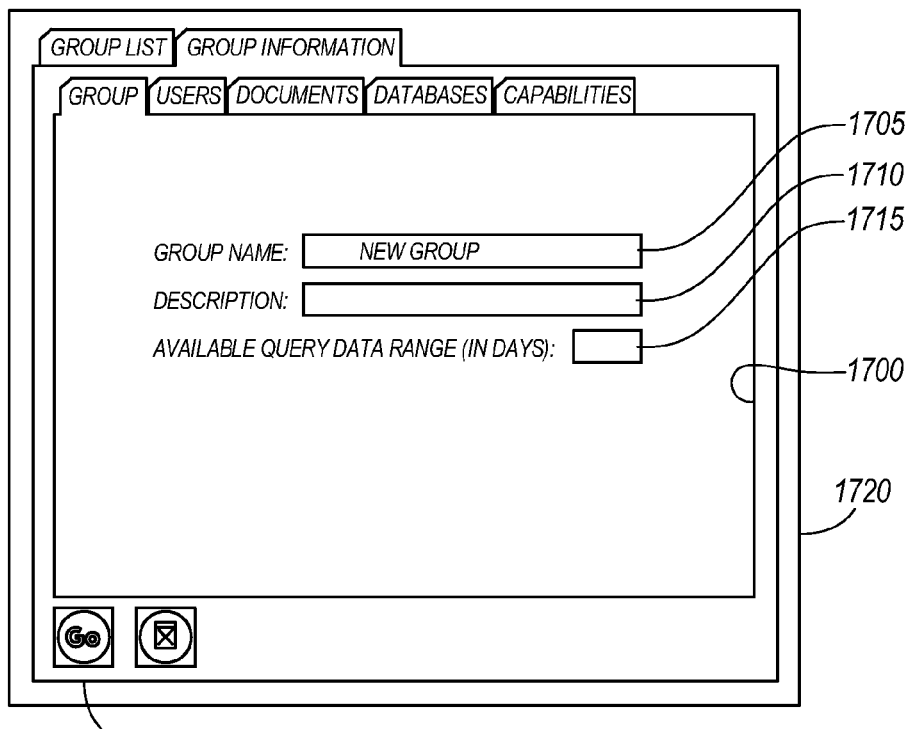
FIG. 17 is a partial screen print of the Group Control card.

There are several predefined capabilities available in the Capabilities card of the Group Information tabbed pane 1705 (FIG. 17). Capabilities are assigned when the administrator creates or modifies a group.

The following table defines each of the predefined capabilities listed in the Capabilities card of the Group Information tabbed pane.

TABLE 46

| CAPABILITY NAME | DESCRIPTION |
| --- | --- |
| ADMINISTRATION | Can view and assign categories to groups in the System Administration program. |
| CONFIGURATION | Can see and select the Configuration category. |
| DEFINE CALENDARS | Can define holiday and business days on the decision calendar and open decision windows. |
| DEFINE DECISION WINDOWS | Can determine the amount of time for a decision window. |
| DEFINE GROUPS | Can create, change or delete groups. |
| DEFINE USERS | Can create, change or delete users. |
| EXPORT 8MM TAPE | Can select a customer profile that exports images to 8 MM tape. |
| EXPORT CDROM | Can create a customer profile that exports images to a CD-ROM. |
| EXPORT DAT | Can create a customer profile that exports images to DAT tape. |
| EXPORT DATABASE | Can create a customer profile that exports images to a new database/cycle. |
| EXPORT DISKETTE | Can create a customer profile that exports images to diskette. |
| EXPORT DLT | Can export images to DLT tape. |
| EXPORT QIC TAPE | Can create a customer profile that exports images to QIC tape. |
| EXPORT REMOTE FAX | Can create a customer profile that exports images to a remote fax on the UNIX system. |
| EXPORT REMOTE PRINT | Can create a customer profile that exports images to a remote printer on the UNIX system. |
| EXPORT SQUARE TAPE | Can create a customer profile that exports images to square tape. |
| EXPORT TAPE | Can select a customer profile that exports images to tape. |
| EXPORT TRANSMIT | Can create a customer profile that exports images to a modem. |
| IMMEDIATE REMOTE FAX | Can submit fax job requests to the UNIX host system and bypass the Electronic Distribution Menu. |
| IMMEDIATE REMOTE PRINTER | Can submit print job requests to the UNIX host system and bypass the Electronic Distribution Menu. |
| NETQUERY | Can access the NetQuery program and execute queries. |
| QUERY | Grants access to the Query module. The QUERY capability allows users to see and to select the Query tab. |
| SHOW DATABASE | Can see and select databases from the Available Databases and Assigned list boxes in NetQuery. |

TABLE 46-continued

| CAPABILITY NAME | DESCRIPTION |
|---|---|
| SUPERUSER | Can create, change or delete customer profiles and also assign these profiles to any group. Users assigned to the SuperUser capability have full viewing and reading abilities on all databases and can export to all media types. |
| SYSTEMADMINISTRATION | Can access the System Administration program. | c. Adding a Group

The administrator can begin to add a new group by clicking the Add Groups option under Group Admin 1335.

The administrator performs the following acts to add a new group to System Administration:

If the Group Admin options are not visible in the left pane, the administrator double-clicks Group Admin option 1335. The Group Admin menu expands.

The administrator activates the Add Groups option. The Group control card 1700 displays in the right pane 1310 as shown in FIG. 17.

In the Group Name text box 1705, the administrator types a name for the group. In the Description text box 1710, the administrator types a description for the group. In the Available Query Date Range text box 1715, the administrator types the number of days prior to the current date that he wants group members to be able to query the selected databases.

The administrator clicks the Users tab. The administrator activates a user account in the Available Users list box, then activates the Add button. The administrator can repeat as needed.

The administrator clicks the Documents tab. The administrator activates a document type in the Available Documents list box, then activates the Add button. The administrator can repeat as needed.

The administrator clicks the Databases tab. The administrator activates a database in the Available Databases box, then activates the Add button. The database is added to the Selected Databases list box. The administrator can repeat as needed.

The administrator clicks the Capabilities tab. The administrator activates a capability in the Available Capabilities list box, then activates the Add button. The administrator can repeat as needed.

The administrator clicks the "Go" button 1720. The group is saved and displayed in the Group List. The administrator can later modify the Group.

d. Removing a Group

The administrator can delete a group from the EIMA system. The administrator performs the following steps to remove a group:

If the Group Admin options are not visible in the left navigation pane 1305, the administrator double-clicks Group Admin 1335. The Group Admin menu expands.

The administrator clicks the List Groups option. The Group List card 1800 (FIG. 18) displays in the right pane 1310.

In the right pane 1320, the administrator activates the row that contains the group the administrator wants to delete. The group is highlighted in the group table.

The administrator activates the Delete Group button. The group is deleted.

e. Group Information Card (i) Overview of the Group Information Card

The Group Information card 1720 is where group account information is entered and modified. The Group Information card contains the following cards: Group card, Users card, Documents card, Databases card, and Capabilities card.

(ii) Overview of the Group Control Card

The Group Control card 1700 is where the operator enters or views the name, description, and available query dates for a group account. The Group Control card 1700 is located in the Group Information card. The following table contains a description of the Group Control card's fields and options:

TABLE 47

| FIELD OR OPTION | DESCRIPTION |
|---|---|
| Group Name Text Box | Enter a descriptive name for the group account. |
| Description Text Box | Enter a word or phrase that further describes the group. |
| Available Query Date Range (in days) | Enter the number of days prior to the current date that you want group members to be able to query the selected databases. For example, you would enter 10 in this text box if the administrator wanted users in the group to only have access to data that is dated 10 days from the current day. |

(iii) Overview of the Users Card

The Users card is where the administrator assigns users to and removes users from a group, and is located in the Group Information card. The following table contains a description of the Users card's fields and options:

TABLE 48

| FIELD OR OPTION | DESCRIPTION |
|---|---|
| Group Name Text Box | Displays the name of the group account that is currently open for editing. |
| Available Users List Box | Contains a list of users in the EIMA system 100. |
| Add/Remove Buttons | Clicking the Add button when a user is highlighted in the Available Users list moves the user to the Selected Users list. Clicking the Add All button moves all users in the Available Users list to the Selected Users list. Clicking the Remove button when a user is highlighted in the Selected Users list moves the user to the Available Users list, unassigning the user from the group. Clicking the Remove All button moves all users in the Selected Users list to the Available Users list. |
| Selected Users List Box | Displays users that are currently assigned or going to be assigned to the group account. |

(iv) Overview of the Documents Card

The Documents card is where the administrator assigns a document type to or remove a document type from a group.

The Documents card is located in the Group Information card. The following table contains a description of the Documents card's fields and options:

TABLE 49

| FIELD OR OPTION | DESCRIPTION |
|---|---|
| Group Name Text Box | Displays the name of the group account that is currently open for editing. |
| Available Documents List Box | Contains a list of all document types in the EIMA system. |
| Add/Remove Buttons | Clicking the Add button when a document is highlighted in the Available Documents list moves the document to the Selected Documents list. Clicking the Add All button moves all documents in the Available Documents list to the Selected Documents list. Clicking the Remove button when a document is highlighted in the Selected Documents list moves the document to the Available Documents list. Clicking the Remove All button moves all documents in the Selected Documents list to the Available Documents list. |
| Selected Documents List Box | Displays all document types that are currently assigned or are going to be assigned to a group account. |

(v) Overview of the Databases Card

The Databases card is where the administrator assigns a database to or remove a database from a group. The Databases card is located in the Group Information card. The following table contains a description of the Databases card's fields and options:

TABLE 50

| FIELD OR OPTION | DESCRIPTION |
|---|---|
| Group Name Text Box | Displays the name of the group account that is currently open for editing. |
| Available Databases List Box | Contains a list of all the databases in your Titan system. |
| Add/Remove Buttons | Clicking the Add button when a database is highlighted in the Available Databases list moves the document to the Selected Databases list. Clicking the Add All button moves all databases in the Available Databases list to the Selected Databases list. Clicking the Remove button when a database is highlighted in the Selected Databases list moves the document to the Available Databases list. Clicking the Remove All button moves all documents in the Selected Databases list to the Available Databases list. |
| Selected Databases List Box | Displays all databases that are currently assigned or are going to be assigned to a group account. |

(vi) Overview of the Capabilities Card

The Capabilities card is where the administrator assigns capabilities to or remove capabilities from a group. The Capabilities card is located in the Group Information panel. The following table contains a description of the Capabilities card's fields and options:

TABLE 51

| FIELD OR OPTION | DESCRIPTION |
|---|---|
| Group Name Text Box | Displays the name of the group account that is currently open for editing. |
| Available Capabilities List Box | Contains a list of all the capabilities in your Titan system. |
| Add/Remove Buttons | Clicking the Add button when a capability is highlighted in the Available Capabilities list moves the capability to the Selected Capabilities list. Clicking the Add All button moves all capabilities in the Available Capabilities list to the Selected Capabilities list. Clicking the Remove button when a capability is highlighted in the Selected Capabilities list moves the capability to the Available Capabilities list. Clicking the Remove All button moves all capabilities in the Selected Capabilities list to the Available Capabilities list. |
| Selected Capabilities List Box | Displays all capabilities that are currently assigned or are going to be assigned to a group account. |

4. Query Filter Admin a. Overview of Query Filters

A query filter selectively screens a group of users from querying specific data in a database cycle. The administrator can use query filters to limit a group's ability to retrieve and view only items that meet the conditions of the filter. Query filters are assigned at the group and document type levels. The administrator can use query filters when it is appropriate to limit user access to just a portion of the document items in a database.

The administrator assigns the following items when creating a query filter:

TABLE 52

| ITEM | DESCRIPTION |
|---|---|
| Group | The query filter is applied to all databases that are assigned to the group. |
| Document type | The type of document the filter affects. The query filter is applied to all databases that contain the document type. |
| Conditions | A set of restrictions that identify the documents a group can retrieve or view. |

For example, the administrator may not want a user group to be able to view all document items in a check cycle. To prevent the user group from querying and retrieving every document in the cycle, the administrator can create a query filter that limits the group to retrieving only document items within a range of routing numbers. This filter will be applied to each database that is assigned to the user group and contains the same document type.

b. Overview of Query Filter Conditions

Query filter conditions define the query restrictions of a filter. A condition places a restriction that limits the values users can retrieve from a query field. A condition can be as simple as restricting a group from querying a range of account numbers or as complex as restricting a group from querying specific values in several query fields. The administrator can place several conditions in the same query filter.

Conditions are entered in the Filter Conditions card. Prior to setting query filter conditions, the operator should select the following items: the range of document items that you want to prevent the group from retrieving, the range of document items that you want the group to be able to retrieve, the query fields that will be affected by the conditions, and how the conditions will be constructed in the Filter Conditions grid. The administrator can use both comparison and logical operators to set field conditions. An operator is text that specifies what operation can be performed on the elements in a condition.

c. Overview of Comparison and Logical Operators

By using comparison and logical operators in query filter conditions, the administrator can restrict users from retrieving records that contain a particular query field value. Comparison and logical operators can be added to a query filter condition in the Filter Conditions grid.

A comparison operator compares two values and then returns an answer that is based on the result of the comparison. Comparison operators are available in the first column of the Filter Conditions table. Clicking a cell in this column opens a drop-down list of the following logical operators:

TABLE 53

| OPERATOR | DESCRIPTION |
| --- | --- |
| Equal | Retrieves records that contain an exact value in the current field. |
| Greater Than | Retrieves records that are greater than a certain value in the current field. |
| Less Than | Retrieves records that contain less than a certain value in the current field. |
| Greater Than or Equal | Retrieves records containing values that are greater than or equal to a certain value in the current field. |
| Less Than or Equal | Retrieves records containing values that are less than or equal to a certain value in the current field. |
| Not Equal | Retrieves records that do not equal a specified value for the current field. |
| Like | Retrieves records that contain a string of values in the current field. |
| Between | Retrieves records containing values that fall between a range of values in a certain field. When the Between operator is selected, the administrator needs to enter a second value for the row in the Value2 cell. The Value2 field is only active when the Between operator is selected. |

A logical operator tests if a particular argument is true or false and then performs an action based on the result. Logical operators are available in the Operators column in the Filter Conditions table. The administrator uses the following logical operators in a filter condition:

TABLE 54

| OPERATOR | DESCRIPTION |
| --- | --- |
| OR operator | Use the OR operator to test if one or another argument is true and then return any matching records that contain either arguments. |
| AND operator | Use the AND operator to test if all arguments are true and then receive matching records that contain the argument. |
| NOT operator | Use the NOT operator to exclude an argument from your query results and then receive only those records that do not contain the argument. |
| Parenthesis ( ) | Use parenthesis to enclose a logical statement in an advanced query. | d. Displaying Query Filters

The administrator can view a list of existing query filters in the Query Filters card. The administrator performs the following acts to display the query filters list:

If the Query Filter Admin options are not visible in the left pane, the administrator double-clicks the Query Filter Admin option 1345. The Query Filter Admin menu expands.

Figures 18, 19:
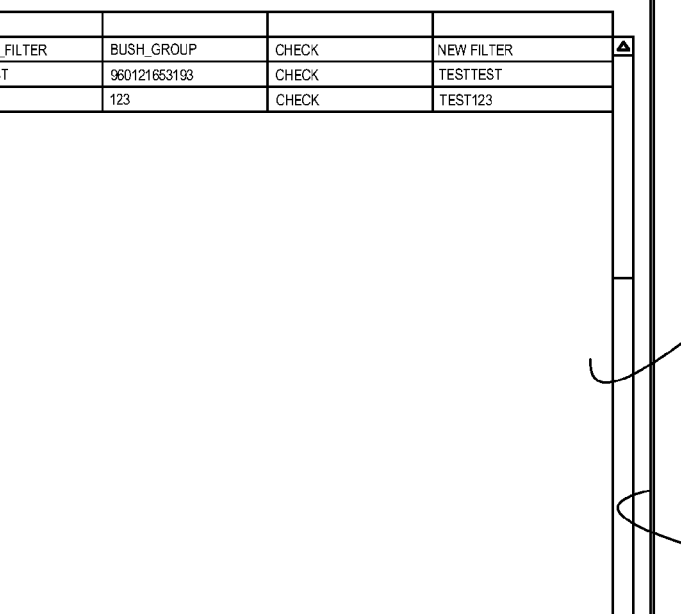
FIG. 18 is a partial screen print of the Group List card.
FIG. 19 is a partial screen print of the Query Filter List card.

The administrator activates a List Filters option. The Query Filter List card displays in the right pane 1310, as shown in FIG. 19.

e. Viewing Query Filter Information

The administrator can view existing query filters in the Filter Information card 1905. The Filter Information card 1905 contains the Query Filters and Filter Conditions tabs. The Query Filter tab contains the following information: name and description of the query filter, and group and document type assignment.

The Filter Conditions tab contains the condition of the query filter. The administrator performs the following acts to view the settings for an existing query filter.

If the Query Filter Admin options are not visible in the left pane, the administrator double-clicks the Query Filter Admin option 1345. The Query Filter Admin menu expands.

The administrator activates the List Filters option. The Query Filter List card 1905 displays in the right pane, as shown in FIG. 19.

The administrator activates the row that contains the desired query filter. The Filter Information card displays, as shown in FIG. 20. To view the description, group and document type fields, the administrator clicks the Query Filter tab. To view the query filter conditions, the administrator clicks the Filter Conditions tab.

f. Adding a Query Filter

The administrator can create a query filter to limit members of a group from querying and viewing certain documents. Query filters are added from the Query Filter List card. The administrator can set multiple conditions in the same query filter. The administrator performs the following acts to create a query filter:

If the options under the Query Filter Admin menu are not visible, the administrator double-clicks the Query Filter Admin 1345 in the left pane 1305.

In the left pane 1305, the administrator activates the Add Filter option. The Filter Information card opens in the right pane, as shown in FIG. 20.

In the Query Filter Name text box 2005, the administrator enters a name for the query filter. In the Description text box, the administrator enters a description for the query filter.

The administrator activates the Group down-arrow, and selects the group to which he wants to assign the query filter.

The administrator activates the Document Type down-arrow, and selects the document type. The filter only applies to the document type that the administrator selects.

Figure 21:
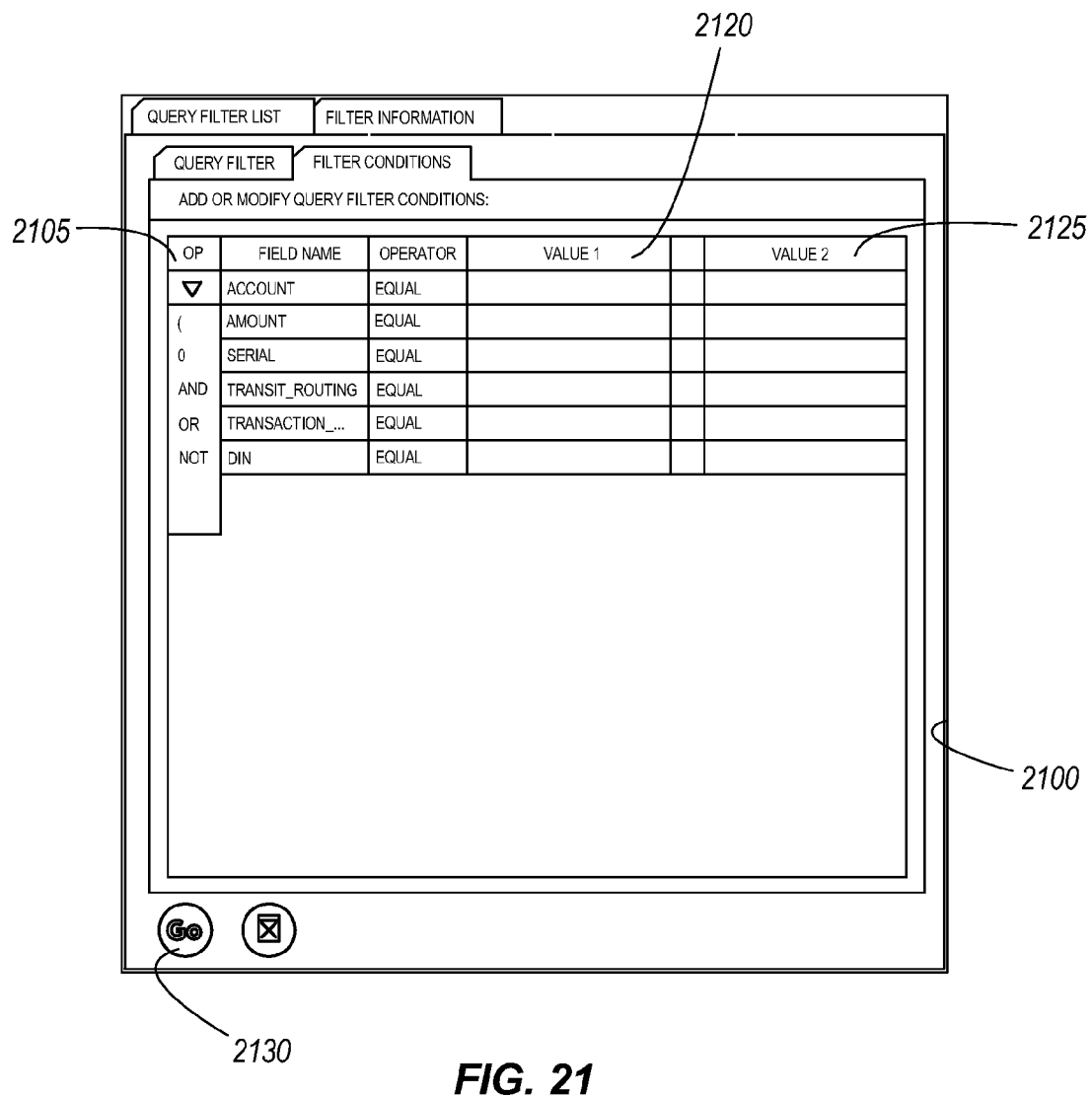
FIG. 21 is a partial screen print of the Filter Conditions card.

In the Filter Information card, the administrator clicks the Filter Conditions tab. The Filter Conditions card 200 opens, as shown in FIG. 21.

The administrator locates and scrolls to the query field that he wants to set a condition on. Next to this query field, he clicks in the Logical Operators column 2105. A drop-down list of logical operators opens. The administrator selects a logical operator from the drop-down list.

The administrator enters an appropriate value in the Value1 cell 2120.

If needed, the administrator enters an appropriate value in the Value2 cell 2125.

The administrator can repeat the above acts as needed.

The administrator clicks the "Go" button 2130 and the query filter is created.

The administrator can change the definition of a query filter. The following query filter settings can be modified: description, group, document type, and conditions.

g. Query Filter Information Card (i) Overview of the Query Filter Information Card The Query Filter Information card 2000 is where query filter information and conditions are entered and modified. The Query Filter Information card 2000 includes the Query Filter and Filter Condition cards.

(ii) Overview of the Query Filter Card

The Query Filter card is where the administrator enters query filter settings. The following table contains a description of the fields in the Query Field card:

TABLE 55

| FIELD OR OPTION | DESCRIPTION |
| --- | --- |
| Query Filter Name Text Box | Enter a descriptive name for the query filter. |
| Description Text Box | Enter a word or phrase that further describes the query filter. |
| Group List Box | Click the Group down-arrow and then select a group name. The query filter will be assigned to the selected group. |
| Document Type List Box | Click the Document Type down-arrow and then select a document type. The query filter will be applied to the selected document type. |

(iii) Overview of the Filter Conditions Card

After setting up the name, description, group, and document type for a query filter, the administrator can define the filter's conditions. Filter conditions allow the administrator to restrict the document items that a group can query and view. Filter conditions are entered in the Filter Conditions grid.

A condition limits the values users can retrieve from a query field by specifying criteria on a particular query field in a table. Conditions are applied to any databases that are assigned to the selected group and contain the selected document type and query field.

The Filter Conditions grid contains the following columns:

TABLE 56

| COLUMN | DESCRIPTION |
| --- | --- |
| Op column | Clicking in this column opens a drop-down list of logical operators. |
| FieldName column | Contains the query fields on which you can set conditions. The administrator can change the currently displayed query field by clicking in this column and then selecting a different field. |
| Operators column | Contains comparison operators. Clicking in this column opens a drop-down list of comparison operators. |
| Value1 and Value2 columns | Enter the numerical or text values that restrict what query field values the group can query. |

5. Calendar Administration a. Overview of the Decision Calendar

The decision calendar is an electronic calendar that is used to schedule a company's decision-making and non-decision making days in the EIMA system. The calendar works with decision windows to control when users can make decisions on positive pay products in the NetQuery program.

Decision windows rely on the electronic calendar's settings to determine decision and non-decision making days. The administrator defines the company's calendar year on the electronic decision calendar before creating a decision window.

The administrator does not need to set the decision calendar if an institution is not using NetQuery's positive pay module.

Figure 22:
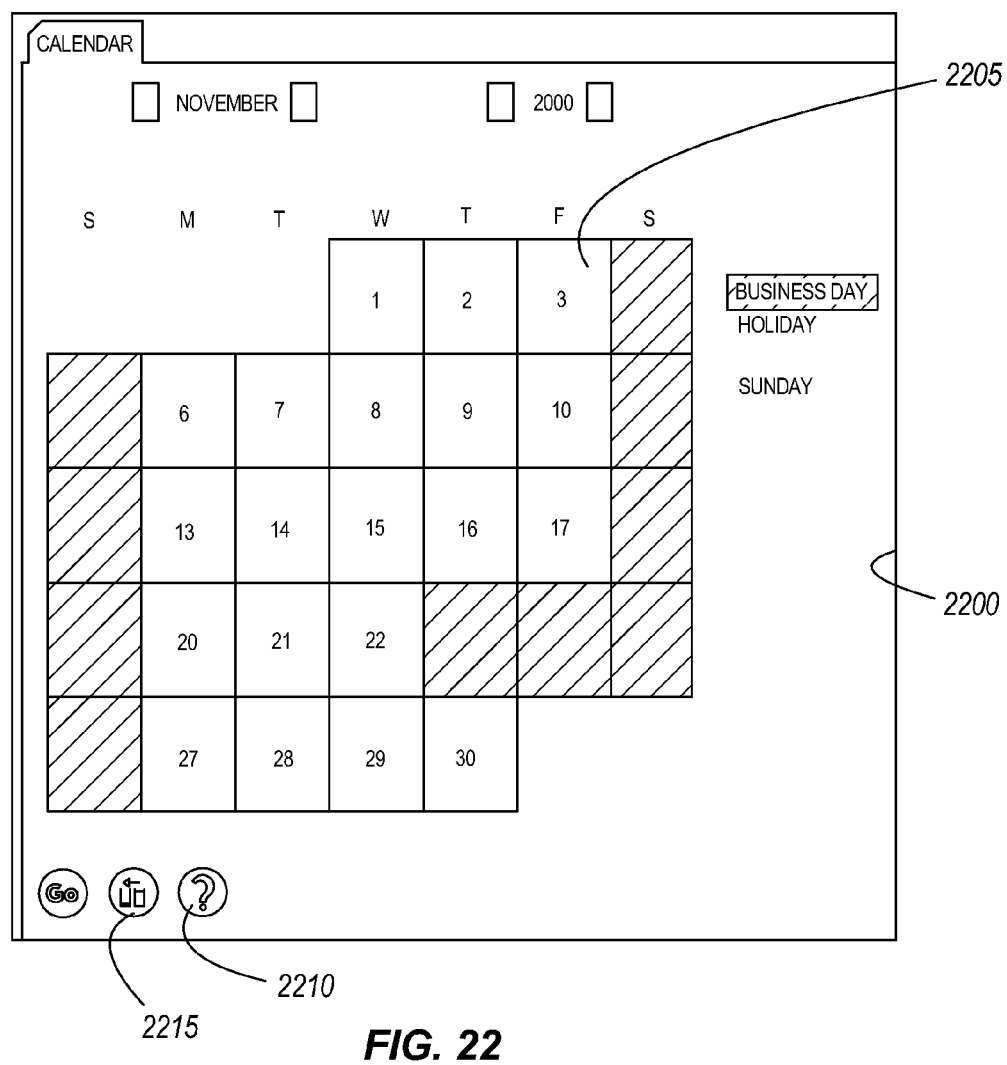
FIG. 22 is a partial screen print of the Decision Control Calendar.

On the Decision Control Calendar 2200 (FIG. 22), each square block (e.g. square 2205) designates a day of the month. Calendar days are highlighted white, green, blue or red. Of course other colors or indicators can be used. The color of a square indicates whether the day is a business day, holiday, Saturday or Sunday. The legend to the right of the calendar identifies what each color represents. In the embodiment described herein, the Table below defines each color.

TABLE 57

| COLOR | DESCRIPTION |
| --- | --- |
| White | Business/decision-making days |
| Blue | Holiday/non-decision making days |
| Red | Saturday/non-decision making day |
| Green | Sunday/non-decision making day |

By default, the following days are scheduled as decision-making days on the calendar: Monday, Tuesday, Wednesday, Thursday, and Friday. The administrator can change the status of a day by activating its square on the calendar. Changes are applied to the current month by clicking the Modify Current Month Definition button 2210. The administrator can reverse edits by clicking the Reset Calendar button 2215.

By default, users are unable to make decisions on Saturdays, Sundays, and holidays. To allow users to make decisions on Saturdays, Sundays or holidays, the administrator should change the day's color to white.

6. Decision Window Administration a. Overview of Decision Windows

A decision window defines the time frame that a group can make pay or no pay decisions on exception items in the NetQuery program. Decision windows allow the administrator to control the exact dates and times that a group can make decisions on positive pay items.

When the administrator creates a decision window, he will need to provide the following information: name and description of the decision window, group and document type assignment, conditions of the window (start and end times), and possible override conditions.

b. Listing Decision Windows

Figure 23:
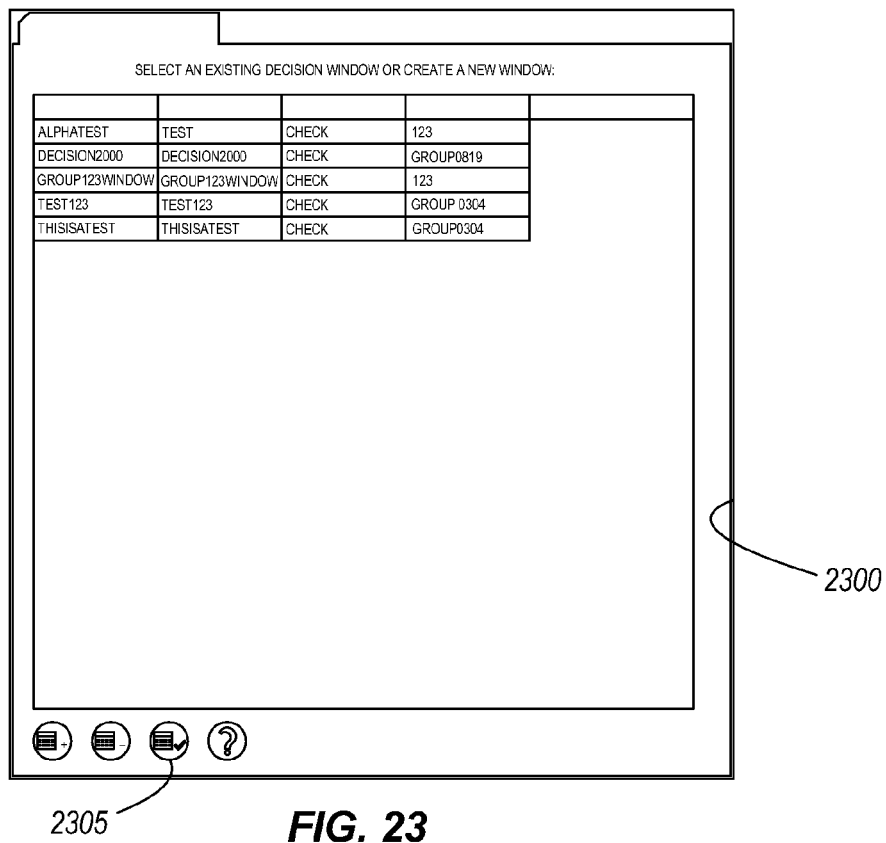
FIG. 23 is a partial screen print of the Decision Window List.

The administrator can view existing decision windows in the Decision Window List 2300 (FIG. 23). The following information is shown: the name of the decision window, description, and the assigned document type and group. The administrator performs the following acts to display all decision windows:

If the List Decision Window option is not visible in the left pane, the administrator double-clicks the Decision Window Admin option 1350. The Decision Window Admin menu expands.

The administrator activates the List Decision Window option. The Decision Window List 2300 is displayed in the right pane, as shown in FIG. 23.

c. Overview of Window Conditions

A window condition sets the duration of a decision window by defining the window's start and end times. The administrator enters window conditions in the Window Conditions card.

The following paragraphs define the fields in the Window Conditions card.

Start Delay Text Box

The administrator enters the number of days from today's date forward on which the administrator wants the decision window to go into effect. Entering "0" applies the decision window immediately (today). Weekends and holidays are not counted toward the start delay time.

Start Time Text Box

The start time determines the time that users can begin to make decisions on exception items in NetQuery. The administrator enters the exact time that he wants the decision window to be applied and then selects AM or PM from the drop-down list to the right of the field.

Days Open Text Box

The Days Open and Time Open text boxes work together to calculate the duration of a decision window. In the Days Open text box, the administrator enters the total number of days that he wants the decision window to last.

Time Open Text Box

If the administrator wants to extend the length of a decision window by a few or several hours, he enters the number of hours in the Time Open text box. This entry is based on a 24-hour clock.

Example Date Text Box

This text box defaults to the current date. This value is used to calculate the start date of the decision window in the Translation of Decision Window text box.

Translation of Decision Window Text Box

This text box is for viewing purposes. After entering values in the Window Condition section, the administrator has the option of clicking the "Go" button to display a summary of his decision window settings in the Translation of Decision Window text box. If there is an error in the summary, he can make the appropriate corrections.

d. Overview of Override Conditions

The administrator can "override" or "supersede" the conditions of a decision window by entering an exception time in the Override Condition section of the Window Conditions card. An override condition extends the decision-making time frame of a decision window.

The following paragraphs define the fields in the Override Condition section of the Window Conditions card.

Date Text Box

The administrator enters the date that he wants to be used to calculate the start date for the override.

Start Delay Text Box

The administrator enters the number of days forward from the date displayed in the Date text box on which you want the override to go into effect.

Start Time Text Box

The start time determines the time that the override condition begins. The administrator enters the exact time that he wants the override to be applied to the decision window and then select AM or PM from the drop-down list to the right of the field.

Days Open Text Box

The Days Open and Time Open text boxes work together to calculate the duration of the override condition. In the Days Open text box, the administrator enters the total number of days that he wants the override condition to last.

Time Open Text Box

If the administrator wants to extend the length of an override condition by a few or several hours, he enters the number of hours in the Time Open text box.

e. Creating a Decision Window

The administrator can begin to create a decision window by clicking the Add Decision Window option under Decision Window Admin in the left pane. The administrator should supply the following information for the decision window: name and description, group and document type assignment, window permissions, start date and duration of the window, and possible override conditions.

The operator performs the following acts to create a decision window:

If the Add Decision Window option in the left pane is not visible, the administrator double-clicks the Decision Window Admin option 1350. The Decision Window Admin menu expands.

Figure 24:
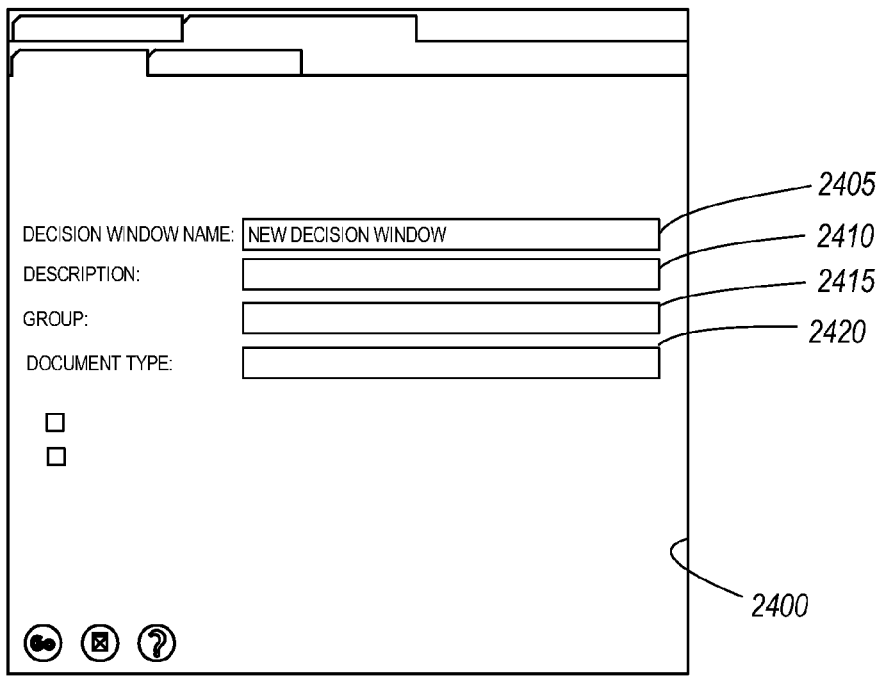
FIG. 24 is a partial screen print of the Decision Window Information card.

Under the Decision Window Admin menu, the administrator activates the Add Decision Window option. The Decision Window Information card 2400 displays in the right pane 1310, as shown in FIG. 24.

In the Decision Window Name text box 2405, the administrator enters a name for the decision window. In the Description text box 2410, the administrator enters a brief description for the window.

The administrator clicks the Group down-arrow 2415 and selects a group assignment for the decision window.

The administrator clicks the Document Type down-arrow 2420 and selects a document type assignment for the decision window.

The administrator selects or deselects the following decision window options as needed:

TABLE 58

| DECISION WINDOW | DESCRIPTION |
| --- | --- |
| Decision Allowed | When this option is selected, decisions can be made. When this option is not selected, decisions cannot be made for this document type. |
| Specify Decision Window | Select this option to establish a time limit for decisions. When this option is not selected, decisions can be made continuously without a time restriction. |

Figure 25:
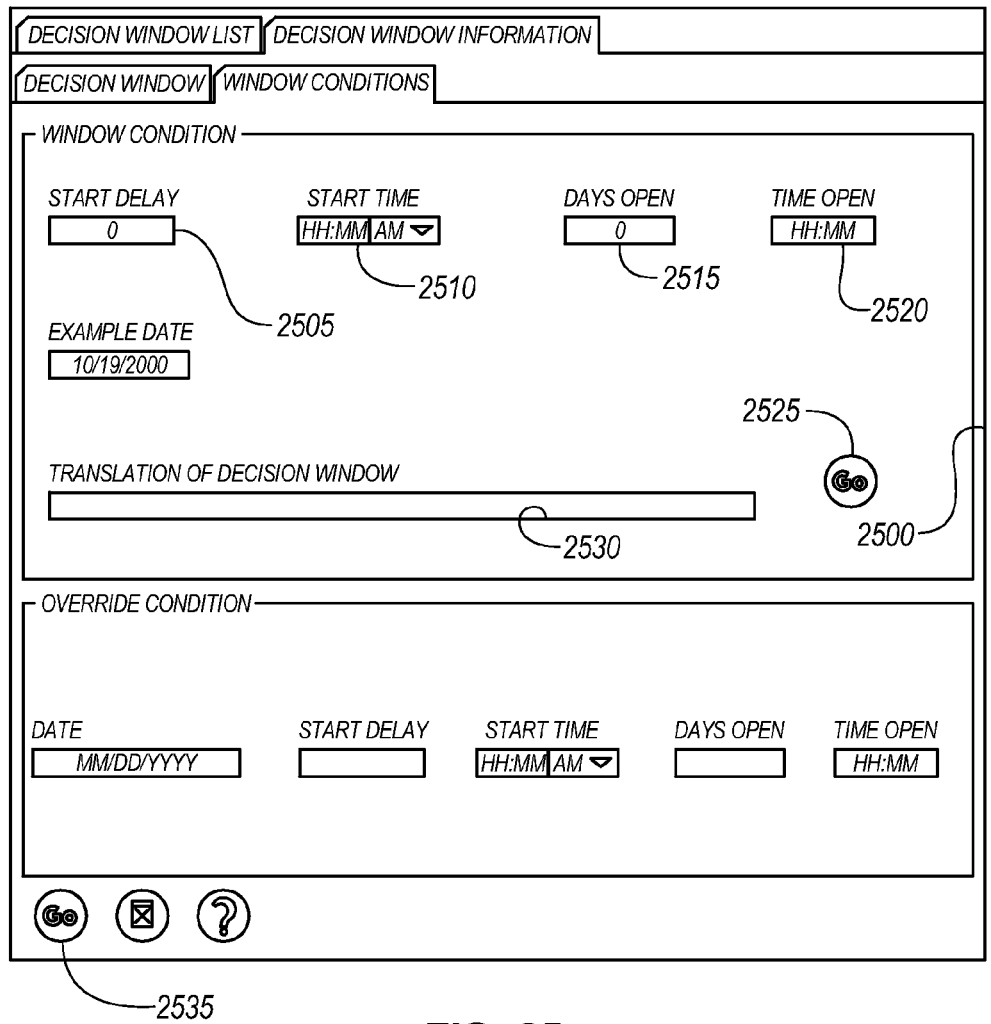
FIG. 25 is a partial screen print of the Widow Conditions card.

The administrator clicks the Window Conditions tab. The Window Conditions card 2500 displays, as shown in FIG. 25.

In the Start Delay text box 2505, the administrator enters the number of days from today on which he wants the decision window to go into effect. Enter "0" to apply the decision window immediately (today).

In the Start Time text box 2510, the administrator enters the exact time that he wants the decision window to start.

In the Days Open text box 2515, the administrator enters the total number of 24-hour days that the decision window should last. If this time is less than 24-hours, enter "0" and then enter the number of hours in the Time Open text box.

In the Time Open text box 2520, the administrator enters an additional number of hours for the decision window to extend the decision window by a few or several hours. These hours are added to the number of days already entered in the Days Open text box.

In the Window Condition section, the administrator activates the "Go" button 2525. The site displays a summary of the decision window conditions in the Translation of Decision Window text box 2530. The administrator verifies that the text in the Translation of Decision Window text box 2530 is correct. If the translation is incorrect, the administrator returns to the appropriate text boxes and modify the values. If the administrator is satisfied with the decision window, he saves the decision window and displays the new window in the Decision Window List 2300.

f. Overriding a Decision Window

The administrator can make exceptions to the duration of a decision window by entering override conditions in the Override Condition section of the Window Conditions card. The administrator should have already created or started creating a decision window. The Window Conditions card should be open. In the Override Condition section, the administrator performs the following acts to add override conditions to a decision window:

In the Date text box, the administrator enters the date that he wants to be used to calculate the start date for the override.

In the Start Delay text box, the administrator enters the number of days from the current date on which he wants the override to go into effect. Enter "0" to apply the override immediately (today).

In the Start Time text box, the administrator enters the start time for the override.

In the Days Open text box, the administrator enters the number of days that he wants the override to last.

In the Time Open text box, the administrator enters the additional number of hours that he wants the override to last.

In the Window Conditions card, the administrator clicks the Go button. Saves the changes to the decision window and displays the Decision Window List card.

g. Modifying a Decision Window

The administrator can edit the definition of an existing decision window. To begin editing a decision window, the administrator double-clicks the decision window row in the Decision Window List or clicks the decision window row and then click the Modify Decision Window button 2305.

The operator performs the following acts to modify a decision window:

If the List Decision Window option is not visible in the left pane 1305, the administrator double-clicks Decision Window Admin 1350. The Decision Window Admin menu expands.

The administrator clicks the List Decision Window option. The Decision Window List 2300 displays in the right pane, as shown in FIG. 23.

The administrator clicks the row that contains the decision window he wants to modify. The row is selected.

The administrator clicks the Modify Decision Window button 2305. The Decision Window Information card 2400 opens.

The administrator edits the text boxes that contain the values he wants to change.

The administrator can click the Window Conditions tab. The Window Conditions card 2500 opens.

The administrator can then edit the text boxes that contain the values he wants to change.

After modifying the decision window, the administrator clicks the "Go" button 2535. The changes are saved to the decision window.

h. Decision Window Information Card (i) Overview of the Decision Window Information Card The Decision Window Information card is where decision window information and conditions are entered and modified. The Decision Window Information card is comprised of the Decision Window and Window Conditions cards.

(ii) Overview of the Decision Window Card The Decision Window card is where the administrator enters or views the name, description, and other settings for a decision window. The Decision Window card is located in the Decision Window Information card. The following table contains a description of the fields and options in the Decision Window card:

TABLE 59

| FIELD OR OPTION | DESCRIPTION |
| --- | --- |
| Decision Window Name Text Box | Enter a descriptive name for the decision window in the Decision Window Name text box. |
| Description Text Box | Enter a word or phrase that describes the decision window. |
| Group Down Arrow | Click the Group down arrow to view and then select the group that you want the decision window to be applied. |
| Document Type Down Arrow | Click the Document Type down arrow to view and then select the document type that will be affected by the decision window. |
| Decision Allowed Option | Select this option to allow users in the selected group to make decisions on items in the document type. When this option is not selected, decisions cannot be made for this document type. |
| Specify Decision Window Option | Select this option to establish a time limit for decisions. When this option is not selected, decisions can be made continuously without any time restrictions. |

(iii) Overview of the Window Conditions Card

The Window Conditions card is where the administrator enters criteria settings for a decision window, and is located in the Decision Window Information card. The following table explains the fields and options in the Window Conditions card of the Window Conditions section:

TABLE 60

| FIELD OR OPTION | DESCRIPTION |
| --- | --- |
| Start Delay Text Box | Enter the number of days forward that the administrator wants the decision window to go into effect. This number will be added to the date that is displayed in the Example Date text box. Enter "0" to have the decision window applied on the same date that appears in the Example Date text box. |
| Start Time Text Box | Enter the exact time that the administrator wants the decision window to start. Click the Start |

TABLE 60-continued

| FIELD OR OPTION | DESCRIPTION |
|---|---|
| Days Open Text Box | Time down-arrow and then select AM or PM. Enter the total number of 24-hour days that the decision window should last. If this time is less than 24-hours, enter "0" and then enter the number of hours in the Time Open text box. |
| Time Open Text Box | Enter the additional number of hours that the administrator wants to extend the decision window by. These hours are added to the number of days already entered in the Days Open text box. |
| Example Date Text Box | By default, the current date is displayed in this text box. Enter the date that the administrator wants to be used as the base start date for the decision window. |
| Translation of Decision Window Text Box | You can click the Save Record (e.g., Go) button. The Translation of Decision Window feature is provided to assist the administrator in determining if his window conditions are correct. If he finds that the translation displayed in this text box is incorrect, the administrator will review and then edit the appropriate fields in the Window Condition section. |

The following table explains the fields and options in the Override Condition Section.

TABLE 61

| FIELD OR OPTION | DESCRIPTION |
|---|---|
| Date Text Box | Enter the date that the administrator wants to be used to calculate the start date of the override. |
| Start Delay Text Box | Enter the number of days forward from the date displayed in the Date text box on which the administrator wants the override to go into effect. Enter "0" to have the override take effect on the same date that appears in the Date text box. |
| Start Time Text Box | Enter the start time for the override. |
| Days Open Text Box | Enter the number of days that the administrator wants the override to last. |
| Time Open Text Box | Enter the additional number of hours that the administrator wants the override to last. |

E. Repair Graphical User Interface (GUI)

1. Introduction to Repair GUI a. Overview of Repair GUI

The functions of the Repair GUI are similar to the MICR Repair and Quality Monitor modules in that Repair GUI helps control the quality of the Image Capture process by allowing the user to view images as well as correct MICR field data. The Repair GUI may also be customized to meet specific needs.

The Repair GUI has two operating modes: Repair mode and Monitor mode. When the user logs into the Repair GUI, the user chooses whether to use its monitor or repair capabilities. The user enters the Repair mode to correct any scanning errors that corrupted MICR data. The user may also use it after the image matching (Image Match) process to correct free items. The fields that appear in the Repair GUI are defined by a system administrator.

During Image Capture, the user can enter Monitor mode to display samples of the images as they are scanned. If the user spots scanning errors, the scanner can be adjusted, enabling immediate correction.

b. Terminology

In general, UNIX menus refer to databases and cycles, while some PC applications (including Repair GUI) refer to set names and set dates. In general, the following terms are defined as below.

TABLE 62

| TERM | DESCRIPTION |
|---|---|
| Set Name (or just Set) | A Database that has been matched (or entered). |
| Set Date | The Cycle of the Database that was matched. |
| Database | Usually refers to a superset (a container) for database files. In Repair GUI it is the generic name given to a group of cycles, all contained under the database name. It is analogous to a named directory or folder, which contains a number of related files. |
| Cycle | Refers to a database file name, which is based on a date/cycle of document scanning. Generally the cycle is the calendar-based date the scan is run, and is incremented daily. The format varies, but is usually of the form year-month-day. With this format a scan database run on 3 Jan. 2000 will be the cycle value 20000103. However, the specifics of the format and value will depend on institution's requirements. |
| Free items | Are those items that were scanned into the cycle but not listed in the Match Control File. |
| Match Control File (MCF) | Is a database file containing the information required to relate a scanned image to the MICR data for each scanned object. |
| Objects | Refers to scanned documents, such as checks. The term is also applied to the database representation of these documents, both image and MICR data. |
| MICR | Is the acronym abbreviation for magnetic ink character recognition. Magnetic ink is used for printing on checks and similar documents, thus recording information in a machine-readable format. In the case of checks and some other documents it is often in a form that is also readable to humans. Sometimes the magnetic ink becomes smudged or otherwise damaged and the machine cannot read this information reliably. In these cases the data representing the scanned document (e.g. a check) is recorded (flagged) as in need of repair. A human operator is then called on to determine the correct information and enter that correct information using Repair GUI's MICR Repair function (Repair). |
| Timeout value | Is the number of seconds that the Repair GUI will wait for a response from the server before it prompts the user for a choice of either canceling an action or continuing to wait on its completion. | c. How Repair Works

Repair mode is used for correcting any scanning errors detected by Image Capture or Image Match. The corrections are made to the database index, which is where the data is stored. The database index contains the image location, MICR data, and any other data associated with the image. Repair is usually performed any time after Image Capture has detected faulty data or to correct free items remaining after Image Match.

During Image Capture, the scanner scans the items (documents, such as checks) and reads the MICR data. MICR data is the record of field values for a number of variables printed (in magnetic ink) in specific locations on the original document. Field values may include account numbers, check numbers and related data, depending on specifics of the documents recorded, and the customer requirements. The scanned digital images and associated MICR data are sent to the UNIX host, where Image Capture stores the images in an image database and records the image location and associated field value data in the database index.

Image Capture passes the data through a series of validations. Validation fails if there is one or more unreadable characters, a missing field, or the number of characters is incorrect. The data may fail validation because the scanner did not read it correctly. Situations that may result in unreadable data include: a document is fed at an angle into the camera area, labels are incorrectly placed, or the image has marks or scratches across the MICR data area.

If any of these situations should occur, it becomes necessary to fix the data contained in the database index file. The index is flagged for each image that has a detected problem.

During repair, each index item needing repair is displayed on the workstation one at a time. The operator enters the missing or corrected data. The scanned images themselves are not changed. Instead, the data stored in the database index is corrected.

2. Repair GUI/Host System a. Starting and Killing the Repair Server

Before starting a Repair GUT session on the workstation, the user should first start the repair server. Starting the repair server was discussed earlier. After the user is finished with the Repair GUT session, the user kills (i.e., stops) the repair server.

3. Repair GUI/PC Module a. Starting Repair GUT

The Repair GUT Repair mode can be used anytime after Image Capture identifies an item with duplicate or unreadable data. If the user needs to enter data for an empty field or to edit other data that the system has not tagged as needing repair, he creates a Repair Set while in Monitor mode. From the workstation, the user initiates Repair by performing the acts below:

Ensure that the PC workstation is powered on, Windows is running, and the repair server is started. The user then starts the Repair GUI.

Once the Repair GUT application is running, the user logs in. Two login branches are available at this point: Standard login, which assumes that the Host, Port number, and Timeout value, are already set and appropriate; and Advanced login, which permits changes to server, including Host, Port number, and/or Timeout value.

The user chooses a type of login and enters his User Name and Password. The Repair function is now active.

From the Main Menu, the user selects a Session/Get Set Names option. The Repair List window appears.

From the Repair List window, the user selects the Set-Name, SetDate and Batch ID he wishes to repair. The document type of each set is also displayed in this window. In this list the user is permitted to see only those sets the user group(s) that he belongs to as a Repair GUI user. The user groups are established by the system administrator.

After the user has made his selection of SetName, SetDate, and Batch ID, the images and editable data will appear.

b. Navigating Repair GUI

The Repair GUI main screen contains the image(s) and the image's respective associated field data. The user can cycle through the images and change field data by use of various image controls. The screen includes two image windows. The image displayed in the first window defaults to the object's front view. The image displayed in the second image window defaults to the back view. The user can force the image back view to appear in the first window, by selecting Options/Swap Image. The user may also specify a third image window.

The user can also enlarge and shrink the image windows and arrange them as desired by clicking and pulling on the window's borders. Further, the user can also click and drag the mouse to zoom in on a specific rectangular section of an image.

The user can browse through the images and further manipulate them by clicking on image manipulation buttons. The following table explains the navigational functions of the various buttons in the image windows:

TABLE 63

| BUTTON NAME | FUNCTIONAL DESCRIPTION OF BUTTON |
|---|---|
| First Item button | Returns to and displays the first image (and associated data) in the currently selected set, cycle and batch. |
| Previous Item button | Displays the previous image (and associated data). |
| Next Item button | Displays the next image (and associated data). |
| Fit current image in window button | The user clicks this button after he has zoomed in and wishes to view the image at normal size again. |
| Rotate Clockwise button | Rotates the current image 90 degrees clockwise. |
| Rotate Counter-clockwise button | Rotates the current image 90 degrees counter-clockwise. |
| Mirror Horizontally button | Mirrors the current image around the horizontal axis. |
| Mirror Vertically button | Mirrors the current image around the vertical axis. | c. Creating Shortcuts

Repair GUI contains two separate types of keyboard shortcuts: Old Style Shortcuts and Stored Field Values shortcuts. Old Style Shortcuts are shortcuts that are set by the software. Stored Field Value shortcuts are created by the user.

Stored Field Value shortcuts are useful if the user uses certain fields that consistently contain the same values. Simple keystroke shortcuts allow the user to enter the field values he sets for each keyboard shortcut. For the embodiment described herein, the shortcuts involves pressing the <CTRL> key and a single-digit number. For instance, the user can define a stored field value so that when he hits <CTRL>+1, the field is filled with the pre-set Value.

To define Stored Field Value shortcuts, the user performs the following acts:

From the main menu, the user selects an Edit Stored Field Values option. The Stored Field Values dialog box appears.

In a Field column, the user enters a field number (1 through 0) to be associated with the keyboard shortcut. Field numbers correspond to the order the fields are listed on-screen. Therefore, if the user is attempting to set up a shortcut for the Account field, and this is the first field listed on-screen, then he would put a 1 in the Field column next to whatever shortcut he likes. It is recommended that the user uses <CTRL>+1 for the first field, <CTRL>+2 for the second field, etc. The zero in the Field column indicates the 10th field.

In the Value column on the right, the user enters the values he wishes to insert when he hits the respective shortcut keys. The values may contain numbers or letters and should be as long as the field in which they are going to be inserted.

The administrator clicks "OK" to accept the shortcuts, or clicks "Cancel" to reject them. These shortcut values are saved by the Repair GUI and remain until they are changed.

d. Repairing Items

After the user selects the repair set, he can resize the image by dragging the borders of the window. The user can also resize the Fields window so that the fields are more visible.

For each image, the user examines the field data in the information line and edit that data as needed. The user may define special characters that appear in place of unclear and missing characters using the parameters file that is associated with each database. For instance, the user might use an "!" to appear in place of unclear characters and an "M" in place of missing characters.

The user clicks the Update button to save changes and move to the next item. If the user is uncertain whether the item needs updating, the user can click "Skip" to move the current item to the end of the file. If an item does NOT need updating, the user clicks Update without making changes, so the item does not reappear.

If certain fields have been defined as "Mandatory", the user will not be able to proceed if a Mandatory field contains no data. If the user clicks Update, the user will receive a warning message. (e.g., "This operation will permanently remove this item. Continue? You will be unable to proceed to the next item until you select either Yes or No.")

The Fields window's title bar lists the errors contained in the current batch. When the user clicks the Update button, this number decreases.

When there is no longer a number in the title bar of the Fields window, the current batch has been totally repaired. Additionally, no images will appear on-screen.

e. Deleting Items

To delete the current image, along with its accompanying data, the user clicks the Delete button. Since this will permanently delete the item from the database, a confirmation request message appears. The item is removed from the database when the user confirms the request.

f. Customizing Repair GUI

Within repair GUI, the user has options to customize the application. These are available from the Options menu. These options are available for both Repair and Monitor modes. The following is a list of available options:

TABLE 64

| OPTION | DESCRIPTION |
| --- | --- |
| Login on Startup | Automatically causes the Login window to appear after the user launches the application. Saves the extra step of clicking the Login button. |
| Get Sessions After Login | Automatically causes the Repair List window to display after the user logs in, so he can immediately choose a Set Name, Date and Batch. |
| Confirm Disconnect on Exit | This will cause a dialogue box to appear, to confirm that the user wants to exit the program. |
| Auto GetFirst on GetSession | If this option is selected, the first image is automatically displayed after a set has been selected. If this option is not selected, when a new cycle is selected any image on-screen from the previous cycle will remain on the screen until the First Item button is clicked. |

TABLE 64-continued

| OPTION | DESCRIPTION |
| --- | --- |
| One Step Cycle Selection | Main Menu/Option/One Step Cycle Selection is a useful tool when the user has many cycles and databases on the system. If the One Step Cycle Selection is selected, then all database names, cycles, and batch id's are displayed at once. If One Step Cycle Selection is not selected, then only the database names are listed. Select the database, and then all the cycles for that database will be displayed. Next, select a cycle, and all the batch id's display. Finally, select the batch id the user wants. |

For the embodiment described herein, these preferences are automatically saved to the registry so that next time you run the application they will be loaded.

g. Available Options

The following table describes various options available in Repair GUI.

TABLE 65

| MENU SELECTION/ BUTTON | DESCRIPTION |
| --- | --- |
| Session or Login Button | Log in to Repair GUI in either Repair or Monitor mode. |
| Session or Select Repair Set Button | Select the Set Name, Date and Batch of images the user wishes to repair or monitor. |
| Session or Logout Button | Logs out of the current mode. |
| Session/Exit | Exits Repair GUI. |
| Options/Login on Startup | Automatically causes the Login window to appear after you launch the application. Saves the user the extra step of clicking the Login button. |
| Options/Get Sessions After Login | Automatically causes the Repair List window to display after you login, so the user can immediately choose a Set, Name, Date and Batch. |
| Options/Confirm Disconnect on Exit | This causes a dialogue box to appear confirming that the user wants to exit the program. |
| Options/Reset Window Positions | If the images begin to display improperly because of re-sizing of windows, select this option to correct the problem. |
| Options or Set Timer Button | Set the delay before image updates in seconds. |
| Options/Swap Images | Swaps back and front of image in the current view. |
| Options/Auto GetFirst on GetSession | If this option is selected, the first image is automatically displayed after a set has been selected. |
| Options/Advanced/ Create Repair Set | Marks a subset of items for repair. When this option is selected, the user can specify a search criterion that will mark the appropriate fields for repair. |
| Options/Advanced/ Delete Repair Set | Deselects the items marked by Create Repair Set. |
| Options/Advanced/ Class Groups | Enables the user to define groups of fields that appear in the Repair GUI. |
| Options or Delete Button | Deletes image and data currently on-screen. |
| Options/Edit Stored Field Values | Allow the user to create shortcuts for fields that repeatedly have the same data. |
| Options/Enable Old Style Shortcuts | When this is checked, the user can use <Page Down> to fill all the viewable fields with nines, or use <Page Up> to blank out the current field. |
| First Image Button | First Image Button. Displays first image and associated data in database. |
| Last Image Button | Displays last image and associated data in database. |
| Previous Image Button | Displays previous image and associated data in database. |
| Next Image Button | Displays next image and associated data in database. |
| Scale to Fit Button | Fits image in current window. Used to display image at normal size after zooming in on image. |

TABLE 65-continued

| MENU SELECTION/ BUTTON | DESCRIPTION |
|---|---|
| Rotate Clockwise Button | Rotates image 90 degrees clockwise. |
| Rotate Counter-clockwise Button | Rotates image 90 degrees counter-clockwise. |
| Mirror Horizontally Button | Mirrors the current image around the horizontal axis. |
| Mirror Vertically Button | Mirrors the current image around the vertical axis. |
| Update Button | Click after correcting field data. |
| Skip Button | If field data is OK, click to skip to the next image in database. |

4. Monitor Mode a. Overview of Monitor Mode

Repair GUI's Monitor mode is used in conjunction with the UNIX-based Image Capture program to monitor the documents scanned into database files. This option helps to ensure the accuracy of the data. The user can compare the data recorded from the scanning operation to the data on the associated image. By doing spot checks the user can detect scanning errors or burned out scanner light bulbs, and reset the scanner if necessary.

There are two ways to use the monitor capability: while the items are being scanned and after items have been scanned into a database. The Repair GUI should not be started until after capture has begun. This is because the capture process creates the Batch ID that the Repair GUI needs in order to retrieve the images.

b. Initiating Image Capture

The operator performs the following acts to initiate Image Capture:

At the UNIX host system, from the Capture/Browse Images Menu, the user starts Image Capture. The user enters a database/cycle name for the group of images to be scanned.

At the PC workstation, the user selects the Repair GUI application.

Once Repair GUI is running, the user clicks the Login button. The Login window appears.

The user then enters the User Name and Password, and selects Monitor Mode. If the user wishes to change the server, he clicks the Advanced button and specify the Host, Port Number and the Timeout value.

The user clicks "OK" to finish the login.

At the main window, the user clicks the Select Repair Set button or select Session/Get Set Names. The Repair List window appears.

Highlight the SetName, SetDate and Batch to work with. This will be the same name as chosen in step 2 for the database cycle name.

The user clicks Select to continue and start the scanning operation.

The user views selected document images. During Image Capture, to view the images on the PC as they are scanned, the user clicks the Repair GUI buttons to change images as described above. The user can also set the timer to automatically update the images for spot checking image quality. The Repair GUI monitor then displays a sampling of the images after they are added to the database.

When the user has finished viewing images, he selects Session/Exit.

c. Setting the Timer

The Monitor mode timer can be set to display a new scanned image at intervals (integer seconds) controlled by the user. To set the timer, the user should already have selected a SetName, SetDate and Batch repair set. If the timer is set when the scanner is not running, then the same image will be refreshed, over and over as long as the button remains active.

d. Reviewing Previously Scanned Documents

The process is the same as for reviewing scanning images (Initiating Image Capture) except there is no need to start the scanner. Additionally, there is no need to set the timer since all the images have already been scanned. The user can use the navigation buttons to view the images.

In one embodiment, the Field portion of the screen is "greyed-out" when in Monitor mode (instead of having a "white background" as during Repair mode). This is to prevent the user from editing fields in Monitor Mode. Instead, the user is simply viewing the images and their associated data. If there is a need to edit field data, the user uses the Repair mode.

5. Repair Sets a. Overview of Repair Sets

For the system described herein, there are two methods available for updating field data: Batch Update (discussed earlier), and Repair GUI. Repair GUI allows the user to create repair sets. Repair sets let the user mark a subset of items in a cycle for repair. The user creates the repair sets while in Monitor mode, but the repair sets the user creates are accessed and modified in Repair mode.

The repair set process works in much the same way as a query filter. The user may want to repair only images that have amounts between $100 and $500, for instance, or to repair images that have only a particular serial number (or series of serial numbers). If an item in a cycle fits the criteria defined for the repair set, it is "tagged" as having an error. The user can delete the repair set later, and subsequently "un-tag" the items.

b. Creating Repair Sets

The user performs the following acts to create a Repair Set:

The user logs into Monitor Mode and clicks on the Select Repair Set button to open the Repair List window.

The user clicks on a Set Name.

The user selects the Repair Set option to mark a subset of items for repair (thus creating a repair set). A Repair Items Criteria window appears, which displays a vertical column list of fields that are open for repair. The user can use that list of fields to filter the items to be repaired. The list contains three columns from left to right: Field, Operator, and Value.

To create a selection criteria expression for a repair set, the user double-clicks on one of the field names in the Field column. A window for that field appears to allow the user to create an item filter expression for the field.

The user selects an operator to use to filter items.
The user types a value into the blank box that appears to the right of the Operator selection buttons.
Operator definitions are provided below.

TABLE 66

| OPERATOR | DEFINITION |
|---|---|
| = | equal to |
| != | not equal to |
| < | less than |
| > | greater than |
| =< | less than or equal to |
| >= | greater than or equal to |

If the user selects equal to (=) or not equal to (!=), a Range check box will appear, for specifying a range of values. To specify a range for the field, click the Range check box. The window is then enhanced with a pair of data entry windows, so the user can enter the minimum and maximum values in the spaces provided. For convenience, in the window space below the range values, the Amount window will display any previously entered ranges from which the user may select.

For example, if the user needs to create a repair set that includes all capture dates between Jan. 1 and Jan. 15 of the year 2000. In this example, the user selects the Operator= (equals) and clicks the Range check box that appears. When the user clicks the Range box, two unlabeled data entry windows will also appear. In the left data entry window the user enters 0000000020000101 (year 2000, $1^{st}$ month, $1^{st}$ day). In the right data entry window the user enters 0000000020000115 (year 2000, $1^{st}$ month, $15^{th}$ day).

The user clicks OK to return to the Repair Items Criteria window. Repeat the procedure for any other available fields, as needed.

When finished, the user clicks "OK". Clicking "OK" starts the process that marks the applicable items for repair.

6. Class Groups a. Overview of Class Groups

The Class Groups option enables the user to define the fields that appear for each document or image class in the system.

The user may classify fields as:

TABLE 67

| FIELDS | DESCRIPTION |
|---|---|
| Mandatory | The field must be filled and may not be left empty. |
| Optional | The field is available for edit, but the field may be left empty. |
| Read Only | Editing of the field is not permitted, but it may be viewed. |

Each user that is allowed to perform repairs must be assigned permission to do so through the use of class groups. The system administrator defines class group fields that certain user groups may view via the assigned class groups. The user can add and delete class groups. Inadequate class groups cannot be modified, only deleted and recreated (added).

b. Adding Class Groups

To give a user group permission to repair a class, the user performs the following acts:

From the main menu, the user selects the Class Groups option. A Classes window appears, listing all the classes defined in the database.

On the folder tree that appears, the user clicks on the "+" next to Classes to open the Classes folder. Locate under each specific class are the Fields for that class and any class Groups that have already been created. The user clicks a "+" or "−" to expand and contract the tree as needed. The defined Class Groups are listed under the Groups folder for each class. Each user group that can repair that document class is listed in the Groups folder. The Fields folder lists the fields that can be viewed for repair via Repair GUI.

To add a new group to a class, the user highlights the desired class and clicks the Add Group button. The Add Group for class xxxx window appears. Only the user groups that the user (as the Repair GUI user) are a member of will be listed in the User Group list box. If the user has something other than a class highlighted, he will receive an error message stating "You must select a class in order to add a group."

In the Description field, the user enters a description of the class group that will appear in the tree under Groups.

The user uses the User Group list box to select the desired User Group.

For each category (e.g., Optional Editable Group Fields, Mandatory Editable Group Fields or Read Only Group Fields), the user selects the fields to be included by highlighting them in the Class Fields column and clicking the Add Fields button, to transfer them to the appropriate Group Fields column. If the user changes his mind about a field, the user clicks the Remove Fields button to transfer unwanted fields from the applicable Group Fields column back to the Class Fields column.

When finished, the user clicks "OK".

F. Reconciliation

1. Overview of Reconciliation

Reconciliation provides for manual batch reconciliation of Free Items and matching Missing Items into the archive.

Free Items are images scanned during the capture process that the system is unable to match with any item from the Match Control File (MCF). The client site provides MCFs. The MCF is used to enable the system to link images and Magnetic Ink Character Recognition (MICR) data read from the images to the respective object's data that is stored in the MCF. The MCF theoretically should contain the correct information for every object captured.

Missing items are those items identified in the client-supplied Match Control File (MCF) that do not have identified object images (and MICR data) with which they can be matched. This usually occurs because the images captured have faulty MICR fields that the system could not read, or the matching image objects were not scanned in.

In one embodiment, reconciliation runs on the client using Java Runtime Environment (JRE), Java Advanced Imaging (JAI), and CORBA. Other environments are possible.

Reconciliation displays each Free Item, along with the most likely missing items from the Match Control File (MCF) for that batch. When a user chooses (and confirms) the Match Control File row that is appropriate for a free item, the data for the Free Item is modified to equal that Match Control File data. The application then marks that image as Matched and that image is immediately available for querying and other archive functions, such as export and statement print. In order for the Missing Item Report, Free Item Report, and Match Statistics to be updated, the user must also select the "Update Match Reports" option from the UNIX Match Menu.

2. Logging In

The user performs the following acts to login in the Reconciliation application:

The user launches the Reconciliation application. The Login screen displays.

The user types their user name and password. If the Reconciliation program capability has been assigned to the user name, then the user will be logged into Reconciliation successfully. The Batch Selection window displays.

3. Batch Selection Window

Figure 26:
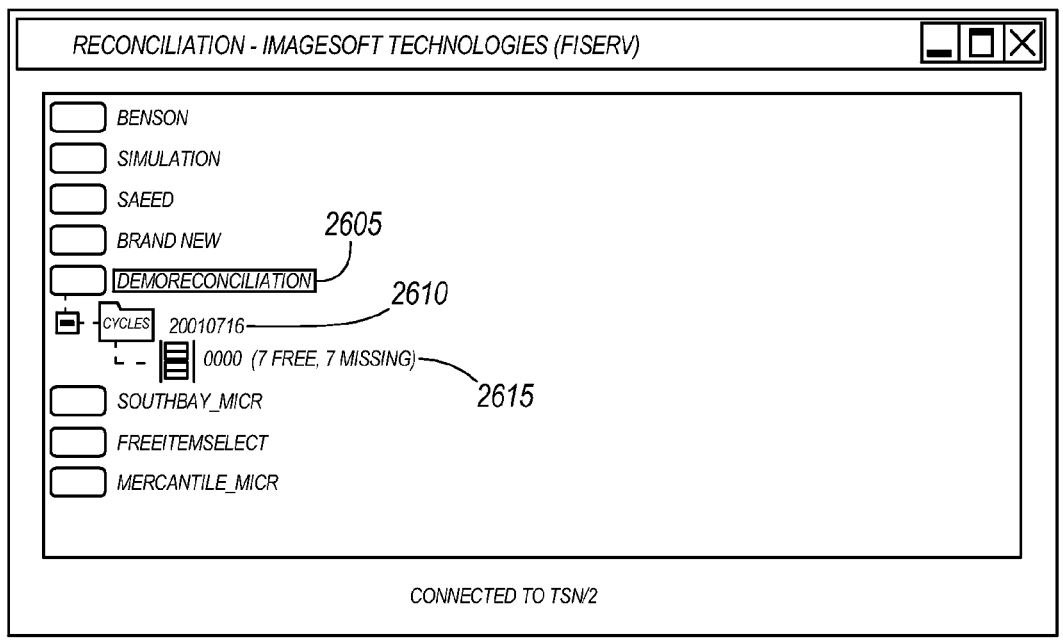
FIG. 26 is a screen print of the Batch Selection window.

The Batch Selection window 2600 (FIG. 26) provides access to three levels of nested folders. This is a hierarchical window, where the user can expand and contract the tree structure. A Database Icon contains one or more Cycle Icons, each of which contains one or more Batch Icons.

The user double clicks a Database Icon 2605 to display its available cycles. The user double clicks a Cycle Icon 2610 to display its available batches. The user double clicks a Batch Icon to reconcile that batch.

The information in parenthesis, located to the right of the batch ID number 2615 (0000 in the example in FIG. 26), indicates the number of free items and missing items contained in that batch.

4. View Image Window

Figure 27:
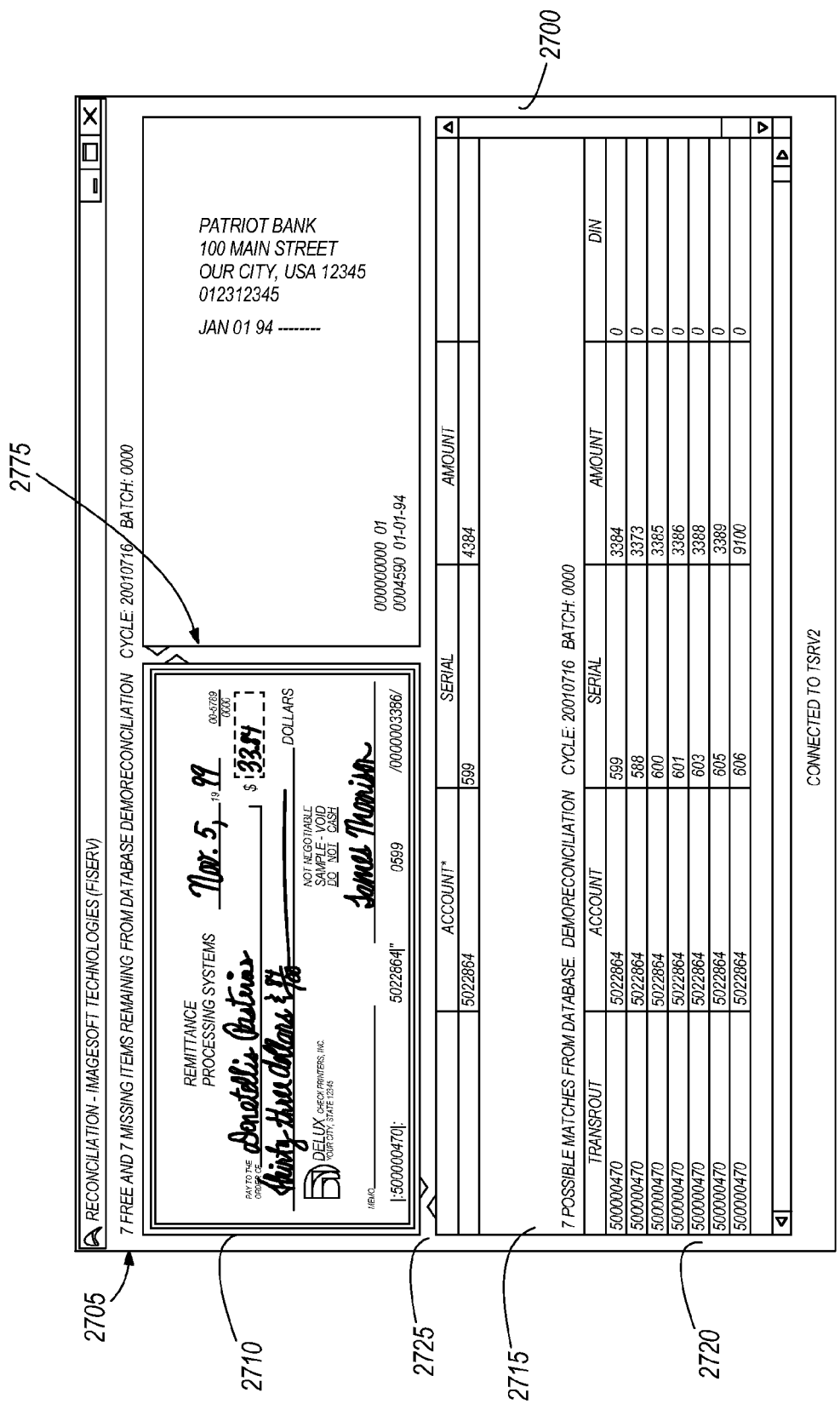
FIG. 27 is a screen print of the View Image window.

The View Image window 2700 (FIG. 27) provides four main areas of information:

TABLE 68

| AREA | DESCRIPTION |
| --- | --- |
| Free and Missing Items Remaining Area (2705) | Indicates the number of free items that are remaining in the batch being reconciled, while reminding the user which database and cycle he is working in. |
| Images (2710) | Provides front and back views of the document being reconciled. Magnification of the image within front and back windows is available by clicking on the image and dragging. Magnification controls are available in the right click menu, under Options. |
| Free Item MICR Information (2715) | Shows the MICR information at scan/capture time for the document, while the questionable item (in this case 'Serial') is displayed on a background. |
| Missing Items Table (2725) | Provides a list of the missing items that are nearest matches to the doubtful value contained in the Free Item MICR Information line. |
| Window Adjustment (2725) | The View Image window also contains two sets of image window adjustments. Clicking and dragging sideways on the border between the two images enlarges one image while reducing the other. Clicking on the border under both images and dragging it up or down allows the user to increase or decrease the vertical size of both images. |

Clicking one of the arrows results in extreme movement of the image border in the direction of the arrow clicked. For example, if in the image above the user clicks the window adjustment arrow that points to the right, the border will move to the right edge of the application window, enlarging the front view of the check, while the back of the check will be hidden. To view only the back of the check, the user would click the left-pointing arrow.

Matching, deleting, skipping, options, and other controls are available through a "right click" menu. "Right click" anywhere on the screen to access this menu.

5. Options Dialog Window

An Options Dialog window is accessed by either "right clicking" on the View Image window. The Options Dialog window is made up of three tabs that allows the user to adjust the following qualities:

TABLE 69

| QUALITY | DESCRIPTION |
| --- | --- |
| Font | Used for setting Font type, size, and style for fonts used in the Reconciliation application's View Image window. This group of controls also includes a font preview window. |
| Magnifying Glass | Used for setting the height and width of the magnifying glass, and the magnifier's magnification level. This group of controls also includes a preview window. |
| Image | Check boxes are used for independently setting whether each front or back image displayed is displayed in a 'fit to window' format (which can produce stretched images), or 'real view' format, which may show only a portion of the image at a time. |

6. Setting Font Options

The user performs the following acts to set the font options.

Figure 28:
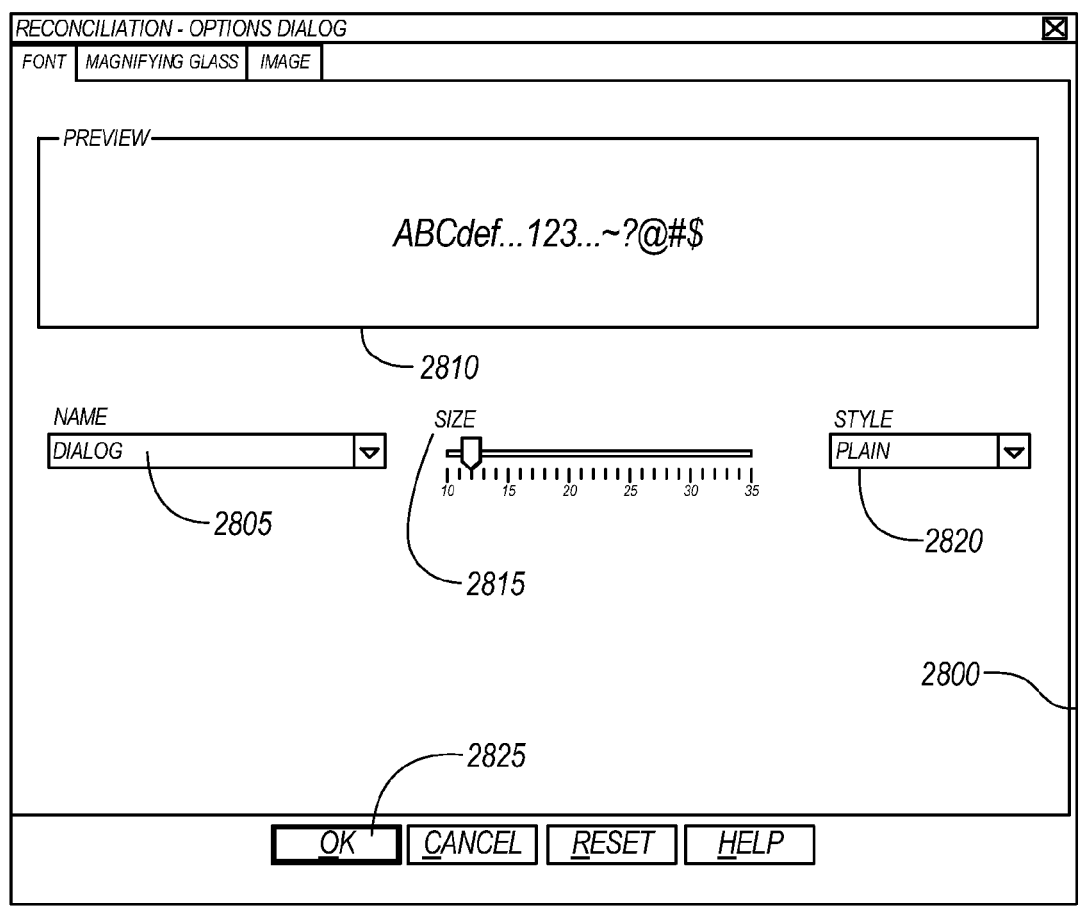
FIG. 28 is a screen print of the Options Dialog window.

From the View Image window, the user "right clicks" his mouse anywhere on the View Image window. The Options Dialog window 2800 displays (FIG. 28).

In the Name selection box 2805, the user selects a font name. The result is shown in the Preview box 2810 at the top.

The user clicks and drags the Size slider 2815 to change the font size. The result is shown in the Preview box 2810.

In the Style selection box 2820, the user selects a style for the font. The result is shown in the Preview box 2810.

The user then clicks the "OK" button 2825 when the font Name, Size and Style is properly set. The Options Dialog window 2800 closes, and the View Image window 2700 now is displayed using the font Name, Size and Style chosen.

7. Setting Magnifying Glass Options

The user performs the following acts to set the magnifying glass options:

From the View Image window the user "right clicks" his mouse anywhere on the View Image window 2700. The Options Dialog window 2800 displays.

Figure 29:
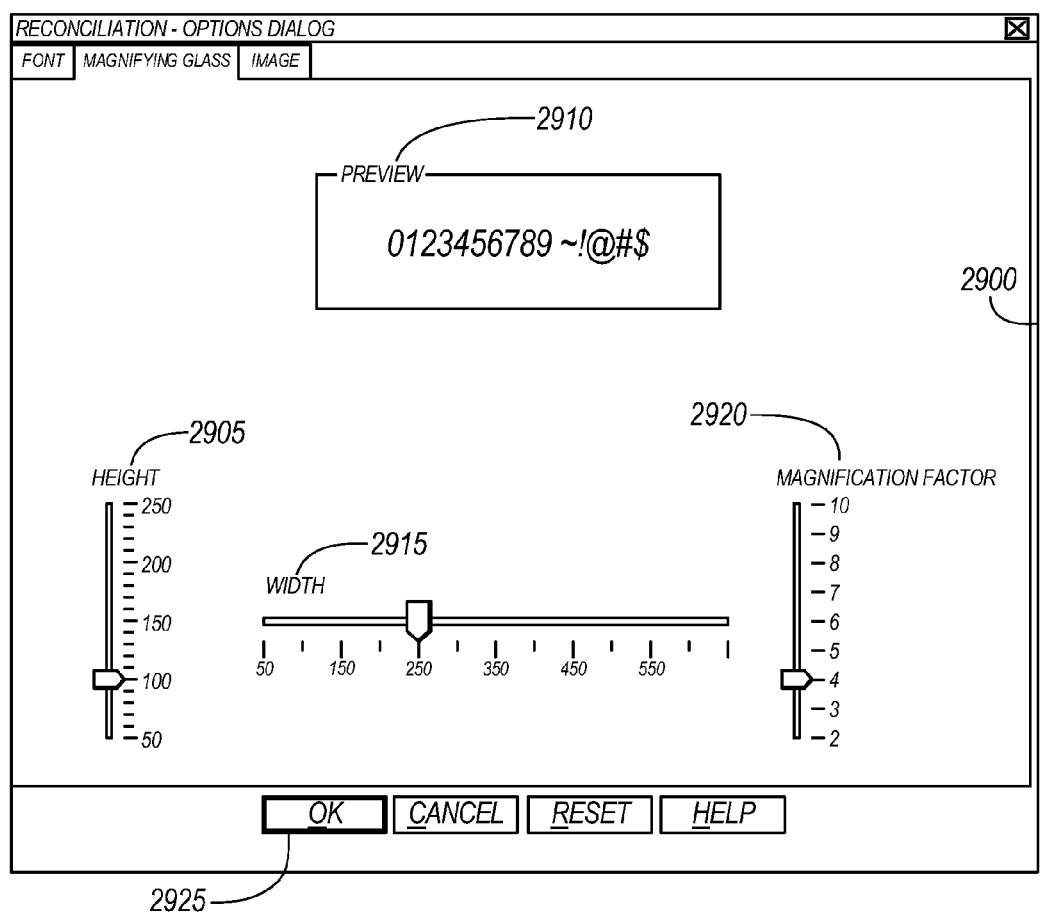
FIG. 29 is a screen print of the Magnifying Glass tab of the Options Dialog window.

The user clicks the Magnifying Glass tab. The Magnifying Glass tab fully displays 2900 (FIG. 29).

The user "clicks and drags" the Height slider 2905 to the magnification to use. The result is shown in the Preview box 2910 at the center.

The user "clicks and drags" the Width slider 2915 to the width of the magnifying glass to use. The result is shown in the Preview box 2910 at the center.

The user "clicks and drags" the Magnification Factor slider 2920 to the magnification level to use. The result is shown in the Preview box 2910 at the center.

The user then clicks the "OK" button 2925 when the font Height, Width and Magnification Factor is properly set. The Options Dialog window closes, and the magnifying glass now uses the height, width and magnification chosen.

8. Setting Image Controls

The user performs the following acts to set the image controls:

From the View Image window the user "right clicks" his mouse anywhere on the View Image window 2700. The Options Dialog window 2800 displays.

The user clicks the Image tab near the top. The Image tab 3000 (FIG. 30) fully displays.

The user clicks the Front checkbox 3005 to enable or disable Fit to Window Front Image.

The user clicks the Back checkbox 3010 to enable or disable Fit to Window Back Image.

The user clicks the "OK" button 3015 when the image options are set. The Options Dialog window 2800 closes, and the images are displayed with the settings you have chosen.

9. Matching Items

The user performs the following acts to match items:

The user launches the Reconciliation application. The Login window displays.

The user types in their user name and password, and presses the Enter key. The Batch Selection window 2600 displays.

The user clicks in the folder structure to select a single database name/cycle/batch. The Batch ID is highlighted, and shows the number of Free Items and Missing Items in that batch that need reconciling.

The user presses enter. The View Image window 2700 displays the first free item in the selected batch, and a list of entries in the MCF that most likely correspond to the free item. The field data that does not match the MCF entry is displayed in pink. Of course, a different color can be used.

The user uses the cursor (arrow) keys to scroll through the Missing Items Table 2720 until he has highlighted an entry that matches the image. As each entry is highlighted, any free item field data that does not match the selected MCF entry is highlighted in pink.

The user presses Enter and selects "match" from a popup menu. This will force a match between the selected MCF data and the free item image. A Match Configuration Dialog box displays for confirmation.

The user selects "yes" or "no". If the user selects "Yes," the next free item displays in the View Image window. If the user selects "No," the display returns to the same Image window without having saved any changes.

If the user wants to skip the next image without matching, the user "right clicks" on the screen, and clicks Skip. When finished reconciling, the user closes the application.

10. Deleting Free Items

The user performs the following acts to delete free items.

In the View Image window, the user "right clicks" anywhere on the screen. A Right Click menu displays 3100 (FIG. 31).

The user selects Delete. The Delete Confirmation Dialog box displays.

The user confirms his request.

G. NetQuery

1. Introduction to NetQuery a. Overview of the NetQuery Program

NetQuery is a Web-based program that allows a user to query and view document information and images in a Web browser, such as Internet Explorer or Netscape Navigator. The client side of the application uses Java Applets that is embedded in HTML. By entering the address of the EIMA system Web site in the Address bar of the Web browser, the user is able to log on to the Web site and then start NetQuery.

There are three main screens that make up the NetQuery applet: Query screen, Result screen, and Image screen. Queries are created in the Query screen, query results are displayed in the Result screen, and query documents are displayed in the Image screen.

b. System Requirements

Table 70 lists the hardware and software requirements for one embodiment of a workstation 115 utilizing NetQuery.

TABLE 70

| COMPONENT | RECOMMENDATION |
|---|---|
| Processor | 400 Mhz Pentium II |
| Minimum Hard Drive Space | 6-10 MB of free hard disk space |
| Recommended RAM | 128 MB |
| Operating systems | Windows NT, Windows 95 and 98, Unix, Linux |
| Screen Resolution | 800 × 600 pixels. For instructions on changing your screen resolution, see Changing Your Screen Resolution. |
| Colors | Over 256 |
| Web Browser | Internet Explorer 5.5 or Netscape Navigator 4.08 |
| Plug-ins | Java ™ 2 Runtime Environment, Standard Edition including the Java ™ Plug-in download. For more information about this plug-in, please read Overview of the Java Plug-in. | c. Using NetQuery for the First Time

The operator should log on to the EIMA system Web page before launching NetQuery. After the operator's login information has been authenticated, the operator has access to NetQuery and other programs that they have permission to use.

To log on to the EIMA Web site, the operator performs the following acts:

Open the Web browser at the client, and navigate to the Login page of the EIMA system. The EIMA system Login page is displayed in the Web browser.

Figure 32:
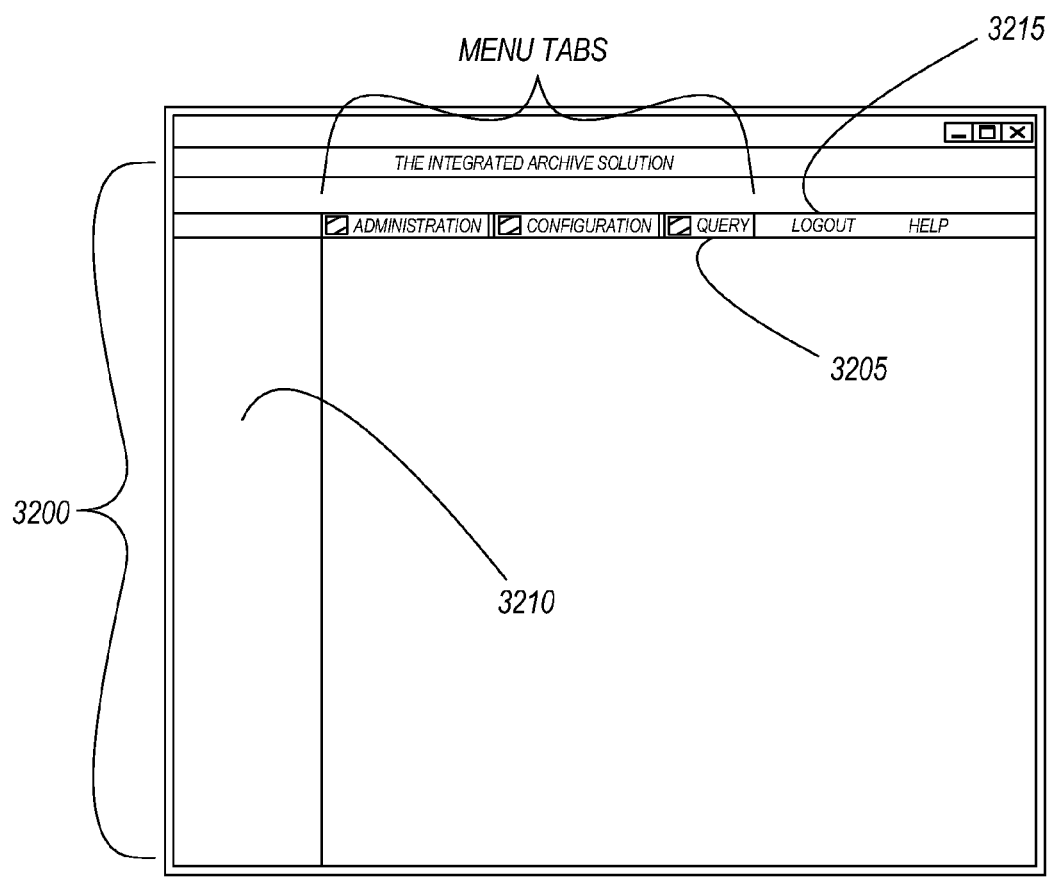
FIG. 32 is a screen print of the EIMA system home page.

At the Login screen, the user enters a user name and a user ID. Assuming the user is a valid user, the Java Plugin is downloaded and installed at the client and then the EIMA system home page 3200 is displayed in the Web browser as shown in FIG. 32.

On the Main Menu, the user selects the Query tab 3205. The NetQuery hyperlink is loaded in the left pane 3210 of your Web browser for access by the user.

To end a session, the user can log out by clicking Logout 3215 on the menu panel. Logging out returns the user to the Login page.

d. Overview of the Java Plug-in

To run NetQuery, the Java Plug-in should be installed at the client. The Java Plug-in is part of the Java 2 Runtime Environment, Standard Edition download. The Java Plug-in is an accessory program that allows the client to run Java applets and JavaBeans components in Internet Explorer or Netscape Navigator.

2. Query Screen a. Overview of Queries

A query is a request for document items in a particular database cycle. Queries are defined and executed from the Query screen. To retrieve specific document records, the user must set criteria for the query. Criteria is a set of limiting conditions that retrieves a specific set of records. The user can construct a simple or advanced query in the Query screen. A simple query allows the user to search for documents using a comparison operator. An advanced query allows the user to search for documents using both comparison and logical operators. The user can also set criteria on the same field multiple times. When the user executes a query, the query request is sent to the server. The server searches for records in the specified database(s) and then returns only those records that meet the criteria. Query results are displayed in the Results screen.

By default, the Query screen does not contain any information. The user creates the query by performing the following acts:

Selecting the document type for the query.
Selecting the database or databases.
Changing the default date range.
Typing query criteria in the Query Definition Grid.
Executing the query.

b. Overview of the Query Screen

Figure 33:
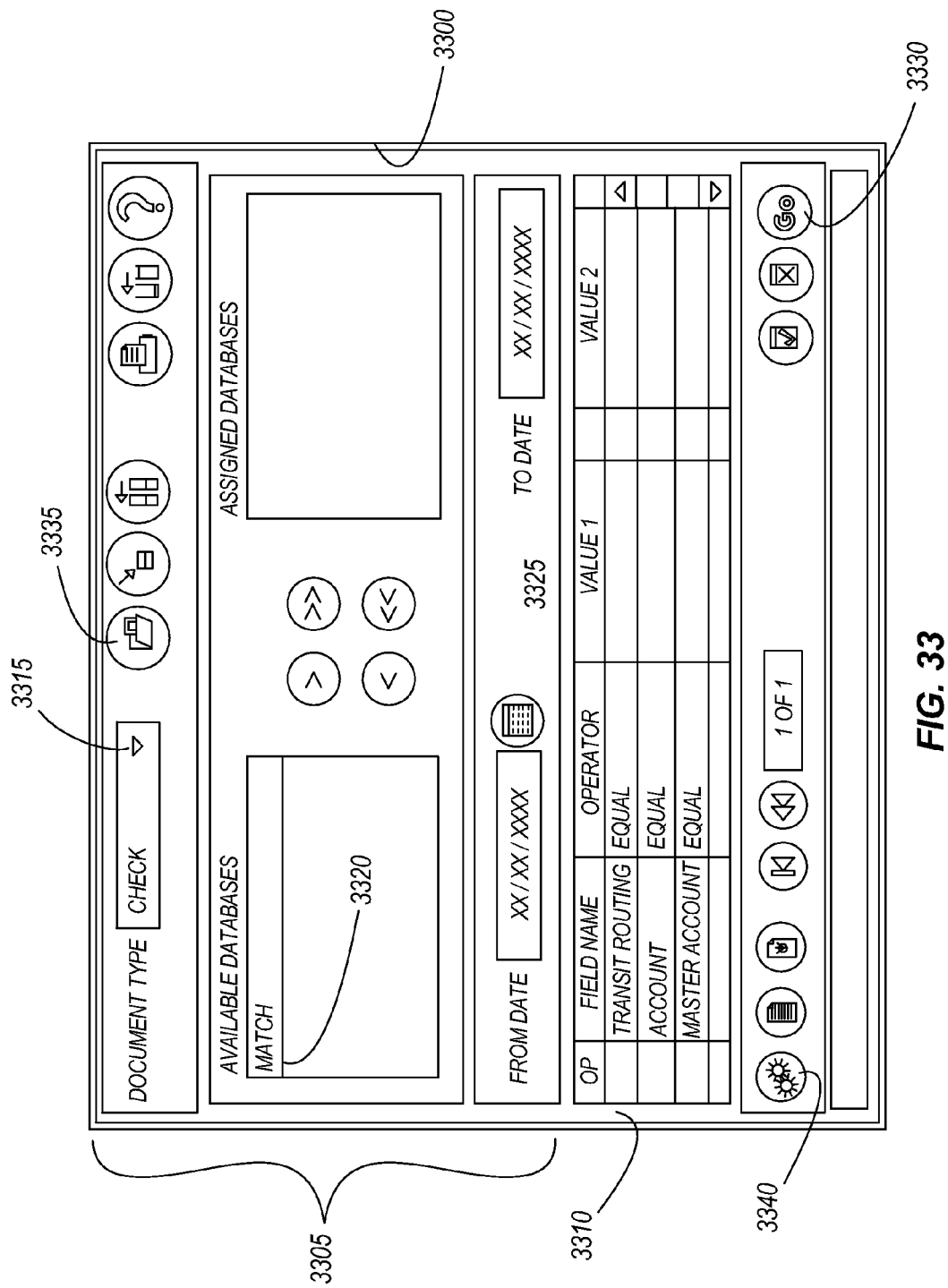
FIG. 33 is a screen print of the Query screen.

The Query screen 3300 (FIG. 33) opens after the user launches NetQuery from the main menu (FIG. 32). The user creates, saves, opens, and executes queries from the Query screen. In this screen, the user can also print a copy of the current settings, access help about the program, and navigate to other query sets.

The upper portion 3305 of the Query screen is where the user selects the document type, database, and date range for a query. The lower portion of the Query screen contains the Query Definition Grid 3310. Of course, different arrangements are possible.

Table 71 provides a description of the buttons in the Query screen.

TABLE 71

| NAME | DESCRIPTION |
| --- | --- |
| Open Query Button | Opens an existing query file. |
| Save Query Definition Button | Saves a query. |
| Advanced Query Style Button | Changes the Query screen to Advanced Mode. |
| Simple Query Style Button | Changes the Query screen to Simple Mode. |
| Print Button | Prints a copy of the current settings in the Query screen. The following fields are printed: name, query date range; query style; document type; all fields in the Query Definition Grid; and the assigned databases. |
| Reset Button | Returns the default settings to all the fields in the Query screen. Clicking the Reset button clears your selections and criteria entries. |
| Help Button | Opens a second browser window that contains information about NetQuery. |
| Add Button | Moves the selected database(s) from the Available Databases list box to the Selected Databases list box. Databases in the Selected Databases list box will be queried. |
| Add All Button | Moves all databases in the Available Databases list box to the Selected Databases list box. Databases in the Selected Databases list box will be queried. |
| Remove Button | Moves the selected database or databases from the Selected Databases list box to the Available list box. Databases in the Available list box will not be queried. |
| Remove All Button | Moves all databases from the Selected Databases list box to the Available Databases list box. Databases in the Available list box will not be queried. |
| Calendar Button | Opens a calendar where you can select a date. This button is located next to the From Date and To Date fields. |
| New Query Button | Creates a new query set. Clicking this button opens a new Query screen. |
| Close Current Display Button | Closes the current Query screen without saving the query. This button appears greyed out when there is only one query set open. |

TABLE 71-continued

| NAME | DESCRIPTION |
| --- | --- |
| Go Button | Executes the current query and retrieves query results. The keyboard shortcut for this button is ALT + G. |
| Save Image Button | Saves currently displayed image to your local hard drive as a GIF-formatted image file. A Save Image dialog box will be displayed that permits you to select the location for the GIF file. |

These buttons or options are used to navigate between query sets.

TABLE 72

| NAME | DESCRIPTION |
| --- | --- |
| View Query Screen Button | Switches to the Query screen from the Result or Image screen. |
| View Result Screen Button | Switches to the Result screen from the Query or Image screen. |
| View Image Screen Button | Switches to the Image screen from the Query or Result screen. | c. Overview of the Query Definition Grid

The Query Definition Grid 3310 is where the user establishes search criteria for a query. For the embodiment shown, the grid is located below the From Date and To Date text boxes in the Query screen. Each row in the Query Definition Grid contains a query field where the user can set up your search criteria. The Query Definition Grid contains the following columns:

TABLE 73

| COLUMN | DESCRIPTION |
| --- | --- |
| FieldName | Contains fields that can be queried |
| Operators | Contains a drop-down list of comparison operators |
| Value1 and Value2 | Contains search values |

When the Query screen is in Advanced mode, an "Op" column appears in the Query Definition Grid. The "Op" column contains a drop-down list of logical operators. The user can set criteria on any field in the Query Definition Grid. Search criteria is set by selecting a comparison operator from the "Op" or Operators columns and then typing a search value in the Value1 and Value2 fields.

d. Overview of Comparison Operators

The user selects a comparison operator in the Query Definition Grid 3310. A comparison operator compares two values and then returns a query result that is based on the outcome of the comparison. The following operators are available from the Operators column in the Query Definition Grid:

TABLE 74

| OPERATOR | DESCRIPTION |
| --- | --- |
| Equal | Retrieves records that contain an exact value in the current field. |
| Greater Than | Retrieves records that are greater than a certain value in the current field. |
| Less Than | Retrieves records that contain less than a certain value in the current field. |

TABLE 74-continued

| OPERATOR | DESCRIPTION |
| --- | --- |
| Greater Than or Equal | Retrieves records that contain values that are greater than or equal to a certain value in the current field. |
| Less Than or Equal | Retrieves records that contain values that are less than or equal to a certain value in the current field. |
| Not Equal | Retrieves records that do not equal a specified value for the current field. |
| Like | Retrieves records that contain a string of values in the current field. For example, to locate all documents that contain the "Mc" prefix in the Account Name field, use the Like operator to search for these records by typing Mc in the Value1 cell. |
| Between | Retrieves records that contain values falling between a range of values in a certain field. When the Between operator is selected, the user needs to type a second value for the row in the Value2 cell. The Value2 field is only active when the Between operator is selected. | e. Changing the Mode of the Query Screen

The operator can switch the Query screen between Simple mode and Advanced mode. Simple mode is used to create basic queries and is the Query screen's default setting. Advanced mode is used to create complex queries that contain logical statements.

f. Creating a Basic Query

The user performs the following acts to define and then execute a basic query:

At the Query screen 3300, the user clicks the Document Type down-arrow 3315, and selects a document type. The availability of document types and databases are based on the user permission settings.

In the Available Databases list box 3320, the user activates (e.g., click on with the pointer) the database that query is performed within, and then the database is added to the Assigned Databases list box. The user can select multiple databases.

To set a beginning or from date, the user clicks on the calendar button 3325 next to the From Date text box. A calendar then opens as a Java applet. The user then clicks a day on the calendar. The calendar closes and the date is inserted into the From Date text box.

To set an ending or to date, the user clicks the calendar button next to the To Date text box, and then clicks a day on the calendar. Alternatively, the user can also type the beginning and ending dates directly into the From Date and To Date text boxes. If the user does not select or type a date range, NetQuery will query all available dates in the selected databases.

Next, the user clicks the Equal cell next to the query field for which he wants to set criteria. By default, the Equal operator is assigned to all fields. The user selects a comparison operator from the drop-down list.

The user then clicks the query field's Value1 cell and then types an appropriate value. The user confirms the entry (e.g., by pressing Enter).

If needed, the user clicks in the query field's Value2 cell and then types a second value.

After the user is finished setting criteria, he clicks the "Go" button 3330. The host executes the query and, then, opens and closes a Status message box, and displays the query results in the Results screen.

g. Querying Multiple Databases

The user can query several databases at the same time. In one embodiment, only databases that contain the currently selected document type are displayed in the Available Databases list box.

h. Saving a Query

Once the user has defined a query in the Query screen, the user can save the query settings to a file. Saving a query to a file enables the user to reuse the query definition in future queries.

i. Deleting a Query

The user can delete existing queries that have been saved under a group of which he is a member. Queries are deleted from an Open Query Definition dialog box.

j. Opening an Existing Query

The user can open an existing query file and then execute or modify the query as needed. Query file availability is based on group membership.

Figure 34:
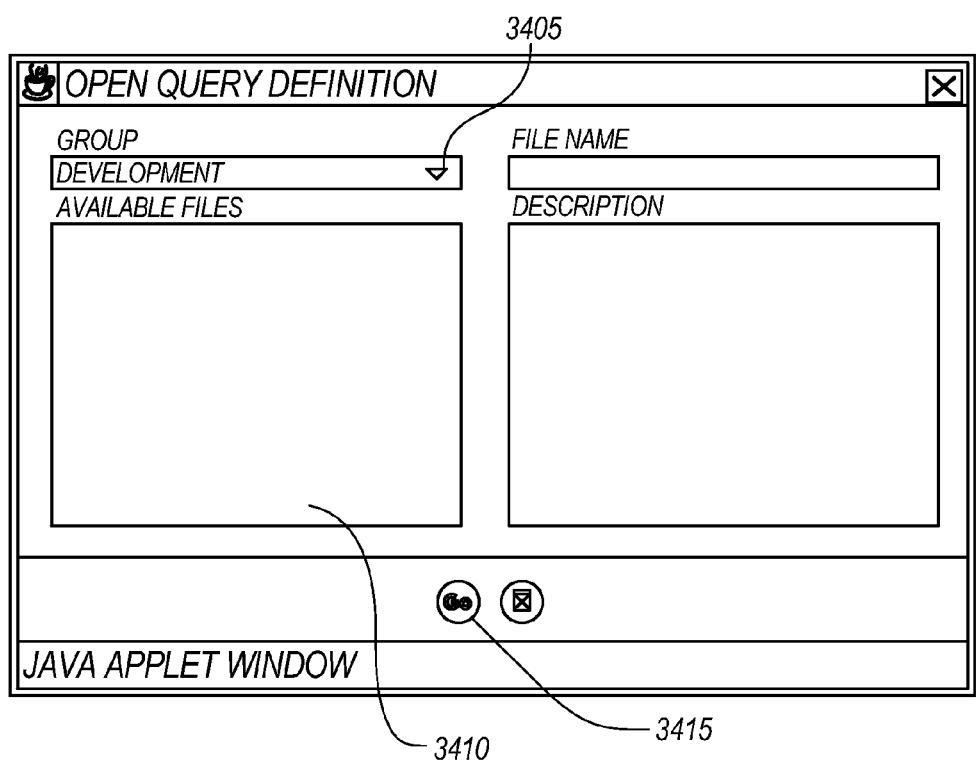
FIG. 34 is a screen print of the Open Query Dialog box.

The user performs the following acts to open an existing query file in the Query screen:

First, the user clicks the Open Query button 3335. The Open Query Definition Dialog box 3400 opens as shown in FIG. 34.

The user clicks the Group down-arrow 3405. A drop-down list of groups opens.

The user then selects a group name. The group's queries are displayed in the Available Files list box 3410.

Next, the user clicks a query file in the Available Files list box 3410.

In the Open Query Definition dialog box, the user clicks the "Go" button 3415. The query definition opens in the Query screen.

k. Printing a Query Definition

The user can print a copy of the current settings in the Query screen. In one embodiment, the following fields are printed: name of the query file, query mode-advanced or simple, document type, selected query databases, and the query's date range.

The user can adjust the print setup including the orientation (e.g., print images in portrait or landscape), set the margins, set the resolution, and set the text properties (font, size, etc.).

l. Overview of Advanced Queries

An advanced query is a request that contains one or more logical operators in its search criteria. The user can set search criteria on the same field multiple times in an advanced query. When the Query screen is set to Advanced mode, the Op column is available in the Query Definition Grid. Clicking a cell in the Op column opens a drop-down list of logical operators.

The user can select the following logical operators for an advanced query:

TABLE 75

| OPERATOR | DESCRIPTION |
| --- | --- |
| OR operator | Use the OR operator to test if one or another argument is true and then return any matching records that contain either arguments. |

TABLE 75-continued

| OPERATOR | DESCRIPTION |
| --- | --- |
| AND operator | Use the AND operator to test if all arguments are true and then receive matching records that contain the argument. |
| NOT operator | Use the NOT operator to exclude an argument from your query results and then receive only those records that do not contain the argument. |
| Parenthesis ( ) | Use parenthesis to enclose a logical statement in an advanced query. Parentheses affect the order that statements in the Query Grid are executed. | m. Examples of Advanced Queries

Figures 37, 38, 40:
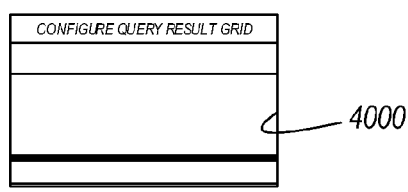

FIGS. 35 shows an advanced query that uses the OR logical operator and the AND logical operator to search for records. FIG. 36 shows an advanced query that contains four conditions which use the OR logical operator. FIG. 37 shows an advanced query that contains the AND logical operator and uses parenthesis to enclose three OR statements.

n. Creating an Advanced Query

The user performs the following acts to define and then execute an advanced query:

If the logical operators column is not visible in the Query Definition Grid, the user clicks the Advanced mode button 3340. The Query screen switches to Advanced mode.

At the Query screen, the user selects or types the appropriate options from the following fields as needed: document type, available databases, and From Date and To Date (all of which were discussed above).

In the Query Definition Grid, the user locates the field that he wants to set criteria for. The user clicks in the Operators column and selects a comparison operator.

Next, in the Value1 cell, the user enters a search value. If the user selects the Between operator in step 3, the user enters a second value in the Value2 cell. The search criteria for the field is typed into the first row of the Query Definition Grid. This sets the search criteria for the first field.

The user can repeat the above step for additional search criteria. Upon entering the desired criteria, the user can click the Go button. The query is executed and then the query results are displayed in the Results screen.

3. Navigating Between Query Sets a. Overview of Query Sets

A query set is inclusive of the Query, Result, and Image screens and contains the following information: query definition, result set, and image set. The user can have multiple query sets open in the same session. With reference to FIG. 38, the Query Set text box 3800 displays the number of the open query set, as well as the total number of query sets. The navigational buttons 3805 to the right and left of the Query Set text box allows the user to move between query sets. The Query Set text box 3800 and navigational buttons 3805 are located in the Query, Result, and Image screens. For example, if there are three query sets open, and the second query set is active, the Query Set text box 3800 displays "2 of 3."

4. Result Screen a. Overview of Query Results

Query results are the matching document records returned by a query. When the user executes a query, any records that match the search criteria of the query are displayed in the Result screen 3900 (FIG. 39). In the Result screen 3900, query results are organized into rows. The column labels at the top of each column identify the column data. Each row represents a record in the query results set and each row contains field data.

The user can perform the following actions on query results: tag items for viewing and print tagged items. The Tag column 3905 is used to select an item for viewing or printing. Query results are not returned in the following situations: there is no database selected, the user does not have permissions to query items in the selected date range, or there are no items that match the search criteria.

The user can perform the following tasks in the Results screen: view items in the results set, tag items, sort the results set, retrieve item images, navigate between query results sets, and print items.

b. Overview of Query Result Grid Menu

The user can "right click" on the results grid, to display the Results Screen menu 4000 (FIG. 40). The menu has the following options:

TABLE 76

| OPTION | DESCRIPTION |
| --- | --- |
| Configure Query Results Grid | Displays the Grid Configuration panel, which allows the user to configure the look and feel of the results grid. |
| Copy | Copies selected rows to the clipboard. This menu option is available when contiguous rows are selected. The grid supports multiple interval row selection, which means that you can select a series of rows by dragging the mouse or by pressing the CTRL key and clicking on individual rows. |
| Tag Selected Item (s) | Tags the selected rows. This menu option is available when one or more rows are selected. |
| Untag Selected Item (s) | Untags selected rows. This menu option is available when one or more rows are selected. This option will not check if the row is tagged, it will untag the items independent of its current tag. |
| Invert Tags of Selected Item (s) | Inverts the tag state of the selected items. Therefore if an item is tagged, it will untag the item. The menu option is available when one or more rows are selected. |

The table below provides a description of the fields and buttons in the Results screen.

TABLE 77

| NAME | DESCRIPTION |
| --- | --- |
| Document Type Field | The Document Type field displays the type of documents in the results set. |
| Navigational Buttons (Top of Result Screen) | Moves through pages of a results set. |
| Tag All Button/Untag Button | Selects all of the items in the result set. Click the button again to deselect tagged items. |
| Sort Button | Sorts the results in the set. Clicking this button opens the Sort dialog box where you can change sort fields. |
| Remote Print/Fax Button | Prints or faxes tagged items to a remote printer or fax on the UNIX system. |
| Print Button | Prints a copy of the tagged items in the Results screen to a local network printer. |
| Reset Button | Returns the state of Tag column to its previous state. |
| Help Button | Opens a second browser window that contains information about using the NetQuery program. |

TABLE 77-continued

| NAME | DESCRIPTION |
| --- | --- |
| New Query Button | Starts a new query set. Clicking this button pens a new Query screen. |
| Stop Retrieving Results Button | Interrupts the transfer of query images to your screen. Any images that have been downloaded before clicking this button will be displayed in the Image screen. |
| Close Current Display Button | Closes the current Result screen and returns to the Query screen. |
| Go Button | Executes an image query and displays images for tagged items in the Image screen. The keyboard shortcut for this button is ALT + G. |
| Status Bar | Displays the number of items returned in the results set. | c. Tagging Items and Retrieving Images

After a query is executed, matching items are displayed in the Result screen. To view images, the user should tag any items that he wants to view. To tag an item, click in the checkbox next to the item. Tagging an item places a checkmark in the Tag column. After items have been tagged, the user is ready to submit an image query. An image query retrieves the documents for all tagged items and displays the images in the Image screen. The user should execute a query and receive query results before retrieving images.

d. Sorting Query Results

The user can change how items in the results set are sorted. The sort feature allows the user to organize items by a particular field or fields. A field can be sorted in ascending or descending order. Clicking the Sort button opens the Sort Result dialog box, where sort fields are selected. The user can sort using one or more fields (e.g., sort using a first field and then, sort using a second field). Different sort fields include, but is not limited to, Transit Routing, Account, Master Account, Serial, Transaction Code, Amount, Posting Date, DIN, Exception Code, and Decision Type.

e. Changing Column Order

For printing or viewing purposes, the user may want to change the order of columns in the Results screen. The user can rearrange columns by clicking-and-dragging a column label to a new position in the results list.

f. Printing Query Results to Local Printer

The user can print a list of the currently tagged items, and/or the items themselves. In one embodiment, the fields that print under the image are defined in a Sybase table user settings.

Figure 41:
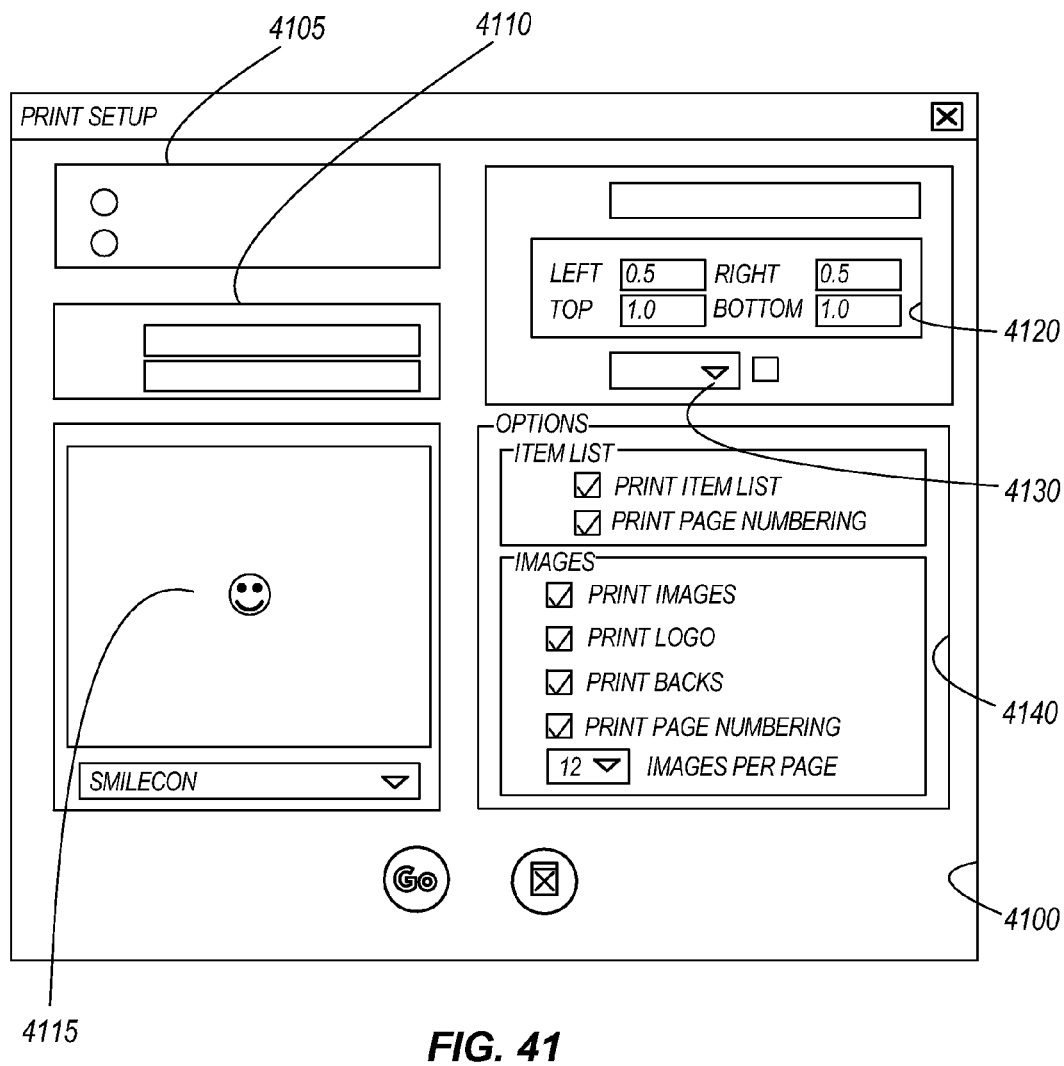
FIG. 41 is a screen print of the Print Setup window.

A Print Setup window 4100 (FIG. 41) can be used to control the format of the hard copy. The window shown includes an orientation section 4105, a text properties section 4110, a logo section 4115, a margins section 4120, a print quality section 4130, and an options section 4140.

Additionally, field information can print under each image. The 'number of image info lines' parameter, defined in user settings, tells the system how many fields to print/fax under check images. If this parameter is not defined in user settings, then the default is 3. The fields the user chooses to be printed must be a subset of the items selected for the results list.

g. Viewing Multiple Query Results

If the user has several query sets open, he can switch between the open query results.

h. Navigating in the Result Screen

The navigational buttons at the top of the Result screen allow the user to move through the pages of query results for one query set. The navigational buttons at the lower-left corner of the Result screen allows the user to switch between query sets. Clicking one of these buttons displays the results of the selected query set. Of course, other locations for the buttons is possible.

5. Image Screen a. Overview of the Image Screen

Figure 42:
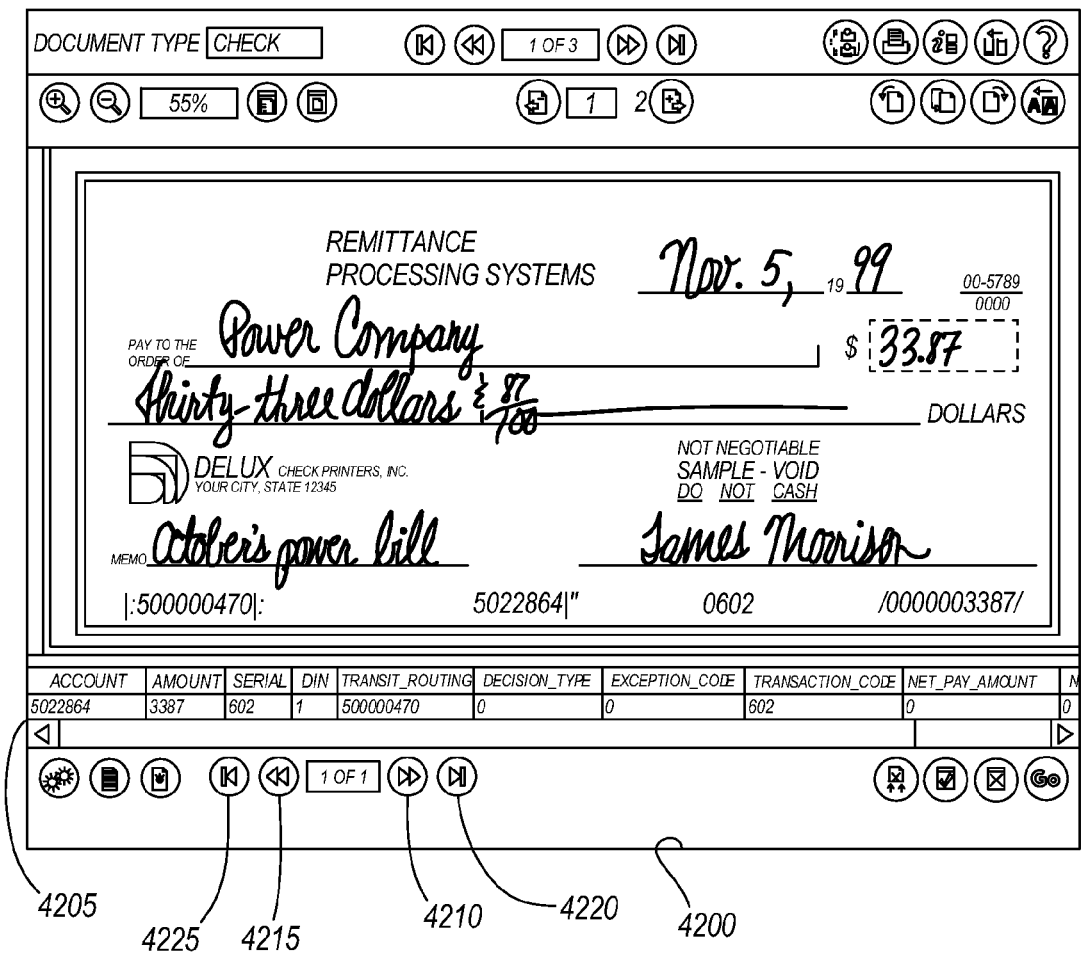
FIG. 42 is a screen print of the Image screen.

The Image screen 4200 (FIG. 42) displays document images for any items the user has tagged. This screen 4200 opens after the user submits an image query from the Result screen 4000.

The user can perform the following tasks in the Image screen: adjust image magnification, rotate images on the screen, invert or reverse image colors, print images to a local network printer or a remote printer on the UNIX system, view document information, access help about NetQuery, and navigate between query sets.

The table below provides a description of the buttons in the Image screen.

TABLE 78

| NAME | DESCRIPTION |
| --- | --- |
| Document Type Field | The Document Type field displays the type of documents contained in the query set images. |
| Navigational Buttons | Use the Image navigational buttons at the top of the Image screen to move between images in a query set. |
| Remote Print/Fax Button | Prints or faxes a document to a remote printer or fax on the UNIX system. |
| Print Button | Prints a copy of the currently displayed image to a local network printer. |
| Add/Remove Document Information Button | Displays the Document Information window. This window is located at the bottom of the Image screen and displays the image's data field information. Use the Remove Document Information button to close the Document Information window. |
| Reset Button | Reloads the current document in the Image screen. |
| Help Button | Opens a second browser window that contains information about using the NetQuery program. |
| Zoom In Button | Increases the size of the current image in the Image screen. |
| Zoom Out Button | Decreases the size of the current image in the Image screen. |
| Zoom Box | To manually change the magnification of an image, double-click in the Zoom box and then type a magnification percent. |
| Scale To Fit Horizontally Button | Fits the entire width of the image in the Image screen. |
| Scale To Fit In Window Button | Fits the entire image in the Image screen. |
| Previous Page Button | Displays the previous view of the current item. |
| Next Page Button | Displays the next view of the current item. |
| Rotate Left Button | Rotates the image left 90 degrees. |
| Rotate 180 Degrees Button | Rotates the image 180 degrees. |
| Rotate Right Button | Rotates the image right 90 degrees. |
| Invert Button | Reverses the colors of the image. |
| Navigational Buttons (Below the display area.) | See Quick Guide to Navigational Buttons. |

TABLE 78-continued

| NAME | DESCRIPTION |
| --- | --- |
| Cancel Button | Interrupts the transfer of images to your computer. Any images that have been downloaded before you click this button will be displayed in the Image screen. |
| New Query Button | Creates a new query set. |
| Close Current Display Button | Closes the Image screen and returns to the Result screen. |
| Go Button | The Go button is greyed out and cannot be used in the Image screen. | b. Viewing Document Information

The user can view document information for images in the Image screen 4200. The document information window 4205 contains the field data for the current image and is displayed in a separate window at the lower-end of the Image screen 4200. The Document Information window 4205 contains two rows: The first row consists of field labels; the second row contains the corresponding field values for the image.

c. Navigating Between Images In a Query Set

The navigational buttons at the top of the Image screen allow the user to move between and display images in a query set. The Next Item button 4210 displays the next image in the query set. The Previous Item button 4215 displays the previous image in the query set. The Last Item button 4220 displays the last image in the query set. The First Item button 4225 displays the first image in the query set.

d. Changing the View of an Image

Most items or images are comprised of more than one view. For example, a check is made up of both a front view and a back view. Each view of an image is displayed on a separate page in the Image screen. The Next button displays the next view of the image. The Previous button returns to the previous view of the image.

6. Decision Support a. Overview of Decision Support

Support adds the capability to NetQuery to manage pay/no pay, pay amounts, and other factors for documents with fields that trigger the capture program's Exception Code generator. Decision Support allows the user to access items with an Exception Code greater than zero, and change pay/no pay decisions. The user can then update the database using this changed information.

Index fields added to NetQuery, to accommodate Decision Support, include: Exception Codes, Decision Type Codes, New_Pay_Amount, and New_Serial. These index fields are editable with Decision Support turned on, and in Image mode, where the user can see the document and the database information at the same time.

(i) Overview of Exception Codes

If an item matches any qualifiers, the item has an Exception Code of 1, or greater. Items that do not match any of the qualifiers have an Exception Code of 0. The user's policy may be that items will only be reviewed for payment decisions if the items match any of your qualifiers, such as high dollar amount, stale payment date, invalid signature, and/or endorsement missing.

b. Overview of Decision Type Codes

Decision Support provides a set of Decision Type codes to accommodate pay/no pay decisions. The number of codes can be expanded to provide for each institution's particular needs. Decision Type code values are available for editing when Decision Support is active, and the Image screen is displayed.

Standard check-related Decision Type codes are: pay, post dated, stale dated, pay w/new account, pay w/new serial, pay w/new amount, stop payment, endorsement irregular, signature irregular, check altered, and amounts differ. The user may have additional or different Decision Type codes available.

c. Using Decision Support

The user performs the following acts to use Decision Support:

The user logs in to NetQuery and click on the Query tab. The NetQuery and Decision Support buttons display in the left pane and the right pane will display the Query screen.

The user clicks on the Decision Support button.

From Available Databases, the user chooses one or more databases to be queried.

The user selects the query criteria and date range to be used in the query.

The user clicks the "Go" button. The Results screen will display, showing the results of the query. The Results screen will display the additional Decision Support Fields, but they will be blank and will not be accessible. Decision Support fields are accessible for editing in the Image screen, where the user can see the document image, and so have the information needed to make judgements.

The user "tags" items of interest and click the View Image Screen button.

The user clicks the "Go" button. After the Image screen appears, inspect the selected document and change the Decision Support fields as judgement requires.

Decision Support-specific fields include:

TABLE 79

| FIELD | DESCRIPTION |
| --- | --- |
| Exception_Code | Indicates a fault was detected for the item during the image capture process. Exception Codes higher than zero (0) indicate problems. The criticality of the problem is indicated by the magnitude of the number (up to 10) assigned to the Exception Code. |
| Decision_Type | Change the Decision Type field to indicate the reason for altering the item's fields. |
| New_Pay_Amount | When the amount field is to be changed, type the new pay amount into this field. |
| New_Serial | When the item's serial number was originally recorded incorrectly, type the correct serial number in this field. |

When finished, the user clicks the "Go" button. The decision support changes will update in the database.

The user "views" the changed information.

If required, the user can distribute the changed information by print or fax. The user can distribute the changed information by tagging desired items in the Results screen, and clicking the Remote Print/Fax button.

7. Manual Update a. Overview of Manual Update

Manual Update allows simple manual adjustments to document MICR data. When the user makes manual changes and then clicks the "Go" button, the database is updated with the changes the user has made.

b. Performing Manual Updates

The user performs the following acts to perform a manual update:

The user logs in to NetQuery and clicks the Query button. The Manual Update button displays, along with other purchased functions.

The user clicks the Manual Update button. The standard Query screen displays.

The user makes a query and tag items.

The user clicks the "Go" button. The images are retrieved, and displayed. The check data boxes are now editable. If the user double-clicks on a data box, it will be selected for editing. The user may select one or more characters individually using the text tool, which will replace the cursor when the user moves the cursor over the data box. The user can also double-click again to select the entire value.

When done, the user clicks the "Go" button. The changes you have made will be saved to the database. The changes will not be displayed unless the user runs a query again. The changes are made in the database, but the PC memory will not update until another query is run.

8. Grid Configuration Panel a. Overview of Grid Configuration Panel

By "right clicking" the Query screen, Image screen, or the Result screen the user can access the Grid Configuration panel. The Grid Configuration panel allows the user to set the display factors discussed below for the specific display screen.

TABLE 80

| OPTION | DESCRIPTION |
| --- | --- |
| Header (Body) font name | This drop down control displays all the fonts that are available on the system. Some of the fonts that can not be displayed (i.e. Windings, Symbol, Monotype, Marlett, Outlook, Bookshelf) are automatically filtered. It is not possible to screen all fonts that can not be displayed, therefore it is possible that you will select a font that won't work. If this occurs try a different font. |
| Header (Body) font size | The font size in points. Allowable sizes are 9 pt to 20 pt. |
| Header (Body) font style | The font style. Available font styles are Plain, Italic, and Bold. |
| Colors | Pressing any of the buttons displays the Select a Color dialog (shown below), which allows you to select the desired color for the desired component. |
| Show Grid Lines | Toggles the grid lines on or off. If Show Grid Lines is off, both the Show Horizontal Lines and Show Vertical Lines options will be disabled and no lines will be displayed. If Show Grid Lines is on, both the Show Horizontal Lines and Show Vertical Lines options will be enabled, but only the line(s) selected will display. |
| Cancel | Pressing the Cancel button cancels all changes. |

Clicking the "Go" button applies all your changes and saves all the parameters. When the font is changed, the width of all the columns is recalculated to be able to display the information. The only grid that may not be adjusted optimally is the Query Definition grid. This is because the grid is not allowed to grow beyond the bounds of the applet. All other grids are contained in a scroll pane and are allowed to grow past the edge of the applet.

H. Seal Verification

1. Overview

In another application, the object checks are encoded with a "secured seal" that contains specific information (e.g., check value, payee, date, check number, branch name, MICR information, etc.) about a check. When the check is presented at the bank for payment, the scanner includes an application that deciphers the "secured seal" to allow for verification that the check was properly issued and has not been altered. An example application for obtaining information from a seal or watermark is offered by Signum Technologies. In one specific embodiment, data is encoded and printed as a seal, watermark, diagram, picture, illustration, stamp, figure, or similar item (collectively referred to as a "seal"). Upon scanning the image, the application enlarges the seal and obtains the encoded data using a key. The application then decodes the obtained data.

Figure 49:
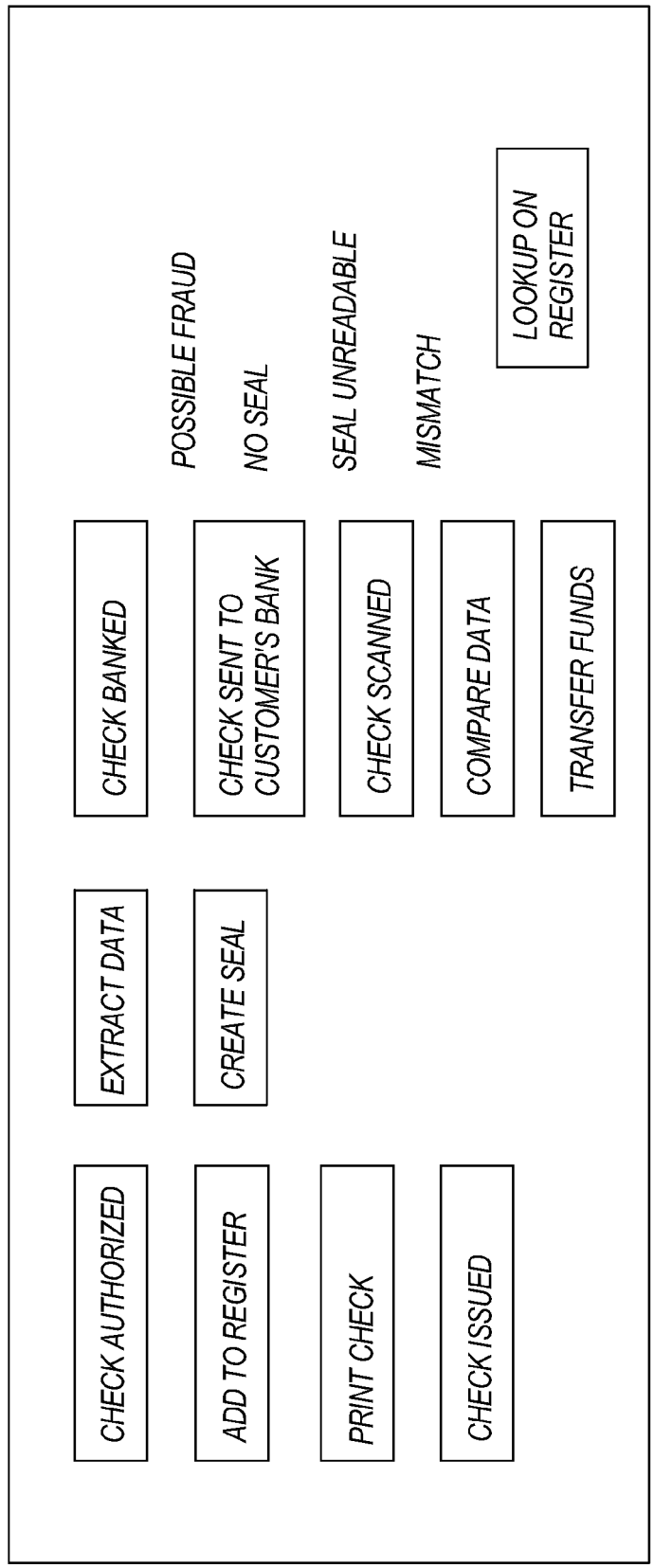
FIG. 49 is a block diagram representing a method of operation for seal verification.

In one embodiment, the obtained from the seal is imported into the host server 110 as an XML file along with the associated check image. A character recognition engine processes the check image by recognizing the payee and CAR amount of the check. The recognized results are then validated against the seal along with other check data passed by the scanner. The results are viewed via a document query application (e.g., NetQuery) and displayed in a standard report. Another embodiment 4900 is schematically shown in FIG. 49.

2. Import Utility Service a. Description

The import utility service captures the document data and images into the EIMA system 100 for the recognition process. The import service essentially locates the document image files from the network accessible directory, places the document image files in a specified location for recognition, and inserts the corresponding document data into the database for processing. In one embodiment, the document data that is inserted into the database for processing contains the following information:

TABLE 81

| INFORMATION | DESCRIPTION |
| --- | --- |
| Document Key | This is an optional string value that is used to identify the document on the source system. |
| Form ID | An integer value that is used to identify the Form definition that is to be used during the recognition process. |
| Image File | A string value that is the path and filename of the TIF file for the specified document. |
| Zone data | For each field of data that is to be recognized from a document, specific zone information is required. The zone data includes: zone name, actual, recognized |
| Zone Name | The name of the specific zone as specified in the form definition. (Payee Name, $ Amount, Account Number, Check Serial Number, Routing Number). |
| Actual | The actual value of the specific zone. |
| Recognized | The recognized value of the specific zone. This value will be compared with the actual value for data validation. | b. Importing objects.

To import the objects of interest, the user performs the following acts:

The user accesses the EIMA System web site and enters the import application.

The user enters his login ID and password. Assuming the information is correct, the application is provided to the user.

Figure 43:
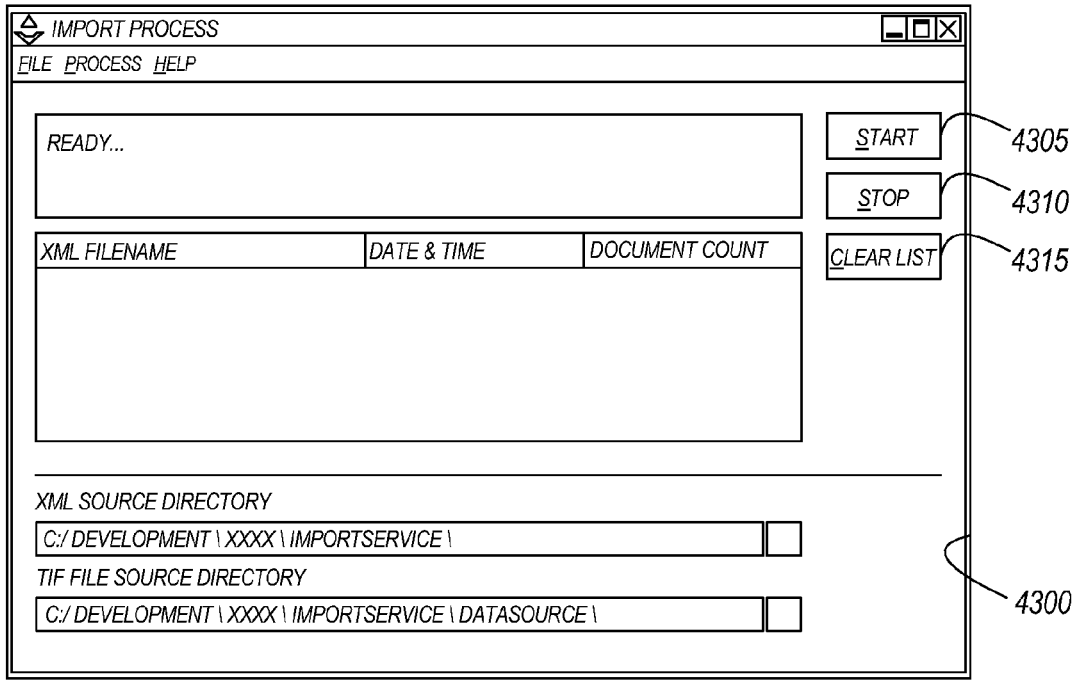
FIG. 43 is a screen print of the Import Process screen.
Figure 44:
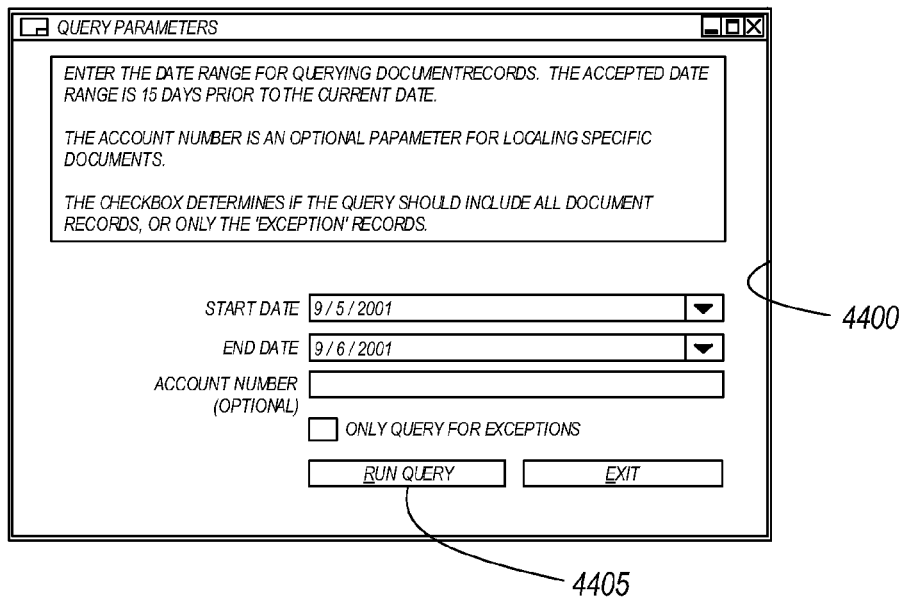
FIG. 44 is a screen print of the Query Parameters screen.

The user enters the server name that holds the desired database, and the database name where the document information is stored. The Import Process screen 4300 (FIG. 43) is displayed.

The user then selects the XML source directory and the Tiff file source directory. The source and Tiff file directory are the network accessible directories where the image files and corresponding image data are located. The user then clicks the Start button 4305 to start the import process.

Once the import process is initialized, the application is in an "In Process" mode and the screen displays the XML filename, date and time of the import process and the number of documents that are being imported to EIMA system 100. To stop the import process or clear the display, the user clicks the stop or clear list buttons 4305 or 4310. When all the files have been imported to the database, the application continues to check the source directory and imports documents that are available from that directory. This window can be minimized so the import process application runs in the background.

c. Error Handling (i) Invalid Form ID

An invalid form id error occurs when the form id in the XML file does not correspond to the form id defined in the application. When this happens, an error message is displayed. The user has the option to continue with the import process or stop the process. Selecting the former resumes the import process and the next document in the XML file is selected for processing. Selecting the latter stops the import process.

(ii) Image File Error

An image file error occurs when the image file (Tiff image and associated XML data) does not exist in the directory. When this happens, an error message is displayed. The user has the option to continue with the import process or stop the process. Selecting the former resumes the import process and the next document in the XML file is selected for processing. Selecting the latter stops the import process.

(iii) Database transaction error

Network failures, performance, or licensing issues are some incidents that can cause a database transaction error to occur. When this happens, the import application raises the specific error and the import process is halted. The user should fix the error before resuming the process.

3. Recognition a. Description

The Recognition application processes the document images that are ready for recognition. In one embodiment, the application processes the images on a FIFO (First In First Out) basis. FIFO is determined by the order of the documents imported into the host system 110. Character recognition is performed on the specified zones on a document and the necessary data is updated in the database.

b. Launching the Recognition Application.

The user accesses the EIMA System web site and launches the seal verification application.

The user enters his login ID and password. Assuming the information is correct, the application is provided to the user.

The user enters the server name that holds the desired database, and the database name where the document information is stored. The Recognition window is displayed.

The user clicks the start button to start the recognition process. The recognition application will continuously poll the database for images to recognize.

4. Document Query a. Description

The document query application displays images and data for specific documents that have passed or failed the data validation process. Document records that have gone through the recognition process are marked as either pass or fail depending on the validation of the "recognized" and "actual" data values from the seal. Each specific document whether it passes or fails can be viewed in the document query application for a limited period of time (e.g., 15 days prior to the current date).

b. Launching the Document Query application

To launch the document query application, the user performs the following acts:

The user accesses the EIMA System web site and enters the Document Query application.

The user enters his login ID and password. Assuming the information is correct, the application is provided to the user.

The user enters the server name that holds the desired database, and the database name where the document information is stored. A query parameters screen is displayed.

The user enters the start and end dates for querying the document records. The account number, which is optional, can also be entered if the user wants to query a specific document. Checking the query exception box will only display items that have failed the validation process.

The user clicks the "Run Query" button 4405. A first image of a check along with the recognized and seal value results are displayed for review.

c. Use of "Hot" Keys

Figure 45:
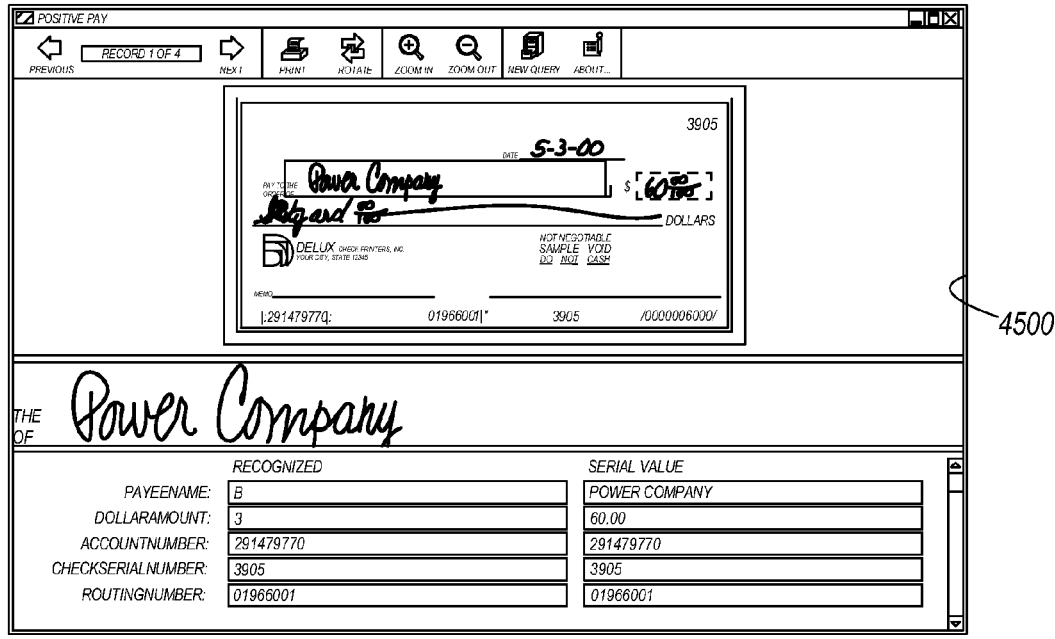
FIG. 45 is a screen print of the Query Viewer screen.

Each toolbar on the Query Viewer screen 4500 (FIG. 45) is associated with a "hot" key of the user keyboard. The user uses the hot key to review the document. Of course other keys or other methods can be used to perform the specialized tasks below.

TABLE 82

| KEY | DESCRIPTION |
| --- | --- |
| Previous or next arrow (F1 & F2 respectively) | Allows the user to cycle through the previous or next document record. |
| Print (F3) | Prints the current page or selected pages. |
| Rotate (F4) | Rotates the check image clockwise. |
| Zoom In (F5) | Magnifies the check image. |
| Zoom Out (F6) | Minimizes the check image. |
| New Query (F7) | Enables user to perform a new query. |
| Tab | Use your tab key to tab through each of the fields in the document. As you tab through a field, that area on the check image will be highlighted. |

5. Error Viewer a. Description

The Error Viewer application contains document record(s) resulting from a recognition error. A recognition error occurs when an image that is corrupted or does not exist in the directory is introduced in the host system 110. When this happens, the document record is flagged and routed to the error viewer application. The user cannot make any corrections or modifications to the document data but can only save or mark the document record for deletion.

6. Launching the Error Viewer Application

To launch the Error Viewer application, the user performs the following acts:

- The user accesses the EIMA System web site and enters the Error Viewer application.
- The user enters his login ID and password. Assuming the information is correct, the application is provided to the user.
- The user enters the server name that holds the desired database, and the database name where the document information is stored. Document records that have been marked for deletion are deleted instantaneously from the system and are not reported. Document records that are saved are reported on the Line Item and Exception reports as a "character recognition (CR) error".

7. User Maintenance/Reports a. Description

The maintenance application provides the system administrator the capability to add and update the user profile information, as well as view the list of active and inactive users. A user can also generate reports from the maintenance application. The reports display the results of the document data that have gone through recognition and subsequent validation in the Atlantis system. There are three basic reports that can be generated from the application.

TABLE 83

| REPORT | DESCRIPTION |
| --- | --- |
| Line Item Report | Displays both pass and fail values including actual and recognized data for each item. Items that failed validation are highlighted. |
| Exception Report | Displays failed values including actual and recognized data for each item. |
| General Summary Report | Displays statistics on the processed documents. | b. Launching the User Maintenance Application.

Figure 46:
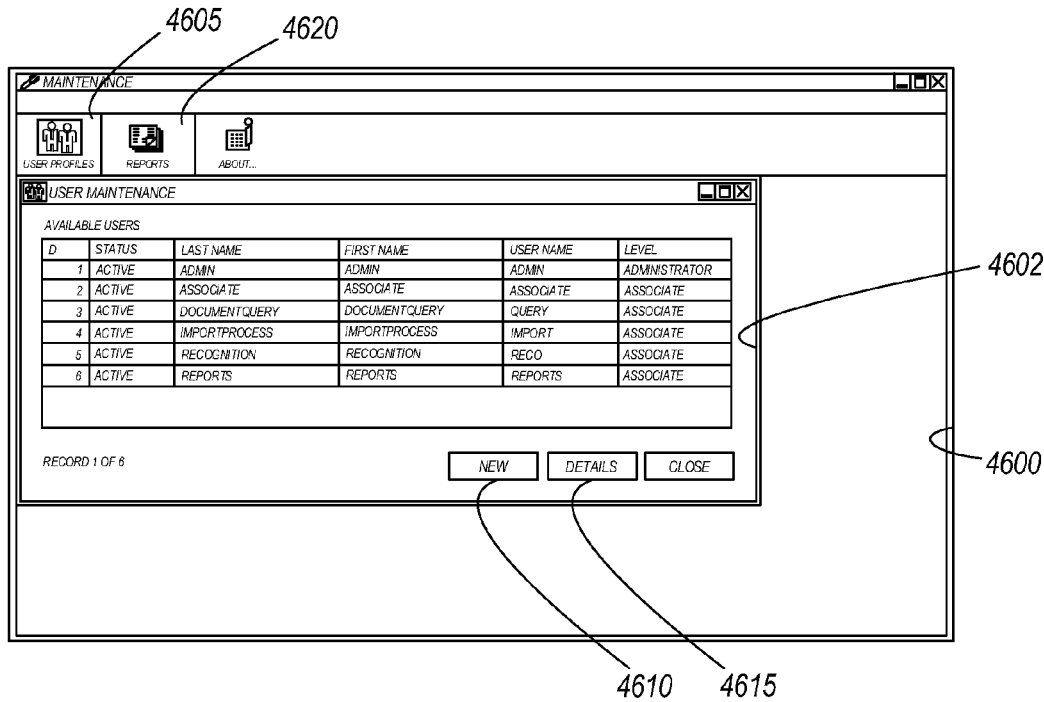
FIG. 46 is a screen print of the Maintenance screen.

To launch the User Maintenance application, the user performs the following acts:

- The user accesses the EIMA System web site and enters the User Maintenance application.
- The user enters his login ID and password. Assuming the information is correct, the application is provided to the user.
- The user enters the server name that holds the desired database, and the database name where the document information is stored. The User Maintenance screen 4600 (FIG. 46) is displayed. A user maintenance window 4602 displays a list of active and inactive users. This information is displayed by status level then by the user's last name.
- The user clicks the User Profiles button 4605.

(i) Adding New Users

Only the system administrator has the capability to add new users to the system. From the user maintenance window, the user selects the new button 4610. The user details window is displayed. The administrator can then enter the user's first and last name, assign a username and password, and Designate the level and status of the user.

(ii) Updating Current Users

To update current users, the user selects a user and clicks the details button 4615 from the user maintenance window. The user can then update the profile information.

c. Reports

Figure 47:
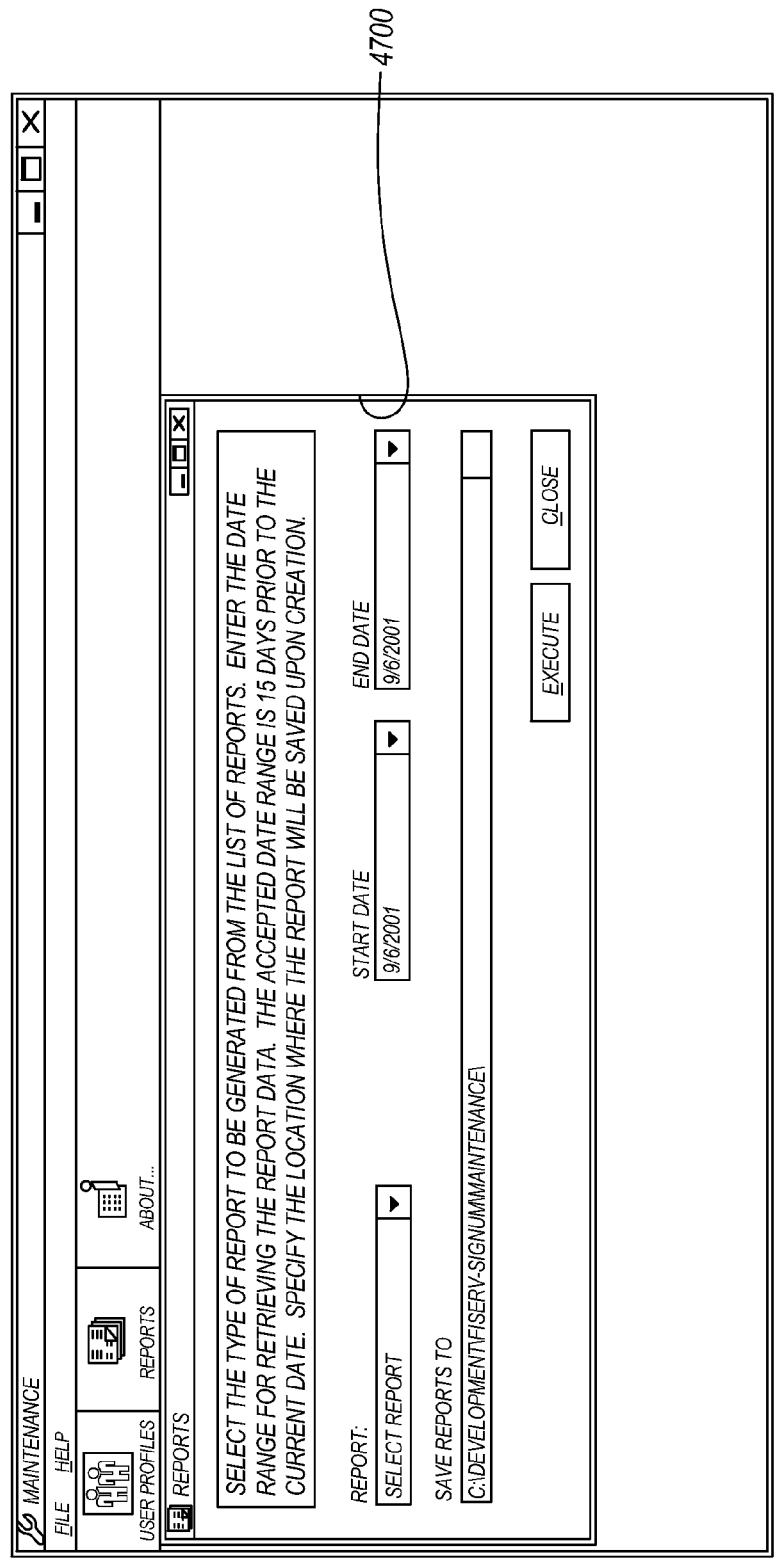
FIG. 47 is a screen print of the Reports window of the Maintenance screen.

From the maintenance window 4600, the user can click on the reports button 4620 to create a report. The reports window 4700 (FIG. 47) is displayed to the user. The user can then select a report. In one embodiment, an Excel file is generated from the list of reports. The user can also save the report to a directory. An example report 4800 is shown in FIG. 48. The following items can be indicated in some reports.

TABLE 84

| ITEM | DESCRIPTION |
| --- | --- |
| No Seal Found | Indicates that no seal value was found for the payee name, dollar amount, account number, check serial number or routing number. |
| Not available | Indicates no MICR value found on the dollar amount, account number, check serial number or routing number. Can also indicate low confidence during recognition. |
| CR Error | Indicates a recognition processing result that fell below the defined acceptance level. |

I. Database Maintenance Plan Application

The Database Maintenance Plan application is used to help an institution set up the core maintenance tasks that are necessary to ensure that their database performs well, is regularly backed up in case of system failure, and is checked for inconsistencies. The Database Maintenance Plan application creates a Server job that performs these maintenance tasks automatically at scheduled intervals.

The maintenance tasks that can be scheduled to run automatically are:

- backing up the database and transaction log files and retain them for a specific period of time,
- reorganizing the data on the data and index pages by rebuilding indexes so that future growth is faster (this ensures that database pages contain an equally distributed amount of data and free space, which allows future growth to be faster),
- compressing data files by removing empty database pages, and updating index statistics to ensure the query optimizer has up-to-date information regarding the distribution of data values in the tables (this allows the query optimizer to make better judgments about the best way to access data because it has more information about the data stored in the database),
- performing internal consistency checks of the data and data pages within the database to ensure that a system or software problem has not damaged data, and
- backing up the database and transaction log files (this allows you to create a history of backups to be used in the event that you need to restore the database to a time earlier than the last database backup).

The results generated by the maintenance tasks can be written as a report to a text file, HTML file, or even e-mailed to an administrator. One or more of the tasks performed by the Database Maintenance Plan application are discussed above in connection with other applications. However, the Database Maintenance Plan application provides an administrator with a single tool to coordinate all of the tasks.

As can be seen from the above, the invention provides a new, nonobvious, and useful electronic item management and archival system and method of operating the same. Various features and advantages of the invention are set forth in the following claims.

What is claimed is:

1. An electronic item management and archival system for managing and archiving items received from respective financial institutions, each item including at least one of image data, audio data, and video data and associated data relating to the at least one of image data, audio data, and video data, the system comprising:
   a server configured to be in communication with an item-generation device, the server being configured to receive from the item-generation device the items from the respective financial institutions, at least some of the items including MICR data, the server further configured to archive at least one of the received items to an archive, and retrieve at least one of the archived items from the archive, the server including architecture that supports a pool of threads promoting multiple, independent archive and retrieve operations concurrently;
   a storage device in communication with the server, the storage device being configured to receive the archived items from the server and store the received items; and
   an image match device, the image match device being configured to
      automatically verify capture in the archive of a plurality of images expected for capture, based on a respective match control file supplied by a user, the match control file including a plurality of data fields,
      automatically perform a first level of image matching, the first level of image matching based on a first set of user defined parameters from the match control file, and
      automatically perform at least a second level of image matching, the second level of image matching based on a second set of user defined parameters from the match control file, the second set being a subset of the first set,
      wherein the second level of image matching is only performed on images that were not matched at the first level of image matching, and
      wherein the image match device is further configured to automatically compare data fields in the match control file with data fields in the archive and to output a match information report based on one of the first level of image matching and the second level of image matching.

2. A system as set forth in claim 1 wherein at least one of the items is image data and associated data relating to the image data, and the item-generation device includes a scanner.

3. A system as set forth in claim 2 wherein the image data represents an image of a financial document.

4. A system as set forth in claim 2 wherein the image data represents an image of a check and the associated data includes MICR data.

5. A system as set forth in claim 2 wherein the image data represents a form.

6. A system as set forth in claim 1 wherein at least one of the items is audio data and associated data relating to the audio data, and the item-generation device includes a microphone.

7. A system as set forth in claim 1 wherein at least one of the items is video data and associated data relating to the video data, and the item-generation device includes a camera.

8. A system as set forth claim 1 wherein the storage device includes RAID.

9. A system as set forth in claim 1 wherein the storage device includes optical storage.

10. A system as set forth in claim 1 wherein the storage device includes magnetic storage.

11. A system as set forth in claim 1 wherein the magnetic storage includes tape storage.

12. A system as set forth in claim 1 wherein the storage device includes a memory chip.

13. A system as set forth in claim 1 wherein the system includes a workstation in communication with the server, and
   wherein the workstation is configured to provide a request to the server, thereby resulting in the server retrieving at least one item of the archived items.

14. A system as set forth in claim 13 wherein the workstation is selected from the group consisting of a personal computer, a Unix machine, a laptop computer, and a hand-held device.

15. A system as set forth in claim 13 wherein the system includes a second workstation in communication with the server, and
   wherein the second workstation is configured to provide a request to the server, thereby resulting in the server retrieving at least one item of the archived items.

16. A system as set forth in claim 15 wherein the pool of threads includes a first thread allowing the server to retrieve at least one item of the archived items in response to the first query,
   wherein the pool of threads includes a second thread allowing the server to retrieve at least one item of the archived items in response to the second query, and
   wherein the retrieving of the archived items using the first and second threads occurs concurrently.

17. A system as set forth in claim 1, wherein the pool of threads includes a first thread that promotes archiving at least a first received item from the item-generation device,
   wherein the pool of threads includes a second thread that promotes archiving at least a second received item from the item-generation device, and
   wherein the archiving of the at least first and second received items occurs independently and concurrently.

18. A system as set forth in claim 1, wherein the pool of threads includes a first thread that promotes archiving at least a first received item from the item-generation device,
   wherein the pool of threads includes a second thread that promotes retrieving at least a first archived item from the archive, and
   wherein the archiving of the at least first received item occurs independently and concurrently with retrieving at least a first archive item.

19. A system as set forth in claim 1, wherein the pool of threads includes a first thread that promotes retrieving at least a first archived item from the archive,
   wherein the pool of threads includes a second thread that promotes retrieving at least a second archived item from the archive, and
   wherein the archiving of the at least first and second archived items occurs independently and concurrently.

20. A system as set forth in claim 1 wherein the server includes software utilizing a Common Object Request Broker Architecture (CORBA), and a processor configured to execute the software to create a bus that supports the pool of threads.

21. A system as set forth in claim 1, wherein the image match device is further configured to allow a user to input additional non-MICR data to be stored in the archive.

22. A system as set forth in claim 1, wherein the match information report includes a match statistics report.

23. A method of managing an archive having items received from respective financial institutions, each item including a virtual object and query data associated with the virtual object, each virtual object selected from the group consisting of image data, audio data, and video data, the method comprising:

provifing a plurality of items, at least some of the items including MICR data;

archiving at least one of the provided items to an archive;

automatically verifying capture in the archive of a plurality of images expected for capture, based on a respective match control file supplied by a user, the match control file including a plurality of data fields, wherein automatically verifying capture includes automatically comparing data fields in the match control file with data fields in the archive;

outputting a match information report based on one of a first level of image matching and a second level of image matching, the first level of image matching based on a first set of user defined parameters from the match control file, the second level of image matching based on a second set of user defined parameters from the match control file, the second set being a subset of the first set, wherein the second level of image matching is only performed on images that were not matched at the first level of image matching;

querying the archive;

retrieving at least one of the archived items from the archive;

repeating one or more of the providing, archiving, querying, and retrieving acts; and structuring a bus that allows two or more of the providing, archiving, querying, retrieving, and repeating acts to occur concurrently.

24. A method as set forth in claim 23 wherein the archive includes a local archive.

25. A method as set forth in claim 23 wherein the archive includes a distributed archive.

26. A method as set forth in claim 23 wherein the act of structuring a bus includes executing software creating one or more servers.

27. A method as set forth in claim 26 wherein the act of structuring a bus includes creating a bus service that coordinates access to the archive and creating a bus application service that controls communication of applications.

* * * * *